United States Patent
Rusanovskyy et al.

(10) Patent No.: US 10,244,245 B2
(45) Date of Patent: Mar. 26, 2019

(54) CONTENT-ADAPTIVE APPLICATION OF FIXED TRANSFER FUNCTION TO HIGH DYNAMIC RANGE (HDR) AND/OR WIDE COLOR GAMUT (WCG) VIDEO DATA

(71) Applicant: QUALCOMM Incorporated, San Diego, CA (US)

(72) Inventors: Dmytro Rusanovskyy, San Diego, CA (US); Sungwon Lee, San Diego, CA (US); Done Bugdayci Sansli, Tampere (FI); Joel Sole Rojals, San Diego, CA (US); Adarsh Krishnan Ramasubramonian, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 266 days.

(21) Appl. No.: 15/176,034

(22) Filed: Jun. 7, 2016

(65) Prior Publication Data
US 2016/0360215 A1 Dec. 8, 2016

Related U.S. Application Data

(60) Provisional application No. 62/184,216, filed on Jun. 24, 2015, provisional application No. 62/172,713, filed on Jun. 8, 2015.

(51) Int. Cl.
*H04N 19/169* (2014.01)
*H04N 19/186* (2014.01)
(Continued)

(52) U.S. Cl.
CPC ....... *H04N 19/1887* (2014.11); *H04N 19/117* (2014.11); *H04N 19/136* (2014.11);
(Continued)

(58) Field of Classification Search
CPC .............. H04N 19/1887; H04N 19/186
See application file for complete search history.

(56) References Cited

U.S. PATENT DOCUMENTS 7,483,486 B2 * 1/2009 Mantiuk ............... H04N 19/46
375/240.01
7,885,469 B2 * 2/2011 Wang ................. H04N 19/124
382/232
(Continued)

FOREIGN PATENT DOCUMENTS

WO 2010105036 A1 9/2010
WO 2015057656 A1 4/2015

OTHER PUBLICATIONS

Color gamut scalable video coding; Jan. 2013; Kerofsky.*
(Continued)

*Primary Examiner* — Luis Perez-Fuentes
(74) *Attorney, Agent, or Firm* — Shumaker & Sieffert, P.A.

(57) ABSTRACT

This disclosure relates to processing video data, including processing video data to conform to a high dynamic range (HDR)/wide color gamut (WCG) color container. The techniques apply, on an encoding side, pre-processing of color values prior to application of a static transfer function and/or apply post-processing on the output from the application of the static transfer function. By applying pre-processing, the examples may generate color values that when compacted into a different dynamic range by application of the static transfer function linearize the output codewords. By applying post-processing, the examples may increase signal to quantization noise ratio. The examples may apply the inverse of the operations on the encoding side on the decoding side to reconstruct the color values.

36 Claims, 25 Drawing Sheets

(51) Int. Cl.
| | |
|---|---|
| *H04N 19/615* | (2014.01) |
| *H04N 19/117* | (2014.01) |
| *H04N 19/136* | (2014.01) |
| *H04N 19/85* | (2014.01) |
| *H04N 19/98* | (2014.01) |

(52) U.S. Cl.
CPC ......... *H04N 19/169* (2014.11); *H04N 19/186* (2014.11); *H04N 19/615* (2014.11); *H04N 19/85* (2014.11); *H04N 19/98* (2014.11)

(56) References Cited

U.S. PATENT DOCUMENTS

| | | | | |
|---|---|---|---|---|
| 8,982,963 | B2* | 3/2015 | Gish | G06T 5/50 345/590 |
| 9,819,956 | B2* | 11/2017 | Gu | H04N 19/44 |
| 2013/0335439 | A1 | 12/2013 | Jeong et al. | |
| 2015/0172713 | A1 | 6/2015 | Komiya et al. | |
| 2015/0184216 | A1 | 7/2015 | Park et al. | |
| 2016/0165256 | A1* | 6/2016 | Van Der Vleuten | H04N 9/68 375/240.01 |
| 2016/0316207 | A1* | 10/2016 | Minoo | H04N 19/136 |
| 2016/0360213 | A1* | 12/2016 | Lee | H04N 19/186 |
| 2017/0078706 | A1* | 3/2017 | Van Der Vleuten | H04N 5/20 |

OTHER PUBLICATIONS

Chromaticity based color signals for wide color gamut and High dynamic range; Oct. 2014.*
Call for evidence CFE for HDR and WCG video coding; Feb. 2015; Luthra.*
Requirements and use cases for HDR and WCG content coding; Feb. 2015.*
Bordes, et al., "AHG14: Color Gamut Scalable Video Coding using 3D LUT: New Results", JCT-VC Meeting; Jul. 25, 2013-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/, No. JCTVC-N0168, Jul. 15, 2013, 10 pp.
Cotton, et al., "BBC's response to CfE for HDR Video Coding (Category 3a)", British Broadcasting Corporation (BBC), International Organisation for Standardisation Organisation Internationale De Normalisation ISO/IEC JTC1/SC29/WG11 Coding of Moving Pictures and Audio, ISO/IEC JTC1/SC29/WG11 M36249, Jun. 22-26, 2015, Warsaw, Poland, Jun. 18, 2015, 22 pp.
International Search Report and Written Opinion of International Application No. PCT/US2016/036480, dated Aug. 9, 2016, 17 pp.
Kerofsky, et al., "Color Gamut Scalable Video Coding", JCT-VC Meeting; MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-L0334, Jan. 8, 2013, 17 pp.
Luthra, et al., "Call for Evidence (CfE) for HDR and WCG Video Coding", MPEG document M36131, ISO/IEC JTC1/SC29/WG11 MPEG2014/N15083, Switzerland, Feb. 2015, 46 pp.
Luthra, et al., "Requirements and Use Cases for HDR and WCG Content Coding", International Organisation for Standardisation Organisation Internationale De Normalisation ISO/IEC JTC1/SC29/WG11 Coding of Moving Pictures and Audio, ISO/IEC JTC1/SC29/WG11 MPEG2014/N15084, Feb. 6, 2015-Feb. 20, 2015, Geneva, Switzerland, Mar. 3, 2015, 13 pp.
Rusanovskyy, et al., "Single Layer Non-Normative (Category 3a) NCL and CL Responses to the Call for Evidence on HDR/WCG", 112, MPEG Meeting, Jun. 22, 2015-Jun. 26, 2015, Warsaw, (Motion Picture Expert Group or ISO/IEC JTC1/SC291WG11), No. m36256, Jun. 26, 2015, 10 pp.
Sansli, et al., "Dynamic Range Adjustment SEI Message", Qualcomm Incorporated, Joint Collaborative Team on Video Coding (JCT-VC) of ITU-T SG 16 WP 3 and ISO/IEC JTC 1/SC 291WG 11 21st Meeting: Warsaw, PL, Jun. 19-26, 2015, JCTVC-U0098, Jun. 10, 2015, 5 pp.
SMPTE Standard, "High Dynamic Range Electro-Optical Transfer Function of Mastering Reference Displays", SMPTE ST 2084:2014, the Society of Motion Picture and Television Engineers, Aug. 16, 2014, 14 pp.
Stessen, et al., "Chromaticity Based Color Signals for Wide Color Gamut and High Dynamic Range", ISO/IEC JTC1/SC29/WG11 Coding of Moving Pictures and Audio, MPEG2014/M35065, Oct. 1, 2014, 18 pp.
Itu-T H.261, Line Transmission of Non-Telephone Signals, Video Codec for Audiovisual Services At px64 kbits, The International Telecommunication Union, Mar. 1993, 32 pp.
Wang et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11 14th Meeting: Vienna, AT, Jul. 25-Aug. 2, 2013, JCTVC-N1003_v1_Sep. 27, 2013, 312 pp.
ITU-R Recommendation Bt.709-6, "Parameter values for the HDTV standards for production and international programme exchange," Jun. 2015, 19 pp.
ITU-R Recommendation BT.2020-2, "Parameter values for ultra-high definition television systems for production and international programme exchange," Oct. 2015, 8 pp.
Response to Written Opinion dated Aug. 9, 2016, from International Application No. PCT/US2016/036480, dated Feb. 13, 2017, 38 pp.
Second Written Opinion from corresponding PCT Application Serial No. PCT/US2016/036480 dated Mar. 20, 2017 (10 pages).
International Preliminary Report on Patentability from corresponding PCT Application U.S. Appl. No. PCT/US2016/036480 dated Jul. 4, 2017 (33 pages).

* cited by examiner

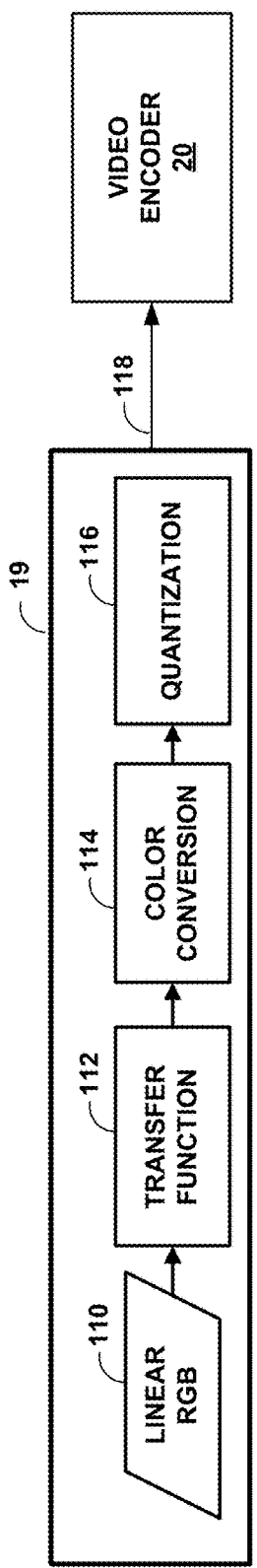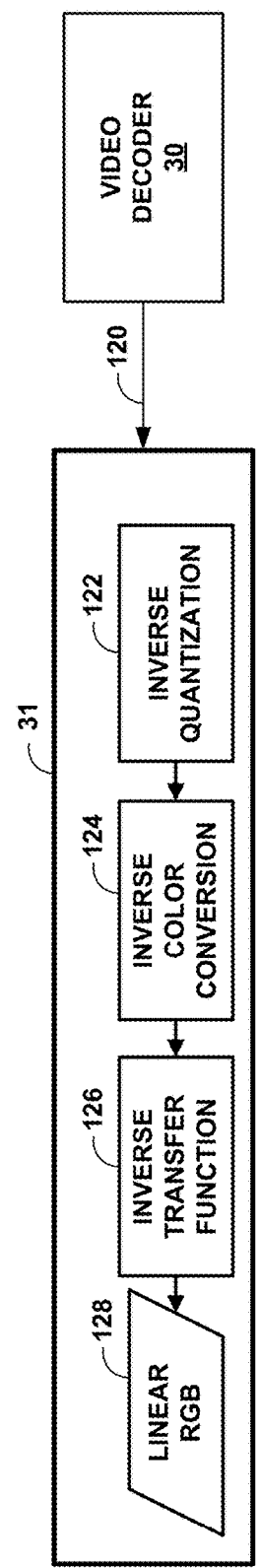
FIG. 4
FIG. 5

CONTENT-ADAPTIVE APPLICATION OF FIXED TRANSFER FUNCTION TO HIGH DYNAMIC RANGE (HDR) AND/OR WIDE COLOR GAMUT (WCG) VIDEO DATA

This application claims the benefit of U.S. Provisional Application No. 62/172,713, filed Jun. 8, 2015, and U.S. Provisional Application No. 62/184,216, filed Jun. 24, 2015, the entire content of each is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure relates to processing video data, including processing video data to conform to a high dynamic range (HDR)/wide color gamut (WCG) color container. As will be explained in more detail below, the techniques of the disclosure apply, on an encoding side, pre-processing of color values prior to application of a static transfer function and/or apply post-processing on the output from the application of the static transfer function. By applying pre-processing, the examples may generate color values that when compacted into a different dynamic range by application of the static transfer function linearize the output codewords. By applying post-processing, the examples may increase signal to quantization noise ratio. The examples may apply the inverse of the operations on the encoding side on the decoding side to reconstruct the color values.

In one example, the disclosure describes a method of video processing, the method comprising receiving a first plurality of codewords that represent compacted color values of video data, the compacted color values representing colors in a first dynamic range, uncompacting a second plurality of codewords based on the first plurality of codewords using an inverse static transfer function that is non-adaptive to the video data to generate un-compacted color values, the un-compacted color values representing colors in a second, different dynamic range, wherein the second plurality of codewords are one of codewords from the first plurality of codewords being inverse post-processed or the first plurality of codewords, at least one of inverse post-processing the first plurality of codewords to generate the second plurality of codewords or inverse pre-processing the un-compacted color values, and outputting the un-compacted color values or the inverse pre-processed un-compacted color values.

In one example, the disclosure describes a method of video processing, the method comprising receiving a plurality of color values of video data representing colors in a first dynamic range, compacting the color values using a static transfer function that is non-adaptive to the video data being compacted to generate a plurality of codewords that represent compacted color values, the compacted color values representing colors in a second, different dynamic range, at least one of pre-processing the color values prior to compacting to generate the color values that are compacted or post-processing of codewords resulting from the compacting of the color values, and outputting color values based on one of the compacted color values or the post-processed compacted color values.

In one example, the disclosure describes a device for video processing, the device comprising a video data memory configured to store video data, and a video postprocessor comprising at least one of fixed-function or programmable circuitry. The video postprocessor is configured to receive a first plurality of codewords from the video data memory that represent compacted color values of video data, the compacted color values representing colors in a first dynamic range, uncompact a second plurality of codewords based on the first plurality of codewords using an inverse static transfer function that is non-adaptive to the video data to generate un-compacted color values, the un-compacted color values representing colors in a second, different dynamic range, wherein the second plurality of codewords are one of codewords from the first plurality of codewords being inverse post-processed or the first plurality of codewords, at least one of inverse post-process the first plurality of codewords to generate the second plurality of codewords or inverse pre-process the un-compacted color values, and output the un-compacted color values or the inverse pre-processed un-compacted color values.

In one example, the disclosure describes a device for video processing, the device comprising a video data memory configured to store video data, and a video preprocessor comprising at least one of fixed-function or programmable circuitry. The video preprocessor is configured to receive from the video data memory a plurality of color values of video data representing colors in a first dynamic range, compact the color values using a static transfer function that is non-adaptive to the video data being compacted to generate a plurality of codewords that represent compacted color values, the compacted color values representing colors in a second, different dynamic range, at least one of pre-process the color values prior to compacting to generate the color values that are compacted or post-processing of codewords resulting from the compacting of the color values, and output color values based on one of the compacted color values or the post-processed compacted color values.

In one example, the disclosure describes a computer-readable storage medium storing instructions that when executed cause one or more processors of a device for video processing to receive a first plurality of codewords that represent compacted color values of video data, the compacted color values representing colors in a first dynamic range, uncompact a second plurality of codewords based on the first plurality of codewords using an inverse static transfer function that is non-adaptive to the video data to generate un-compacted color values, the un-compacted color values representing colors in a second, different dynamic range, wherein the second plurality of codewords are one of codewords from the first plurality of codewords being inverse post-processed or the first plurality of codewords, at least one of inverse post-process the first plurality of codewords to generate the second plurality of codewords or inverse pre-process the un-compacted color values, and output the un-compacted color values or the inverse pre-processed un-compacted color values.

In one example, the disclosure describes a device for video processing, the device comprising means for receiving a first plurality of codewords that represent compacted color values of video data, the compacted color values representing colors in a first dynamic range, means for uncompacting a second plurality of codewords based on the first plurality of codewords using an inverse static transfer function that is non-adaptive to the video data to generate un-compacted color values, the un-compacted color values representing colors in a second, different dynamic range, wherein the second plurality of codewords are one of codewords from the first plurality of codewords being inverse post-processed or the first plurality of codewords, at least one of means for inverse post-processing the first plurality of codewords to generate the second plurality of codewords or means for inverse pre-processing the un-compacted color values, and means for outputting the un-compacted color values or the inverse pre-processed un-compacted color values.

The details of one or more examples are set forth in the accompanying drawings and the description below. Other features, objects, and advantages will be apparent from the description, drawings, and claims.

BRIEF DESCRIPTION OF DRAWINGS

FIG. 4 is a conceptual diagram showing a HDR/WCG representation conversion.

FIG. 5 is a conceptual diagram showing an HDR/WCG inverse conversion.

DETAILED DESCRIPTION

This disclosure is related to the field of coding of video signals with High Dynamic Range (HDR) and Wide Color Gamut (WCG) representations. More specifically, the techniques of this disclosure include signaling and operations applied to video data in certain color spaces to enable more efficient compression of HDR and WCG video data. The proposed techniques may improve compression efficiency of hybrid based video coding systems (e.g., HEVC-based video coders) utilized for coding HDR & WCG video data.

Video coding standards, including hybrid-based video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. The design of a new video coding standard, namely HEVC, has been finalized by the Joint Collaboration Team on Video Coding (JCT-VC) of ITU-T Video Coding Experts Group (VCEG) and ISO/IEC Motion Picture Experts Group (MPEG). An HEVC draft specification referred to as HEVC Working Draft 10 (WD10), Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, JCTVC-L1003v34, is available from http://phenix.int-evrv.fr/jct/doc_end_user/documents/12_Geneva/wg11/JCTVC-L1003-v34.zip. The finalized HEVC standard is referred to as HEVC version 1.

A defect report, Wang et al., "High efficiency video coding (HEVC) Defect Report," Joint Collaborative Team on Video Coding (JCT-VC) of ITU-T SG16 WP3 and ISO/IEC JTC1/SC29/WG11, 14th Meeting: Vienna, AT, 25 Jul.-2 Aug. 2013, JCTVC-N1003v1, is available from http://phenix.int-evey.fr/jct/doc_end_user/documents/14_Vienna/wg11/JCTVC-N1003-v1.zip. The finalized HEVC standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2013, and another version was published in October 2014.

Figure 1:
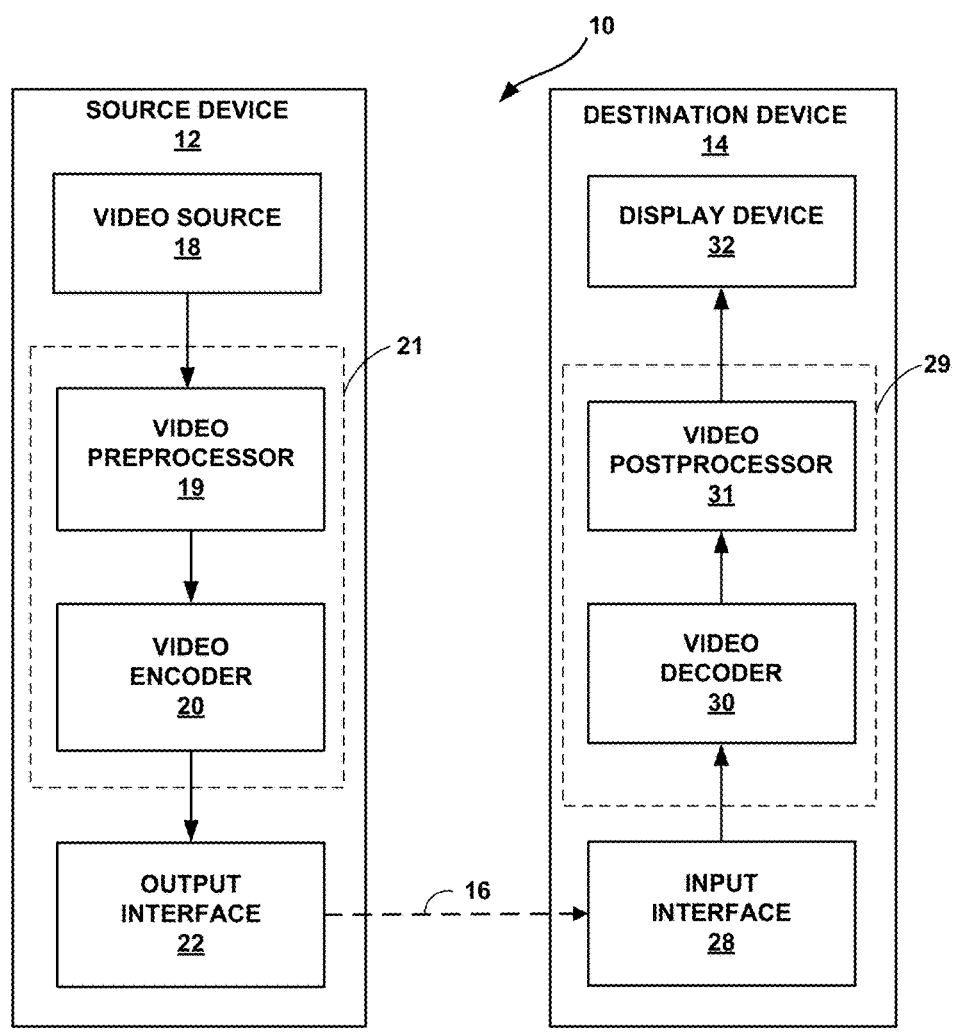
FIG. 1 is a block diagram illustrating an example video encoding and decoding system configured to implement the techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by an input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoding unit 21, which includes video preprocessor 19 and video encoder 20, and output interface 22. Destination device 14 includes input interface 28, video decoding unit 29, which includes video decoder 30 and video postprocessor 31, and display device 32. In accordance with this disclosure, video preprocessor 19 and video postprocessor 31 may be configured to apply the example techniques described in this disclosure. For example, video preprocessor 19 and video postprocessor 31 may include a static transfer function unit configured to apply a static transfer function, but with pre- and post-processing units that can adapt signal characteristics.

In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." For ease of description, the disclosure is described with respect to video preprocessor 19 and video postprocessor 31 preforming the example techniques described in this disclosure in respective ones of source device 12 and destination device 14. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoding unit 21. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20 of video encoding unit 21, which is also used by video decoder 30 of video decoding unit 29, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

As illustrated, video preprocessor 19 receives the video data from video source 18. Video preprocessor 19 may be configured to process the video data to convert it into a form that is suitable for encoding with video encoder 20. For example, video preprocessor 19 may perform dynamic range compacting (e.g., using a non-linear transfer function), color conversion to a more compact or robust color space, and/or floating-to-integer representation conversion. Video encoder 20 may perform video encoding on the video data outputted by video preprocessor 19. Video decoder 30 may perform the inverse of video encoder 20 to decode video data, and video postprocessor 31 may perform the inverse of video preprocessor 19 to convert the video data into a form suitable for display. For instance, video postprocessor 31 may perform integer-to-floating conversion, color conversion from the compact or robust color space, and/or inverse of the dynamic range compacting to generate video data suitable for display.

Video encoding unit 21 and video decoding unit 29 each may be implemented as any of a variety of fixed function and programmable circuitry such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoding unit 21 and video decoding unit 29 may be included in one or more encoders or decoders, either of which may be integrated as part of a combined encoder/decoder (CODEC) in a respective device.

Although video preprocessor 19 and video encoder 20 are illustrated as being separate units within video encoding unit 21 and video postprocessor 31 and video decoder 30 are illustrated as being separate units within video decoding unit 29, the techniques described in this disclosure are not so limited. Video preprocessor 19 and video encoder 20 may be formed as a common device (e.g., same integrated circuit or housed within the same chip or chip package). Similarly, video postprocessor 31 and video decoder 30 may be formed as a common device (e.g., same integrated circuit or housed within the same chip or chip package).

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based three-dimensional video (3DV) extension. In some instances, any bitstream conforming to MVC-based 3DV always contains a sub-bitstream that is compliant to a MVC profile, e.g., stereo high profile. Furthermore, there is an ongoing effort to generate a 3DV coding extension to H.264/AVC, namely AVC-based 3DV. Other examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual. In other examples, video encoder 20 and video decoder 30 may be configured to operate according to the ITU-T H.265, HEVC standard In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications are anticipated to operate with video data representing captured scenery with HDR (High Dynamic Range) and WCG (Wide Color Gamut). Parameters of the utilized dynamic range and color gamut are two independent attributes of video content, and their specification for purposes of digital television and multimedia services are defined by several international standards. For example, ITU-R Rec. 709 defines parameters for HDTV (high definition television), such as Standard Dynamic Range (SDR) and standard color gamut, and ITU-R Rec. 2020 specifies UHDTV (ultra-high definition television) parameters such as HDR and WCG. There are also other standards developing organization (SDOs) documents that specify dynamic range and color gamut attributes in other systems, e.g., P3 color gamut is defined in SMPTE-231-2 (Society of Motion Picture and Television Engineers) and some parameters of HDR are defined in STMPTE-2084. A brief description of dynamic range and color gamut for video data is provided below.

Figure 2:
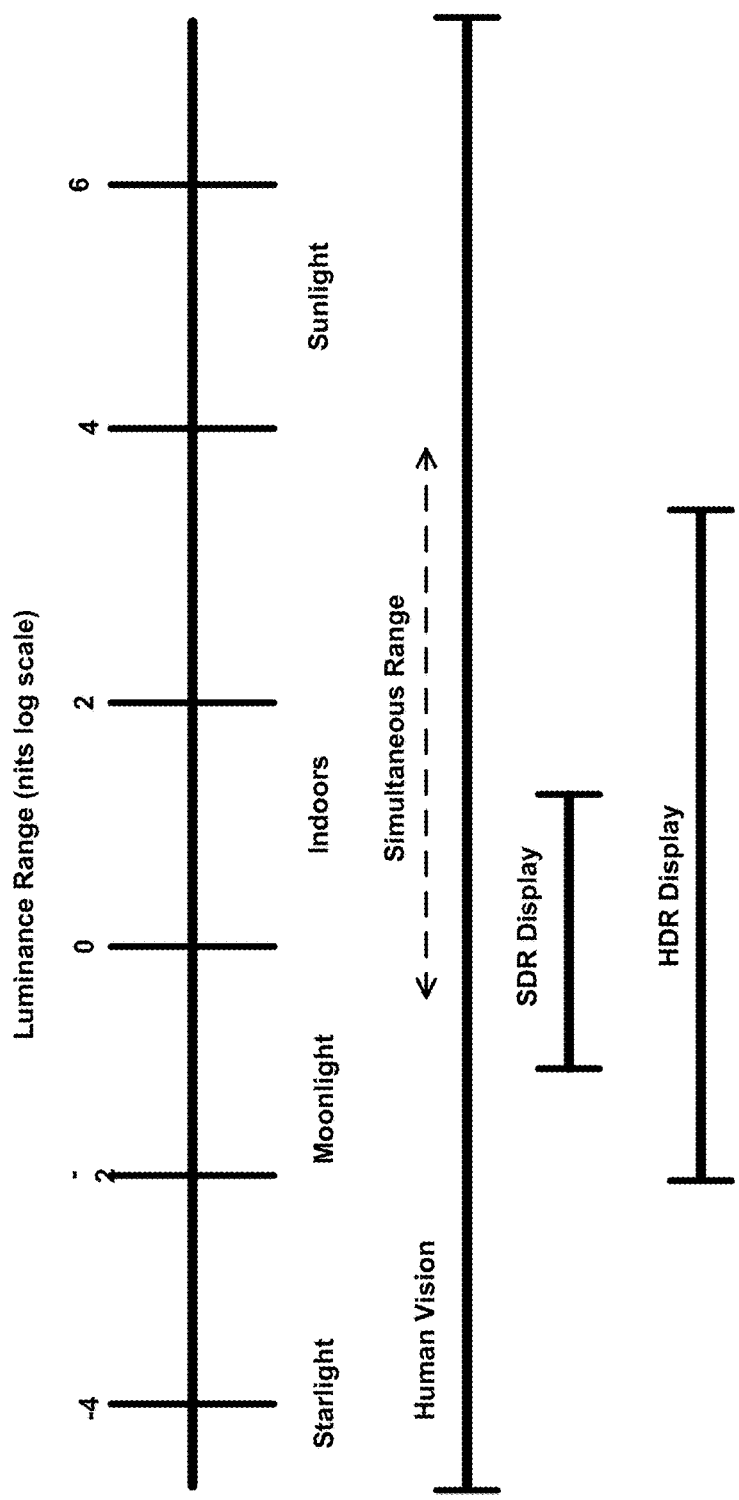
FIG. 2 is a drawing illustrating the concepts of high dynamic range (HDR) data.

Dynamic range is typically defined as the ratio between the minimum and maximum brightness of the video signal. Dynamic range may also be measured in terms of 'f-stop,' where one f-stop corresponds to a doubling of the signal dynamic range. In MPEG's definition, HDR content is such content that features brightness variation with more than 16 f-stops. In some terms, levels between 10 and 16 f-stops are considered as intermediate dynamic range, but may be considered HDR in other definitions. In some examples, HDR video content may be any video content that has a higher dynamic range than traditionally used video content with a standard dynamic range (e.g., video content as specified by ITU-R Rec. BT. 709). At the same time, the human visual system (HVS) is capable for perceiving much larger dynamic range. However, the HVS includes an adaptation mechanism to narrow a so-called simultaneous range. Visualization of dynamic range provided by SDR of HDTV, expected HDR of UHDTV and HVS dynamic range is shown in FIG. 2.

Current video applications and services are regulated by Rec.709 and provide SDR, typically supporting a range of brightness (or luminance) of around 0.1 to 100 candelas (cd) per m2 (often referred to as "nits"), leading to less than 10 f-stops. The next generation video services are expected to provide dynamic range of up-to 16 f-stops. Although detailed specification is currently under development, some initial parameters have been specified in SMPTE-2084 and Rec. 2020.

Figure 3:
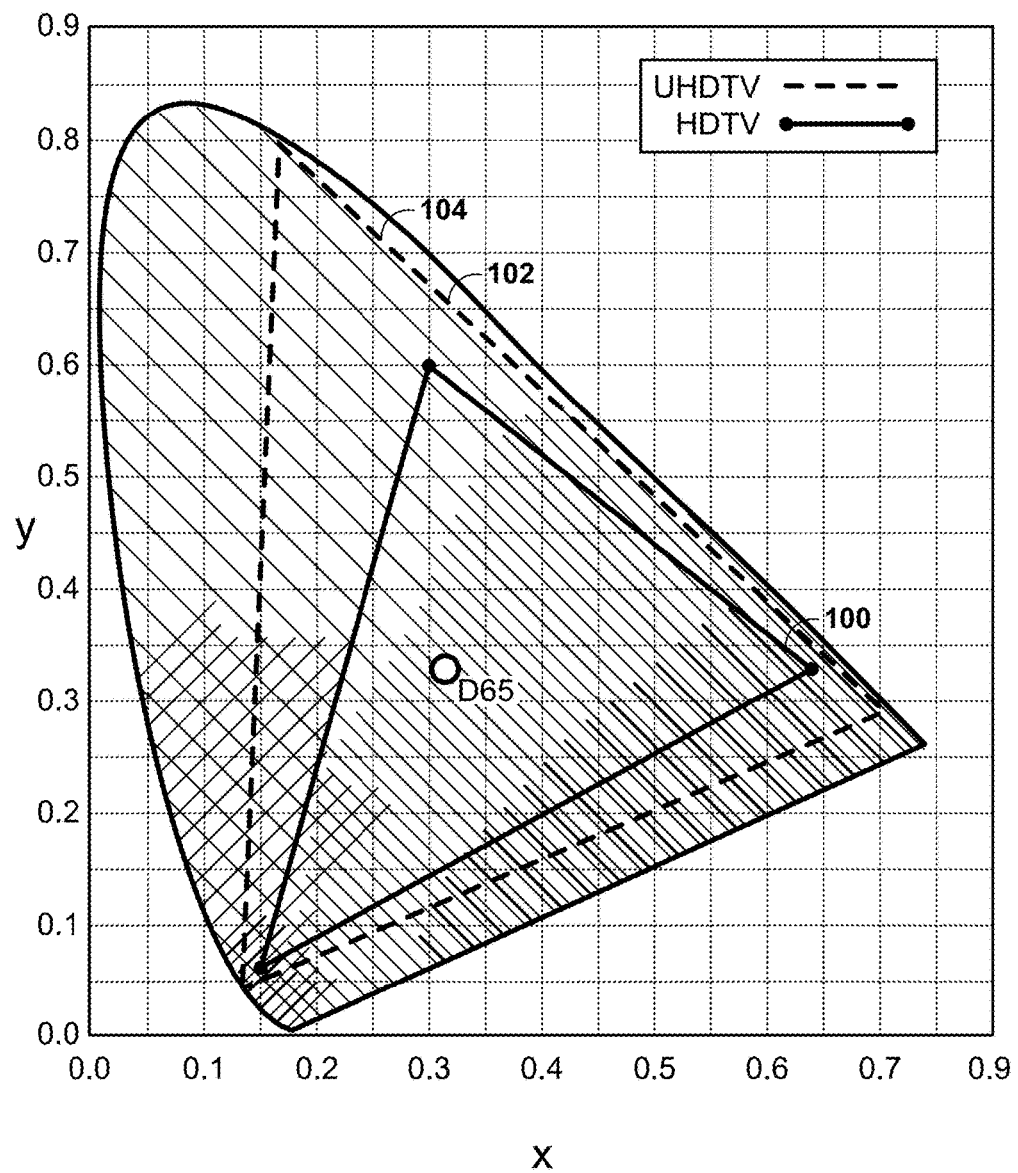
FIG. 3 is a conceptual diagram comparing of color gamuts of video signal of high definition television (HDTV) (BT.709) and ultra high definition television (UHDTV) (BT.2020).

Another aspect for a more realistic video experience besides HDR is the color dimension, which is conventionally defined by the color gamut. FIG. 3 is a conceptual diagram showing an SDR color gamut (triangle based on the BT.709 color red, green and blue color primaries), and the wider color gamut for UHDTV (triangle based on the BT.2020 color red, green and blue color primaries). FIG. 3 also depicts the so-called spectrum locus (delimited by the tongue-shaped area), representing limits of the natural colors. As illustrated by FIG. 3, moving from BT.709 to BT.2020 color primaries aims to provide UHDTV services with about 70% more colors. D65 specifies the white color for given specifications (e.g., BT.709 and/or BT.2020 specifications).

A few examples of color gamut specifications are shown in Table 1.

TABLE 1

Color gamut parameters
RGB color space parameters

| Color space | White point | | Primary colors | | | | | |
|---|---|---|---|---|---|---|---|---|
| | $xx_W$ | $yy_W$ | $xx_R$ | $yy_R$ | $xx_G$ | $yy_G$ | $xx_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As can be seen in Table 1, a color gamut may be defined by the X and Y values of a white point, and by the X and Y values of the primary colors (e.g., red (R), green (G), and blue (B). The X and Y values represent the chromaticity (X) and the brightness (Y) of the colors, as is defined by the CIE 1931 color space. The CIE 1931 color space defines the links between pure colors (e.g., in terms of wavelengths) and how the human eye perceives such colors.

HDR/WCG is typically acquired and stored at a very high precision per component (even floating point), with the 4:4:4 chroma format and a very wide color space (e.g., CIE 1931 XYZ color space). This representation targets high precision and is (almost) mathematically lossless. However, this format feature may include a lot of redundancies and is not optimal for compression purposes. A lower precision format with HVS-based assumption is typically utilized for state-of-the-art video applications.

Typical video data format conversion for purposes of compression consists of three major processes, as shown in FIG. 4. The techniques of FIG. 4 may be performed by video preprocessor 19. Linear RGB data 110 may be HDR/WCG video data and may be stored in a floating point representation. Linear RGB data 110 may be compacted using a non-linear transfer function (TF) for dynamic range compacting. For instance, video preprocessor 19 may include a transfer function unit (TF) unit 112 configured to use a non-linear transfer function for dynamic range compacting.

The output of TF unit 112 may be a set of codewords, where each codeword represents a range of color values (e.g., illumination levels). The dynamic range compacting means that the dynamic range of the linear RGB data 110 may be a first dynamic range (e.g., human vision range as illustrated in FIG. 2). The dynamic range of the resulting codewords may be a second dynamic range (e.g., HDR display range as illustrated in FIG. 2). Therefore, the codewords capture a smaller dynamic range than linear RGB data 110, and hence, TF unit 112 performs dynamic range compacting.

Figure 7:
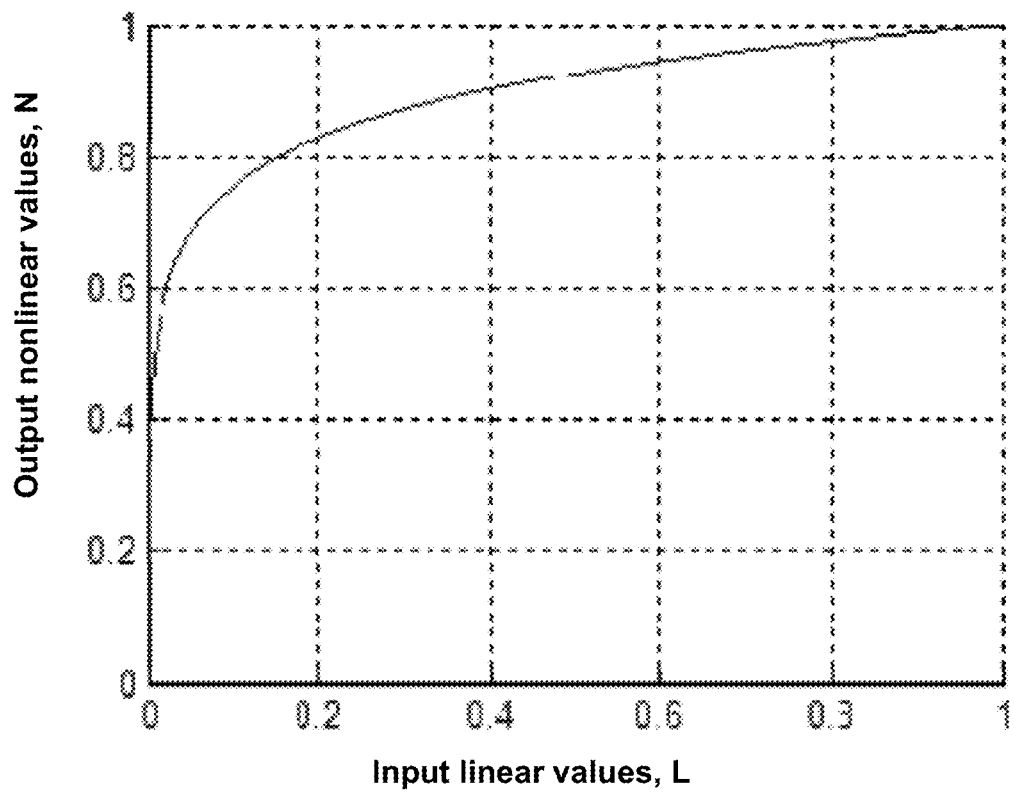
FIG. 7 is a conceptual diagram showing a visualization of output versus input for PQ TF (ST2084 EOTF).

TF unit 112 performs non-linear functions in the sense that the mapping between the codewords and the input color values is not equally spaced (e.g., the codewords are non-linear codewords). Non-linear codewords means that changes in the input color values do not manifest as linearly proportional changes in the output codewords, but as non-linear changes in the codewords. For example, if the color values represent low illumination, then small changes in the input color values would result in small changes in the codewords outputted by TF unit 112. However, if the color values represent high illumination, then relatively large changes in the input color values would be needed for small changes in the codewords. The range of illumination represented by each codeword is not constant (e.g., a first codeword is the same for a first range of illuminations and a second codeword is the same for a second range of illuminations, and the first and second ranges are different). FIG. 7, described below, illustrates the characteristic of the transfer function applied by TF unit 112.

As described in more detail, the techniques may scale and offset the linear RGB data 110 that TF unit 112 receives and/or scale and offset the codewords that TF unit 112 outputs to better utilize the codeword space. TF unit 112 may compact linear RGB data 110 (or scaled and offset RGB data) using any number of non-linear transfer functions (e.g., the PQ (perceptual quantizer) TF as defined in SMPTE-2084).

In some examples, color conversion unit 114 converts the compacted data into a more compact or robust color space (e.g., in YUV or YCrCb color space via a color conversion unit) that is more suitable for compression by video encoder 20. As described in more detail, in some examples, prior to color conversion unit 114 performing color conversion, the techniques may scale and offset the codewords that are outputted by the application of the TF by TF unit 112. Color conversion unit 114 may receive these scaled and offset codewords. In some examples, some scaled and offset codewords may be greater than or less than respective thresholds; for these, the techniques may assign a respective set codewords.

This data is then quantized using a floating-to-integer representation conversion (e.g., via a quantization unit 116) to produce the video data (e.g., HDR data 118) that is transmitted to video encoder 20 to be encoded. In this example HDR data 118 is in an integer representation. HDR data 118 may be now in a format more suitable for compression by video encoder 20. It should be understood that the order of the processes depicted in FIG. 4 is given as an example, and may vary in other applications. For example, color conversion may precede the TF process. In addition, video preprocessor 19 may apply more processing (e.g., spatial subsampling) to the color components.

Accordingly, in FIG. 4, the high dynamic range of input RGB data 110 in linear and floating point representation is compacted with the utilized non-linear transfer function by TF unit 112, e.g. PQ TF as defined in SMPTE-2084, following which it is converted to a target color space (e.g., by color conversion unit 114) that is more suitable for compression, e.g. YCbCr, and then quantized (e.g., quantization unit 116) to achieve integer representation. The order of these elements is given as an example, and may vary in real-world applications, e.g., color conversion may precede the TF module (e.g., TF unit 112). Additional processing as such spatial subsampling may be applied to color components prior to TF unit 112 applying the transfer function.

The inverse conversion at the decoder side is depicted in FIG. 5. The techniques of FIG. 5 may be performed by video postprocessor 31. For example, video postprocessor 31 receives video data (e.g., HDR data 120) from video decoder 30 and inverse quantization unit 122 may inverse quantize the data, inverse color conversion unit 124 performs inverse color conversion, and inverse non-linear transfer function unit 126 performs inverse non-linear transfer to produce linear RGB data 128.

The inverse color conversion process that inverse color conversion unit 124 performs may be the inverse of the color conversion process that color conversion unit 114 performed. For example, the inverse color conversion unit 124 may convert the HDR data from a YCrCb format back to an RGB format. Inverse transfer function unit 126 may apply the inverse transfer function to the data to add back the dynamic range that was compacted by TF unit 112 to recreate the linear RGB data 128.

In the example techniques described in this disclosure, prior to the inverse transfer function unit 126 performing inverse transfer function, video postprocessor 31 may apply inverse post-processing and, after inverse transfer function unit 126 performs the inverse transfer function, may apply inverse pre-processing. For example, as described above, in some examples, video preprocessor 19 may apply pre-processing (e.g., scaling and offsetting) prior to TF unit 112 and may apply post-processing (e.g., scaling and offsetting) after TF unit 112. To compensate for the pre- and post-processing, video postprocessor 31 may apply the inverse post-processing prior to inverse TF unit 126 performing inverse transfer function and inverse pre-processing after inverse TF unit 126 performs inverse transfer function. Applying both pre- and post-processing and inverse post- and inverse pre-processing are optional. In some examples, video preprocessor 19 may apply one, but not both of, pre- and post-processing, and for such examples, video postprocessor 31 may apply the inverse of the processing applied by video preprocessor 19.

Figure 6:
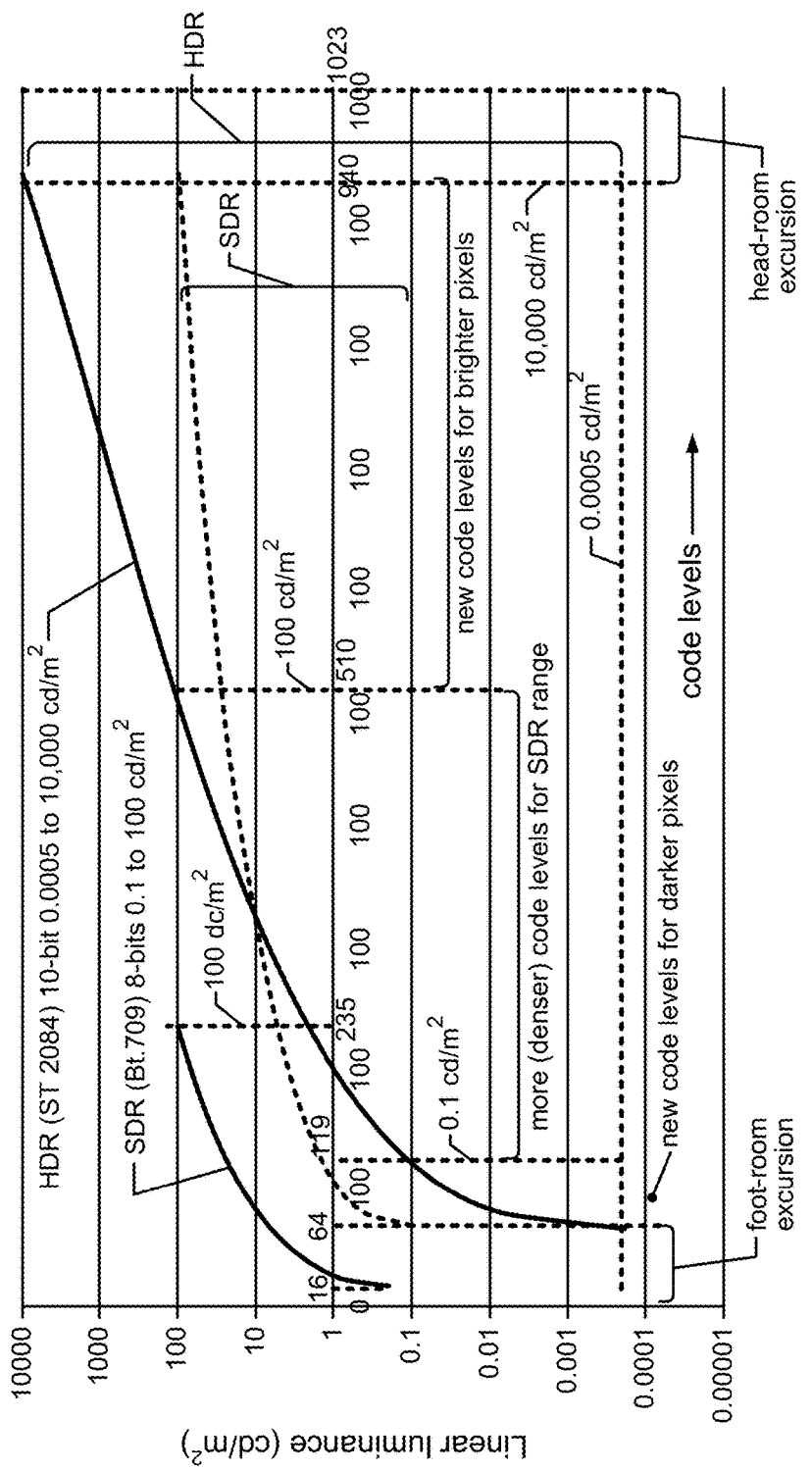
FIG. 6 is conceptual diagram showing example transfer functions.

The example video preprocessor 19 illustrated in FIG. 4 is described in further detail, with the understanding that the example video postprocessor 31 illustrated in FIG. 5 performs the general reciprocal. A transfer function is applied to the data (e.g., HDR/WCG RGB video data) to compact its dynamic range and make it possible to represent the data with a limited number of bits. These limited number of bits that represent the data are referred to as codewords. This function is typically a one-dimensional (1D) non-linear function either reflecting inverse of electro-optical transfer function (EOTF) of the end-user display as specified for SDR in Rec.709 or approximating the HVS perception to brightness changes as for PQ TF specified in SMPTE-2084 for HDR. The inverse process (e.g., as performed by video postprocessor 31) of the OETF is the EOTF (electro-optical transfer function), which maps the code levels back to luminance. FIG. 6 shows several examples of non-linear TFs. These transfer functions may also be applied to each R, G and B component separately.

In the context of this disclosure, the terms "signal value" or "color value" may be used to describe a luminance level corresponding to the value of a specific color component (such as R, G, B, or Y) for an image element. The signal value is typically representative of a linear light level (luminance value). The terms "code level," "digital code value," or "codeword" may refer to a digital representation of an image signal value. Typically, such a digital representation is representative of a nonlinear signal value. An EOTF represents the relationship between the nonlinear signal values provided to a display device (e.g., display device 32) and the linear color values produced by the display device.

Specification of ST2084 defined the EOTF application as following. TF is applied to normalized linear R, G, B values, which results in nonlinear representation of R'G'B'. ST2084 defines normalization by NORM=10000, which is associated with a peak brightness of 10000 nits (cd/m2).

$$R' = PQ\_TF(\max(0, \min(R/NORM, 1))) \quad (1)$$
$$G' = PQ\_TF(\max(0, \min(G/NORM, 1))) \quad (1)$$
$$B' = PQ\_TF(\max(0, \min(B/NORM, 1)))$$

$$\text{with } PQ\_TF(L) = \left(\frac{c_1 + c_2 L^{m_1}}{1 + c_3 L^{m_1}}\right)^{m_2}$$

-continued $$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

With input values (linear color value) on the x axis normalized to range 0 . . . 1 and normalized output values (nonlinear color value) on the y axis, PQ EOTF is visualized in FIG. 7. As it is seen from the curve in FIG. 7, 1 percent (low illumination) of dynamical range of the input signal is converted to 50% of dynamical range of output signal.

There are a finite number of codewords that can be used to represent the input linear color values. FIG. 7 illustrates that for the PQ EOTF approximately 50% of the available codewords are dedicated to low illumination input signals, leaving fewer available codewords for higher illumination input signals. Therefore, slight changes in relatively high illumination input signals may not be captured because there are insufficient codewords to represent these slight changes. However, there may be an unnecessarily large number of available of codewords for low illumination input signals, meaning that even the very slightest change in relatively low illumination input signals can be represented by different codewords. Accordingly, there may be a large distribution of available codewords for low illumination input signals and a relatively low distribution of available codewords for high illumination input signals.

Typically, EOTF is defined as a function with a floating point accuracy. Thus, no error is introduced to a signal with this non-linearity if an inverse TF, i.e., so called OETF, is applied. Inverse TF (OETF) specified in ST2084 is defined as the inversePQ function:

$$R = 10000 * \text{inversePQ\_TF}(R') \quad (2)$$
$$G = 10000 * \text{inversePQ\_TF}(G')$$
$$B = 10000 * \text{inversePQ\_TF}(B')$$

$$\text{with inversePQ\_TF}(N) = \left(\frac{\max\left[\left(N^{\frac{1}{m_2}} - c_1\right), 0\right]}{c_2 - c_3 N^{\frac{1}{m_2}}}\right)^{\frac{1}{m_1}}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

With floating point accuracy, sequential application of EOTF and OETF provides a perfect reconstruction without errors. However, this representation is not optimal for streaming or broadcasting services. More compact representation with fixed bits accuracy of nonlinear R'G'B' data is described below. Note, that EOTF and OETF are subjects of very active research currently, and the TF utilized in some HDR video coding systems may be different from ST2084.

For HDR, other transfer functions are also under consideration. Examples include Philips TF or BBC Hybrid "Log-Gamma" TF. BBC Hybrid "Log-Gamma" TF is based on Rec 709 TF for SDR backwards compatibility. In order to extend the dynamic range, the BBC Hybrid adds a third part to the Rec 709 curve at higher input luminance. The new portion of the curve is a logarithmic function.

The OETF defined in Rec 709 is:

$$V = \begin{cases} 4.5L, & 0 \leq L \leq 0.018 \\ 1.099L^{0.45} - 0.099, & 0.018 \leq L \leq 1 \end{cases}$$

where L is luminance of the image 0≤L≤1 and V is the corresponding electrical signal. In Rec 2020, the same equation is specified as:

$$E' = \begin{cases} 4.5E, & 0 \leq E \leq \beta \\ \alpha E^{0.45} - (\alpha - 1), & \beta \leq E \leq 1 \end{cases}$$

where E is voltage normalized by the reference white level and proportional to the implicit light intensity that would be detected with a reference camera color channel R, G, B. E is the resulting non-linear signal.

α=1.099 and β=0.018 for 10-bit system
α=1.0993 and β=0.0181 for 12-bit system

Although not explicitly stated α and β are the solution to the following simultaneous equations:

$$4.5\beta = \alpha\beta^{0.45} - (\alpha - 1)$$

$$4.5 = 0.45\alpha\beta^{-0.55}$$

The first equation is the evening of the values of a linear function and the gamma function at E=β, and the second is the gradient of the two functions also at E=β.

Figure 27:
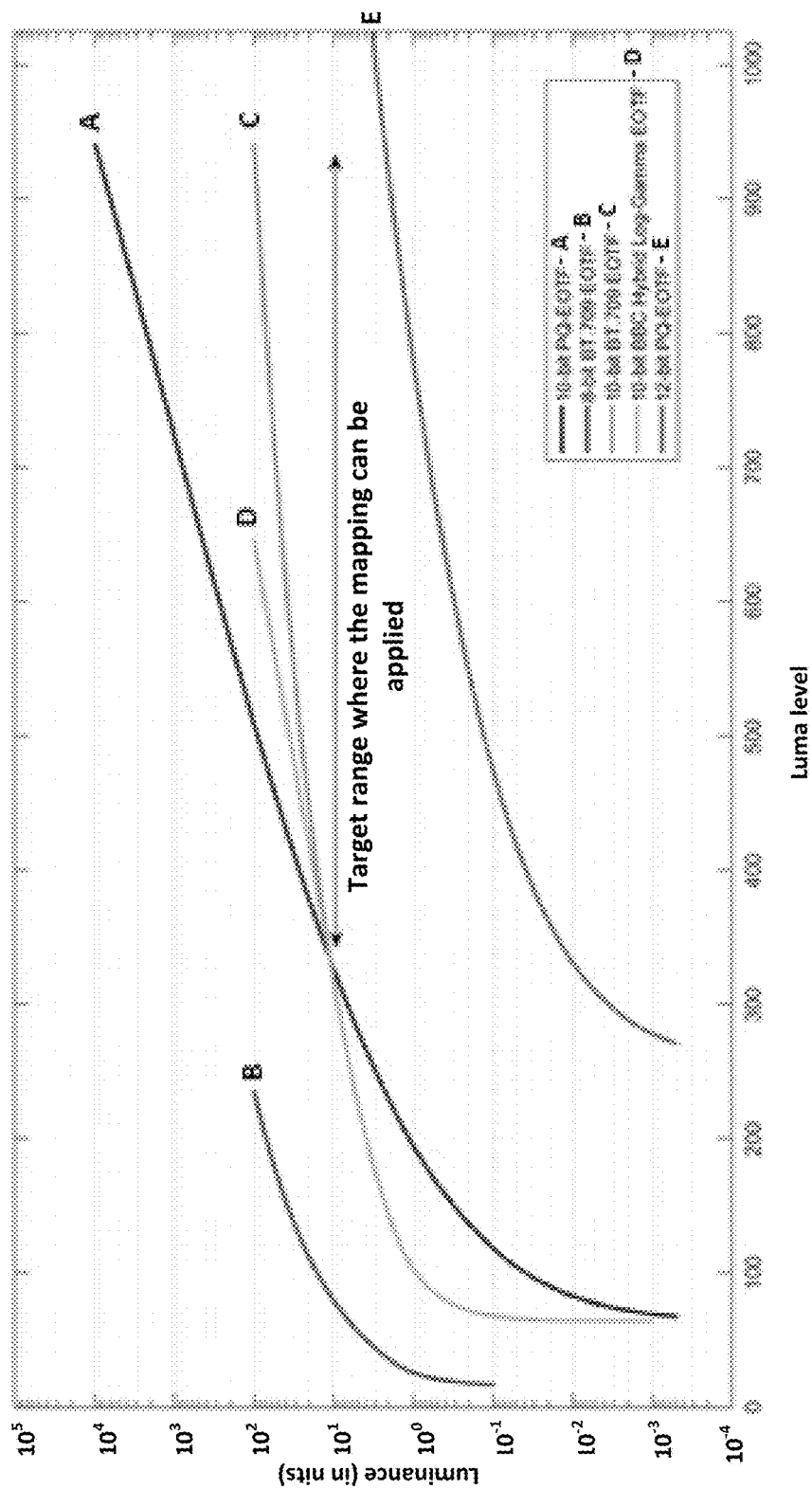
FIG. 27 illustrates a hybrid Log-Gamma transfer function and the potential target range as an example.

The additional part in hybrid "Log-Gamma" is shown below and FIG. 27 illustrates the OETF. For example, FIG. 27 shows the hybrid Log-Gamma transfer function and the potential target range as an example.

$$V = \begin{cases} 4.5L, & 0 \leq L \leq \beta \\ \alpha E^{0.45} - (\alpha - 1), & \beta \leq L \leq \mu \\ \eta \ln(L) + \rho, & L > \mu \end{cases}$$

In FIG. 27, respective curves are marked with A, B, C, D, and E to match respective legends in the lower right box of the graph. In particular, A corresponds to 10-bit PQ-EOTF, B corresponds to 8-bit BT.709 EOTF, C corresponds to 10-bit BT.709 EOTF, D corresponds to 10-bit BBC Hybrid Log-Gamma EOTF, and E corresponds to 12-bit PQ-EOTF.

Figure 28:
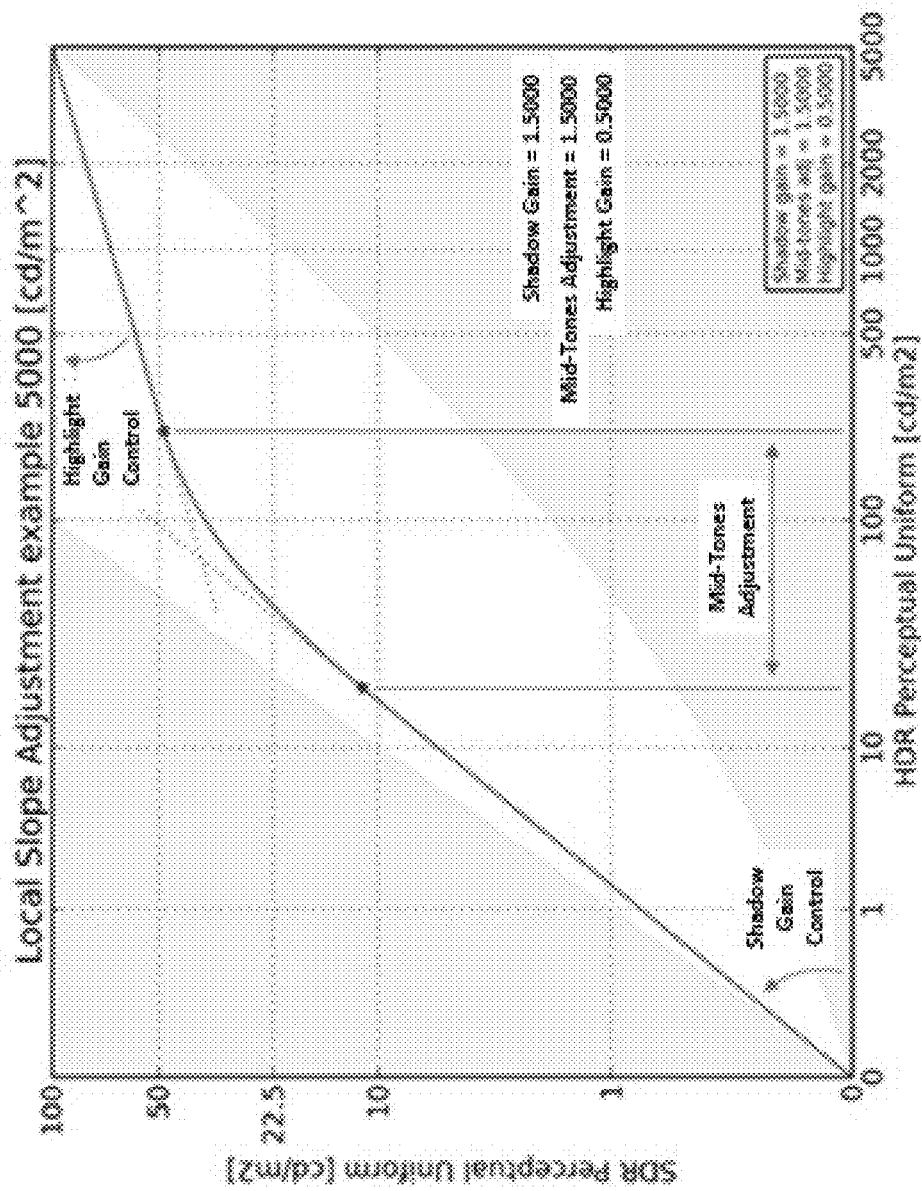
FIG. 28 illustrates a transfer function where the slope of the parabola around the knee point is adjustable.

FIG. 28 illustrates a transfer function where the slope of the parabola around the knee point is adjustable. FIG. 28 is illustrated as merely one example with slope adjustment example 5000 [cd/m²]. However, other examples of the transfer function with adjustable slope are possible.

RGB data is typically utilized as input, since it is produced by image capturing sensors. However, this color space has high redundancy among its components and is not optimal for compact representation. To achieve more compact and more robust representation, RGB components are typically converted to a more uncorrelated color space (i.e., a color transform is performed) that is more suitable for compression, e.g. YCbCr. This color space separates the brightness in the form of luminance and color information in different un-correlated components.

For modern video coding systems, a typically used color space is YCbCr, as specified in ITU-R BT.709 or ITU-R BT.709. The YCbCr color space in the BT.709 standard specifies the following conversion process from R'G'B' to Y'CbCr (non-constant luminance representation):

$$Y' = 0.2126 * R' + 0.7152 * G' + 0.0722 * B' \qquad (3)$$

$$Cb = \frac{B' - Y'}{1.8556} \qquad (3)$$

$$Cr = \frac{R' - Y'}{1.5748}$$

The above can also be implemented using the following approximate conversion that avoids the division for the Cb and Cr components:

$$Y' = 0.212600 * R' + 0.715200 * G' + 0.072200 * B'$$

$$Cb = -0.114572 * R' - 0.385428 * G' + 0.500000 * B'$$

$$Cr = 0.500000 * R' - 0.454153 * G' - 0.045847 * B' \qquad (4)$$

The ITU-R BT.2020 standard specifies the following conversion process from R'G'B' to Y'CbCr (non-constant luminance representation):

$$Y' = 0.2627 * R' + 0.6780 * G' + 0.0593 * B' \qquad (5)$$

$$Cb = \frac{B' - Y'}{1.8814}$$

$$Cr = \frac{R' - Y'}{1.4746}$$

The above can also be implemented using the following approximate conversion that avoids the division for the Cb and Cr components:

$$Y' = 0.262700 * R' + 0.678000 * G' + 0.059300 * B'$$

$$Cb = -0.139630 * R' - 0.360370 * G' + 0.500000 * B'$$

$$Cr = 0.500000 * R' - 0.459786 * G' - 0.040214 * B' \qquad (6)$$

It should be noted, that both color spaces remain normalized. Therefore, for the input values normalized in the range 0 . . . 1, the resulting values will be mapped to the range 0 . . . 1. Generally, color transforms implemented with floating point accuracy provide perfect reconstruction, thus this process is lossless.

For quantization and/or fixed point conversion, the processing stages described above are typically implemented in floating point accuracy representation; thus they may be considered as lossless. However, this type of accuracy can be considered as redundant and expensive for most of consumer electronics applications. To such services, input data in a target color space is converted to a target bit-depth fixed point accuracy. Certain studies show that 10-12 bits accuracy in combination with the PQ TF is sufficient to provide HDR data of 16 f-stops with distortion below the Just-Noticeable Difference. Data represented with 10 bits accuracy can be further coded with most of the state-of-the-art video coding solutions. This conversion process includes signal quantization and is an element of lossy coding and is a source of inaccuracy introduced to converted data.

An example of such quantization applied to code words in target color space, in this example, YCbCr, is shown below. Input values YCbCr represented in floating point accuracy are converted into a signal of fixed bit-depth BitDepthY for the Y value and BitDepthC for the chroma values (Cb, Cr).

$$D_Y = Clip1_Y(Round((1<<(BitDepth_Y-8))*(219*Y'+16)))$$

$$D_{Cb} = Clip1_C(Round((1<<(BitDepth_C-8))*(224*Cb+128)))$$

$$D_{Cr} = Clip1_C(Round((1<<(BitDepth_C-8))*(224*Cr+128))) \quad (7)$$

with
Round(x)=Sign(x)*Floor(Abs(x)+0.5)
Sign (x)=−1 if x<0, 0 if x=0, 1 if x>0
Floor(x) the largest integer less than or equal to x
Abs(x)=x if x>=0, −x if x<0
$Clip1_Y(x)$=Clip3(0, (1<<$BitDepth_Y$)−1, x)
$Clip1_C(x)$=Clip3(0, (1<<$BitDepth_C$)−1, x)
Clip3(x,y,z)=x if z<x, y if z>y, z otherwise Some techniques may not be well suited for HDR and WCG video data. Most of the currently publicly available EOTF for purposes of HDR video systems, such as PH, Phillips, and BBC, are static, content independent 1D transfer functions which are applied to R, G and B components independently and do not take into consideration HDR video spatio-temporal statistics or local brightness level. In terms of such EOTF utilization in HDR video coding system, such an approach would lead to a non-optimal bit allocation for provided visual quality of HDR video content.

A second problem of the currently utilized HDR processing pipeline is a static conversion of nonlinear codewords in a target color space from floating point accuracy representation to representation. Typically, codeword space is fixed and temporally and spatially varying HDR content would not get optimal representation. This following provides more details on these two problems.

With respect to non-optimality of static 1D EOTF, EOTF defined in ST2084 specifies a static, content independent 1D transfer function denoted as PQ TF which is presumably based on perceptual sensitivity of Human Visual System (HVS) at the particular level of the brightness (number of cd/m2). Despite the fact that most studies define HVS perceptual sensitivity for brightness in cd/m2, PQ TF is applied to each of color values R, G and B independently, as in Equation 1 (e.g., to determine R', G', and B') and does not utilize brightness intensity of this RGB pixel. This results in possible inaccuracy of PQ TF in approximation of HVS sensitivity in nonlinearity of resulting R'G'B', e.g., a combination of R'G'B' color values may result in different level of brightness which should have been associated with another PQ TF value compared to what was applied to each of the R, G, B components independently.

Moreover, due to this design intent, PQ TF combines sensitivity of HVS in two modes: so-called night photopic vision and scotopic (so called night) vision. The latter vision comes in play when brightness of the scene is below 0.03 cd/m2 and features much higher sensitivity at the cost of reduction of color perception. To enable high sensitivity, utilized PQ TF provides larger amount of codewords to low illuminance values, as is reflected in FIG. 7. Such codewords distribution may be optimal if brightness of the picture is low HVS and would operate in night vision mode. For example, such codewords distribution may be optimal if the codewords will be sensitive to minor changes in brightness. However, typical HDR pictures may feature bright scenery and dark noisy fragments which would not affect visual quality due to masking from nearest bright samples but would greatly contribute to a bitrate with current static TF.

With respect to inefficient utilization of codeword space, quantization of nonlinear codewords (Y', Cb, Cr) represented in floating point accuracy and their representation with fixed number of bits as shown in Equation (7) ($D_{Y'}$, $D_{Cb}$, $D_{Cr}$) is the major compression tool of HDR pipeline. Typically, dynamical range of the input signal before quantization is less than 1.0, and belong to the range within 0 . . . 1 for Y component, and the range −0.5 . . . 0.5 for Cb and Cr component.

However, actual distribution of HDR signal varies from frame to frame; thus, quantization as shown in Equation (7) would not provide a minimal quantization error, and can be improved by adjusting dynamic range of HDR signal to match the anticipated range equal to 1.0.

Figure 8:
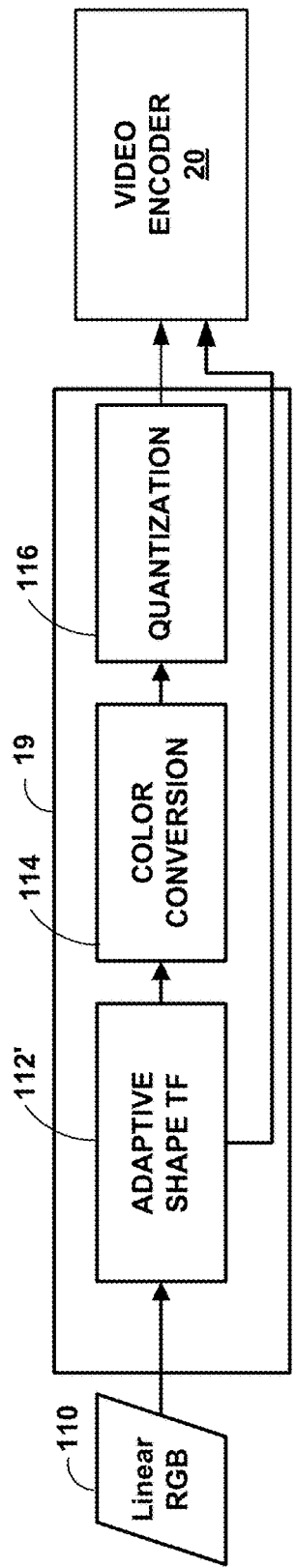
FIG. 8 is a conceptual diagram showing a content-adaptive HDR processing pipeline (encoder side) with adaptive shape transfer function (TF).

To address the problem described above, the following solutions can be considered. EOTF may be defined as a dynamical, content adaptive transfer function with a shape being changed up-to content properties, e.g., at the frame-level basis, as illustrated in FIG. 8. FIG. 8 illustrates a content adaptive HDR processing pipeline (encoder side) with adaptive shape TF unit 112'. For instance, FIG. 8 illustrates another example of video preprocessor 19, which includes an adaptive shape TF function that is utilized by the TF unit.

The components of FIG. 8 generally conform to the components of FIG. 4. In the example of FIG. 8, components having the same reference numerals as those of the example in FIG. 4 are the same. However, in FIG. 8, an adaptive TF unit 112' applies an adaptive TF instead of TF unit 112 applying a static TF, as illustrated in FIG. 4. In this example, the manner in which adaptive TF unit 112' performs data compaction is adaptive and can change based on the video content. Although the corresponding video postprocessor 31 is not illustrated, such an example video postprocessor 31 would perform an adaptive inverse transfer function rather than the static inverse transfer function of inverse transfer function unit 126 of FIG. 5. Video preprocessor 19 would output information indicating parameters that TF unit 112' uses to adapt the TF. Video postprocessor 31 would receive such information indicating the parameters used by TF unit 112' to adapt the adaptive inverse transfer function accordingly.

However, this technique may require extensive signaling of parameters of transfer function adaptation as well as implementation supporting this adaptivity, e.g., storing multiple Lookup Tables or implementation branches. Moreover, certain aspects of non-optimality of PQ EOTF may be resolved through a 3D transfer function. Such approaches may be too expensive for certain implementations and for signaling cost.

In this disclosure, signaling refers to the output of syntax elements or other video data that is used to decode or otherwise reconstruct the video data. The signaled parameters may be stored for later retrieval by destination device 14 or may be transmitted directly to destination device 14.

This disclosure describes a content adaptive HDR video system employing static fixed Transfer Function (TF). This disclosure describes keeping a static TF in the pipeline, but adapting signal characteristics to a fixed processing flow. This can be achieved by adaptive processing of the signal which is either to be processed by TF, or the signal which resulted from application of the TF. Certain techniques may combine both of these adaptation mechanisms. At the decoder (e.g., video postprocessor 31), an adaptive process, inverse to what is applied at the encoder side (e.g., video preprocessor 19) would be applied.

Figure 9:
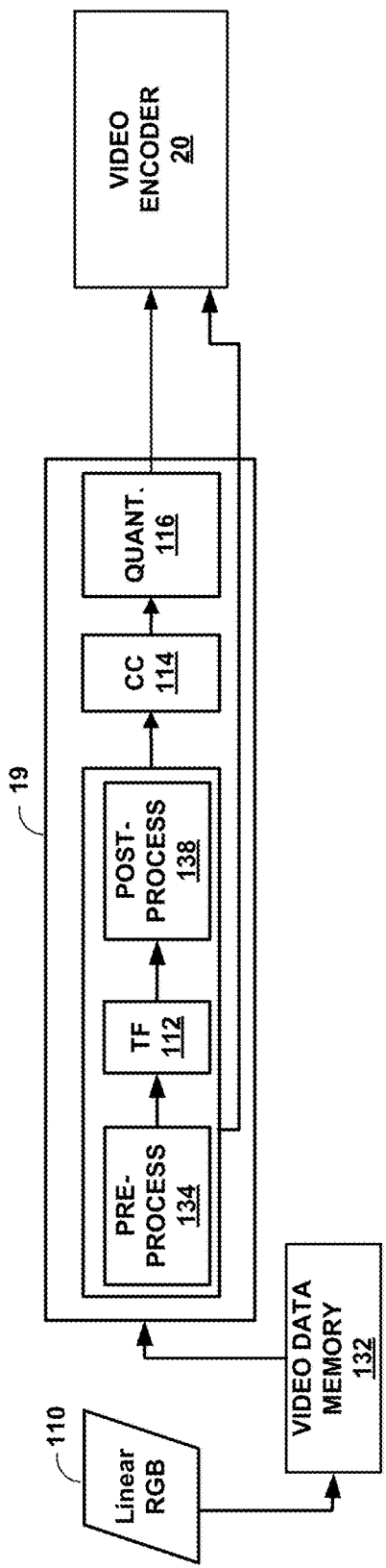
FIG. 9 is a conceptual diagram showing a content-adaptive HDR processing pipeline (encoder side) with fixed TF.

FIG. 9 is a conceptual diagram showing a content-adaptive HDR processing pipeline (encoder side) with fixed TF. As illustrated video preprocessor 19 includes pre-processing unit 134, also referred to as dynamic range adjustment (DRA1), TF unit 112, post-processing unit 138, also referred to as DRA2, color conversion unit 114, and quantization unit 116.

In the illustrated example, video preprocessor 19 may be configured as fixed-function and programmable circuitry. For example, video preprocessor 19 may include transistors, capacitors, inductors, passive and active components, arithmetic logic units (ALUs), elementary function units (EFUs), and the like that together or separately form pre-processing unit 134, TF unit 112, post-processing unit 138, color conversion unit 114, and quantization unit 116. In some examples, video preprocessor 19 includes a programmable core that executes instructions that cause pre-processing unit 134, TF unit 112, post-processing unit 138, color conversion unit 114, and quantization unit 116 to perform their respective functions. In such examples, video data memory 132, or some other memory, may store the instructions that are executed by video preprocessor 19.

In FIG. 9, for ease of understanding, a video data memory 132 is also illustrated. For instance, video data memory 132 may temporally store video data prior to video preprocessor 19 receiving the video data. As another example, any video data the video preprocessor 19 outputs may temporarily be stored in video data memory 132 (e.g., store in video data memory before being outputted to video encoder 20). Video data memory 132 may be part of video preprocessor 19 or may be external to video preprocessor 19.

The video data stored in video data memory 132 may be obtained, for example, from video source 18. Video data memory 132 may be formed by any of a variety of memory devices, such as dynamic random access memory (DRAM), including synchronous DRAM (SDRAM), magnetoresistive RAM (MRAM), resistive RAM (RRAM), or other types of memory devices. In various examples, video data memory 132 may be on-chip with other components of video preprocessor 19, or off-chip relative to those components.

As described in more detail below, pre-processing unit 134 (e.g., DRA1) pre-processes linear RBG data 110 prior to static transfer function unit 112 applying a static transfer function. Part of the pre-processing includes scaling and offsetting (e.g., multiplying the input value by a factor to scale and add a value to offset). In some examples, pre-processing unit 134 pre-processes the video data based on the video content (e.g., the scaling factor and the offset factor are based on the video content). TF unit 112 then applies the transfer function to the scaled and offset input values to generate a plurality of codewords. In this example, TF unit 112 applies a static transfer function that compacts the dynamic range of the input values so that the generated plurality of codewords represent colors in a smaller dynamic range than the input color values (e.g., linear RGB data 110).

Post-processing unit 136 (e.g., DRA2) performs post-processing functions on the codewords generated by the TF unit 112. For example, the output of TF unit 112 may be non-linear codewords that represent the color values. Post-processing unit 136 may also scale and offset the codewords outputted by TF unit 112. Color conversion unit 114 performs color conversion on the output of post-processing unit 138 (e.g., conversion from RGB to YCrCb), and quantization unit 116 performs quantization on the output of color conversion unit 114.

By pre-processing linear RGB data 110, pre-processing unit 134 may be configured to scale and offset the linear RGB data 110 such that although TF unit 112 applies a static transfer function, the input to TF unit 112 is adjusted such that there is more linearity in the output codewords of TF unit 112. Further, by pre-processing linear RGB data 110, pre-processing unit 134 may use the video content to select scaling and offset parameters that account for the spatio-temporal statistics or local brightness level.

There may be various ways in which pre-processing unit 134 may determine the scaling and offset parameters. As one example, pre-processing unit 134 may determine a histogram of each of the colors in the picture (e.g., determine a histogram for red, a histogram for green, and a histogram for blue). The histogram indicates how many pixels of a particular color are of a particular illumination level. Pre-processing unit 134 may be pre-programmed with a mathematical representation of the transfer function that TF unit 112 is to apply so that pre-processing unit 134 can scale and offset the color values to increase the linearity of the codewords that TF unit 112 outputs.

Pre-processing unit 134 may normalize the histogram of the input signal over a limited span [hist_min . . . hist_max] over the full dynamic range [0 . . . 1] of the allowed codeword space of the input signal. Pre-processing unit 134 may determine the scale and offset parameters that are to be applied to the input signal by stretching horizontally a histogram of each of the color values and determining the offset and scale based on the stretched histogram. For example, the equation for determining the offset and scale may be:

$$\text{Offset1} = -\text{hist\_min}$$

$$\text{Scale1} = 1/(\text{hist\_max} - \text{hist\_min})$$

Pre-processing unit 134 may determine the offset and scale parameters for each of the colors using the equations for Offset1 and Scale1, and apply the offset1 and scale1 parameters as described in more detail to scale and offset the color values. There may be various other ways in which pre-processing unit 134 determines the offset and scale parameters for pre-processing, and the above equations are provided as one example.

Post-processing unit 138 may determine the offset and scale parameters in a similar way, except that post-processing unit 138 applies determining the offset and scale parameters on color codewords. For example, post-processing unit 138 may determine a histogram of each of the codewords that TF unit 112 outputs. Post-processing unit 138 may normalize the histogram of the codewords over a limited span [hist_min . . . hist_max] over the full dynamic range [0 . . . 1] of the allowed codeword space. Post-processing unit 138 may determine the scale and offset parameters that are to be applied to the codewords by stretching histogram of each of the codewords for each of the color values and determining the offset and scale based on the stretched histogram. For example, the equation for determining the offset and scale may be:

$$\text{Offset1} = -\text{hist\_min}$$

$$\text{Scale1} = 1/(\text{hist\_max} - \text{hist\_min})$$

Post-processing unit 138 may determine the offset and scale parameters for each of the colors using the equations for Offset2 and Scale2, and apply the offset2 and scale2 parameters as described in more detail to scale and offset the codewords. There may be various other ways in which pre-processing unit 138 determines the offset and scale parameters for post-processing, and the above equations are provided as one example.

Although color conversion unit 114 is illustrated as being subsequent to post-processing unit 138, in some examples, color conversion unit 114 may first convert the color from RGB to YCrCb. Post-processing unit 138 may perform operations on the YCrCb codewords. For the luma (Y) component, post-processing unit 138 may determine the scale and offset values using techniques similar to those described above. The following describes techniques for determining the scale and offset for the chroma components.

Post-processing unit 138 may determine scaling and offset parameters for Cb and Cr color components from colorimetry of the input video signal and target colorimetry of the output video signal. For example, consider a target (T) color container specified by primary coordinates (xXt, yXt), where X is stated for R, G, B color components:

$$primeT = \begin{bmatrix} xRt & yRt \\ xGt & yGt \\ xBt & yBt \end{bmatrix}$$

and native (N) color gamut specified by primaries coordinates (xXn, yXn), where X is stated for R, G, B color components:

$$primeN = \begin{bmatrix} xRn & xRn \\ xGn & yGn \\ xBn & yBn \end{bmatrix}$$

The white point coordinate for both gamuts equals whiteP=(xW,yW). DRA parameters estimation unit (e.g., post-processing unit 138) may derive the scale Cb and scale Cr for Cb and Cr color components as a function of the distances between primaries coordinates to the white point. One example of such an estimation is given below:

$rdT=\text{sqrt}((primeT(1,1)-whiteP(1,1))^2+(primeN(1,2)-whiteP(1,2))^2)$ $gdT=\text{sqrt}((primeT(2,1)-whiteP(1,1))^2+(primeN(2,2)-whiteP(1,2))^2)$ $bdT=\text{sqrt}((primeT(3,1)-whiteP(1,1))^2+(primeN(3,2)-whiteP(1,2))^2)$ $rdN=\text{sqrt}((primeN(1,1)-whiteP(1,1))^2+(primeN(1,2)-whiteP(1,2))^2)$ $gdN=\text{sqrt}((primeN(2,1)-whiteP(1,1))^2+(primeN(2,2)-whiteP(1,2))^2)$ $bdN=\text{sqrt}((primeN(3,1)-whiteP(1,1))^2+(primeN(3,2)-whiteP(1,2))^2)$ scale $Cb=bdT/bdN$ scale $Cr=\text{sqrt}((rdT/rdN)^2+(gdT/gdN)^2)$ Cb and Cr offset parameters for such embodiments may be set equal to 0: offset Cb=offset Cr=0

In some examples, color conversion unit 114 may convert RGB to YCrCb prior to pre-processing unit 134 applying pre-processing. For such examples, pre-processing unit 134 may perform similar operations as those described above for post-processing unit 138 for YCrCb values, expect on the input color values before TF unit 112 applies the transfer function.

Pre-processing unit 134 may determine the scale and offset factors based on the histogram to determine scale and offset factors that, when applied to the input color values, result in an output such that when TF unit 112 applies the transfer function the output of TF unit 112 is linear codewords (e.g., the range of color values represented by a codeword is relatively the same across the colors and codewords space). In some examples, post-processing unit 138 may apply scaling and offsetting to the codewords that TF unit 112 outputs. Post-processing unit 138 may modify the codewords to make better use of the range of available codewords. For example, the output of TF unit 112 may be codewords that do not utilize the entire codeword space. By spreading the codewords across the codeword space, signal to quantization noise ratio by quantization unit 116 may be improved.

Signal to quantization noise ratio typically reflects the relationship between the maximum nominal signal strength and the quantization error (also known as quantization noise): $SNR=E(x^2)/E(n^2)$, where $E(x^2)$ is power of the signal, $E(n^2)$ is power of the quantization noise, where ^ represents the exponent operation, E is energy and n is noise.

Multiplying the signal x with scaling parameters>1.0 would results in increase of the power of the signal, and thus would lead to an improved signal to quantization noise ratio: $SNR2=E((scale*x)^2)/E(n^2)>SNR$ Video encoder 20 receives the output of video preprocessor 19, encodes the video data the video preprocessor 19 outputs, and outputs the encoded video data for later decoding by video decoder 30 and processing by video postprocessor 31. In some examples, video encoder 20 may encode and signal information indicative of the scale and offset factors for one or both of pre-processing unit 134 and post-processing unit 138. In some examples, rather than encoding and signaling information indicative of the scale and offset factors, video preprocessor 19 may output information such as the histogram from which video postprocessor 31 determines the scale and offset factors. The information that video preprocessor 19 outputs that indicates the manner in which video data was pre-processed by pre-processing unit 134 or post-processed by post-processing unit 138 may be referred to as adaptive transfer function (ATF) parameters.

It should be understood that in various examples the transfer function applied by TF unit 112 is static (e.g., not content adaptive). However, the data that is outputted to TF unit 112 may be adapted (e.g., by pre-processing unit 134) and/or the data that TF unit 112 outputs may be adapted (e.g., by post-processing unit 138). In this way, video preprocessor 19 outputs codewords representing colors in a reduced dynamic range, as compared to the dynamic range of linear RGB data 110, where the output codewords are based on the video content. Accordingly, by adapting the input to TF unit 112 and the output of TF unit 112, the combination of pre-processing unit 134, TF unit 112, and post-processing unit 138 function as applying an adaptive transfer function.

Figure 10:
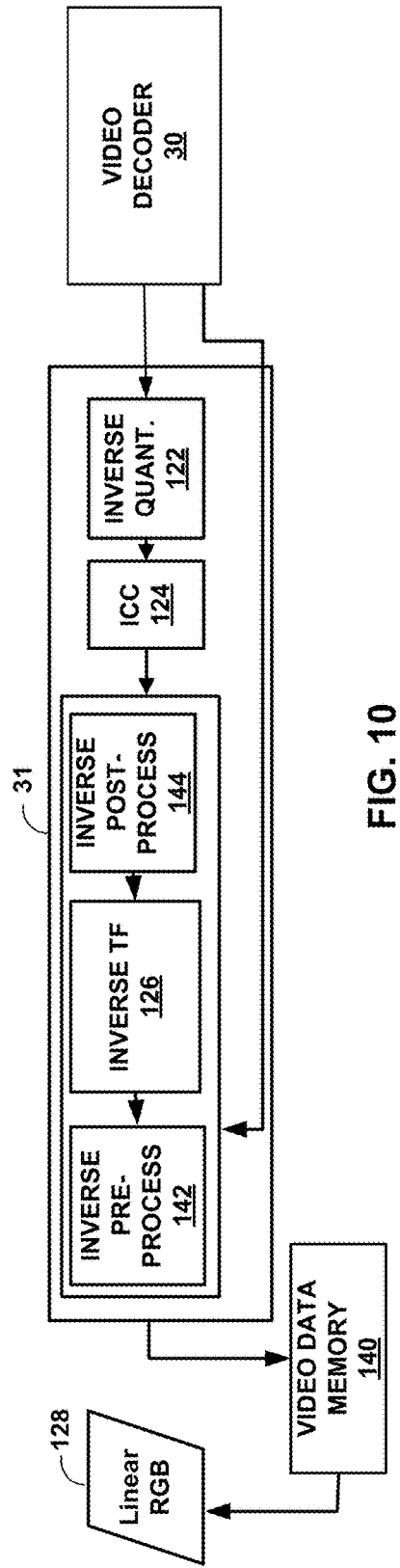
FIG. 10 is a conceptual diagram showing a content-adaptive HDR processing pipeline (decoder side) with fixed TF.

FIG. 10 is a conceptual diagram showing a content-adaptive HDR processing pipeline (decoder side) with fixed TF. As illustrated, video postprocessor 31 includes inverse quantization unit 122, inverse color conversion unit 124, inverse post-processing unit 144, inverse TF unit 126, and inverse pre-processing unit 142.

In the illustrated example, video postprocessor 31 may be configured as fixed-function and programmable circuitry. For example, video postprocessor 31 may include transistors, capacitors, inductors, passive and active components, arithmetic logic units (ALUs), elementary function units (EFUs), and the like that together or separately form inverse quantization unit 122, inverse color conversion unit 124, inverse post-processing unit 144, inverse TF unit 126, and inverse pre-processing unit 142. In some examples, video postprocessor 31 includes a programmable core that executes instructions that cause inverse quantization unit 122, inverse color conversion unit 124, inverse post-processing unit 144, inverse TF unit 126, and inverse pre-processing unit 142 to perform their respective functions. In such examples, video data memory 140, or some other memory, may store the instructions that are executed by video postprocessor 31.

In FIG. 10, for ease of understanding, a video data memory 140 is also illustrated. For instance, video data memory 140 may temporally store video data outputted by video postprocessor 31. As another example, any video data video decoder 30 outputs to video postprocessor 31 may temporarily be stored in video data memory 140 (e.g., store in video data memory before being received by video postprocessor 31). Video data memory 140 may be part of video postprocessor 31 or may be external to video postprocessor 31.

The video data stored in video data memory 140 may be outputted, for example, to display device 32. Video data memory 140 may be formed by any of a variety of memory devices, such as dynamic random access memory (DRAM), including synchronous DRAM (SDRAM), magnetoresistive RAM (MRAM), resistive RAM (RRAM), or other types of memory devices. In various examples, video data memory 140 may be on-chip with other components of video postprocessor 31, or off-chip relative to those components.

Video postprocessor 31 may be configured to perform the inverse process of video preprocessor 19. For example, video decoder 30 outputs to video postprocessor 31 decoded video data, which may be substantially similar to the video data that video preprocessor 19 outputted to video encoder 20. In addition, video decoder 30 may output adaptive transfer function (ATF) parameters to video postprocessor 31 to perform the inverse of the pre- and post-processing performed by video preprocessor 19.

Inverse quantization unit 122 receives the video data from video decoder 30 and performs the inverse operation of quantization unit 116. The output of inverse quantization unit 122 is un-quantized video data. Inverse color conversion unit performs the inverse operation as that of color conversion unit 114. For example, if color conversion unit 114 converted RGB color to YCrCb color, then inverse color conversion unit 124 converts YCrCb color to RGB color.

Inverse post-processing unit 144 may perform the inverse operations of post-processing unit 138. Inverse post-processing unit 144 receives codewords representing colors in a first dynamic range, which in this case is the same dynamic range as the output of post-processing unit 138.

Rather than multiplying by a scale factor, as done with post-processing unit 138, inverse post-processing unit 144 may divide by a substantially similar scale factor with which post-processing unit 138 multiplied. If post-processing unit 138 subtracted an offset from the scaled codewords, inverse post-processing unit 144 may add the offset to the inverse scaled codewords. The output of inverse post-processing unit 144 may be codewords that are not spread across the entire codeword space. In some examples, inverse post-processing unit 144 may receive the scaling and offsetting parameters (e.g., scale and offset factors) from video preprocessor 19. In some examples, inverse post-processing unit 144 may receive information from which inverse post-processing unit 144 determines the scale and offset factors.

Inverse TF unit 126 performs the inverse operation of TF unit 112. For instance, TF unit 112 compacted the color values in codewords that represent a smaller dynamic range as compared to the dynamic range of the color values. Inverse TF unit 126 expands the color values from the smaller dynamic range back into a larger dynamic range. The output of inverse TF unit 126 may be linear RGB data; however, there may be some pre-processing that needs to be removed to result in the original RGB data.

Inverse pre-processing unit 142 receives the output of inverse TF unit 126 and performs the inverse of the pre-processing applied by pre-processing unit 134. Inverse post-processing unit 144 receives color values representing colors in a second dynamic range, which in this case is the same dynamic range as the output of pre-processing unit 134.

Rather than multiplying by a scale factor, as done with pre-processing unit 134, inverse pre-processing unit 142 may divide by a substantially similar scale factor with which pre-processing unit 134 multiplied. If pre-processing unit 134 subtracted an offset from the scaled color values, inverse pre-processing unit 142 may add the offset to the inverse scaled color values. In some examples, inverse pre-processing unit 142 may receive the scaling and offsetting parameters (e.g., scale and offset factors) from video preprocessor 19. In some examples, inverse pre-processing unit 142 may receive information (e.g., histogram information) from which inverse pre-processing unit 142 determines the scale and offset factors.

The output of inverse pre-processing unit 142 may be linear RGB data 128. Linear RGB data 128 and linear RGB data 110 should be substantially similar. Display device 32 may display linear RGB data 128.

Similar to TF unit 112, the inverse transfer function that inverse TF unit 126 applies is a static inverse transfer function (e.g., not adaptive to the video content). However, the data that is outputted to inverse TF unit 126 may be adapted (e.g., by inverse post-processing unit 144) and/or the data that inverse TF unit 126 outputs may be adapted (e.g., by inverse pre-processing unit 142). In this way, video postprocessor 31 outputs color values representing colors that are not in a reduced dynamic range, as compared to the reduced dynamic range of the output of post-processing unit 138. Accordingly, by adapting the input to inverse TF unit 126 and the output of inverse TF unit 126, the combination of inverse post-processing unit 144, inverse TF unit 126, and inverse pre-processing unit 142 function as applying an adaptive inverse transfer function.

Although both pre-processing unit 134 and post-processing unit 138 are illustrated in FIG. 9, the example techniques described in this disclosure are not so limited. In some examples, video preprocessor 19 may include pre-processing unit 134, but may not include post-processing unit 138. In some examples, video preprocessor 19 may include post-processing unit 138, but may not include pre-processing unit 134.

Accordingly, FIG. 9 illustrates an example for a device (e.g., source device 12) for video processing in a content adaptive HDR system, where the device includes video data memory 132 and video preprocessor 19. Video preprocessor 19 comprises at least one of fixed-function or programmable circuitry, or a combination of both, and is configured to receive a plurality of color values of video data representing colors in a first dynamic range (e.g., linear RGB data 110). Video preprocessor 19 include TF unit 112 configured to compact the color values using a static transfer function that is non-adaptive to the video data being compacted to generate a plurality of codewords that represent compacted color values in a second dynamic range. The second dynamic range is more compact than the first dynamic range.

Video preprocessor 19 may include at least one of pre-processing unit 134 or post-processing unit 138. Pre-processing unit 134 is configured to pre-process the color values prior to compacting to generate the color values that are compacted. Post-processing unit 138 is configured to post-process codewords resulting from the compacting of the color values. Video preprocessor 19 may be configured to output color values (e.g., the output of quantization unit 116) based on one of the compacted color values (e.g., in examples where there is no post-processing unit 138) or the post-processed compacted color values (e.g., in examples where post-processing unit 138 is part of video preprocessor 19).

Also, although both inverse post-processing unit 144 and inverse pre-processing unit 142 are illustrated in FIG. 10, the example techniques described in this disclosure are not so limited. In some examples, video postprocessor 31 may include inverse post-processing unit 144, but may not include inverse pre-processing unit 142 (e.g., in examples where video preprocessor 19 does not include pre-processing unit 134, but the techniques are not so limited). In some examples, video postprocessor 31 may include inverse pre-processing unit 142, but may not include inverse post-processing unit 144 (e.g., in examples where video preprocessor 19 does not include post-processing unit 138, but the techniques are not so limited).

Accordingly, FIG. 10 illustrates an example for a device (e.g., destination device 14) for video processing in a content adaptive HDR system, where the device includes video data memory 140 and video postprocessor 31. Video postprocessor 31 comprises at least one of fixed-function or programmable circuitry, or a combination of both, and is configured to receive first a plurality of codewords that represent compacted color values of video data. The compacted color values represent colors in a first dynamic range (e.g., substantially similar dynamic range as the compacted dynamic range of the codewords that video preprocessor 19 outputs). Video postprocessor 31 includes inverse TF unit 126 configured to uncompact a second plurality of codewords based on the first plurality of codewords using an inverse static transfer function that is non-adaptive to the video data to generate un-compacted color values. The un-compacted color values represent colors in a second dynamic range (e.g., substantially similar dynamic range as linear RGB data 110). The second plurality of codewords are one of codewords from the first plurality of codewords being inverse post-processed (e.g., in examples where inverse post-processing unit 144 is included) or the first plurality of codewords (e.g., in examples where inverse post-processing unit 144 is not included).

Video postprocessor 31 may include at least one of inverse post-processing unit 144 or inverse pre-processing unit 142. Inverse post-processing unit 144 is configured to inverse post-process the first plurality of codewords to generate the second plurality of codewords that are un-compacted. Inverse pre-processing unit 142 is configured to inverse pre-process the un-compacted color values resulting from the uncompacting of the second plurality of codewords. Video preprocessor 19 may be configured to output for display un-compacted color values (e.g., the output of inverse TF unit 126 in examples where inverse pre-processing unit 142 is not included) or the inverse pre-processed un-compacted color values (e.g., the output of inverse pre-processing unit 142).

FIGS. 9 and 10 illustrate example techniques for a content-adaptive dynamic range adjustment (DRA) for reducing artifacts resulting from a fixed (e.g., static) transfer function. However, by pre-processing and/or post-processing the data TF unit 112 receives or outputs and by inverse post-processing and/or inverse pre-processing the data inverse TF unit 126 receives or outputs, the example techniques may still use a static transfer function, but still achieve content-adaptive DRA.

This disclosure describes a content adaptive HDR video system employing static fixed Transfer Function (TF). The following describes some examples that may be used together or may be kept separate. For ease they are described separately with the understanding that various permutations and combinations are possible.

As described above, the techniques described in this disclosure utilize a static TF in the pipeline (e.g., for generating video content that is encoded), but adapt signal characteristics to a fixed processing flow. This can be achieved by adaptive processing of either the signal which is to be processed by TF unit 112 (e.g., with pre-processing unit 134), or the signal which resulted from application of the TF by TF unit 112 (e.g., with post-processing unit 138).

In one example, pre-processing unit 134 may enable adaptivity by a linear (scale and offset) pre-processing of input linear color values prior to TF unit 112 applying the transfer function. In addition to or instead of pre-processing unit 134, post-processing unit 138 may enable adaptivity by a linear (scale and offset) post-processing of nonlinear codewords resulting from TF unit 112 applying the TF on linear color values. Inverse post-processing unit 144, inverse TF unit 126, and inverse pre-processing unit 142 may apply the inverse of post-processing unit 138, TF unit 112, and pre-processing unit 134, respectively.

Pre-processing unit 134 may apply a linear pre-processing to input signal s (e.g., linear RGB 110) by applying an offset Offset1 and scale Scale1 to achieve preferable codeword distribution of the TF output (e.g., such that each codeword represents approximately equal ranges of input color values such as luminance). Post-processing unit 138 may apply a linear post-processing to the output of TF unit 112. The linear post-processing is defined by parameters Scale 2 and Offset 2 and enables efficient utilization of the available codeword space (dynamic range), after TF unit 112 applies the transfer function.

In the examples described above, pre-processing unit 134 applies pre-processing on linear RGB data 110. However, the techniques described in this disclosure are not so limited. RGB is one color space of HDR on which pre-processing unit 134 may perform pre-processing. In general, pre-processing unit 134 may implement pre-processing in any color space of the HDR processing flow that precedes TF unit 112 applying the transfer function (e.g., in input linear RGB in the illustrated example, but other color spaces are also possible such as YCbCr color space).

Inverse pre-processing unit 142 may also be configured to perform inverse pre-processing in any color space. In such examples, inverse pre-processing unit 142 may receive non-linear color values (e.g., non-linear RGB data, but other color space including YCbCr is possible) from inverse TF unit 126.

The above examples describe post-processing unit 138 performing post-processing in the RGB color space (e.g., non-linear RGB due to the transfer function applied by TF unit 112). However, the techniques described in this disclosure are not so limited. RGB is one color space of HDR on which post-processing unit 138 may perform post-processing. In general, post-processing unit 138 may implement post-processing in any color space of the HDR processing flow that follows TF unit 112 applying the transfer function (e.g., in non-linear RGB in the illustrated example, but other color spaces are also possible such as YCbCr color space).

Inverse post-processing unit 144 may also be configured to perform inverse post-processing in any color space. In such examples, inverse post-processing unit 144 may receive color values (e.g., non-linear compacted RGB data, but other color space including YCbCr is possible) from video decoder 30, possible after inverse quantization.

As described above, pre-processing unit 134, which is on the encoder side, may derive and apply parameters such as Scale1 and Offset1 factors from HDR signal properties, such as histogram distribution input or target color space (e.g., linear RGB data 110 or YCrCb if color conversion unit 114 receives linear RGB data 110 and converts the color into YCrCb values), or in supplementary color space, to produce for better parameters derivation. Post-processing unit 138 may also derive and apply parameters such as Scale2 and Offset2 factors from the output of TF unit 112.

Pre-processing unit 134 and/or post-processing unit 138 may output the Scale1 and Offset1 factors and/or the Scale2 and Offset2 factors that inverse pre-processing unit 142 and inverse post-processing unit 144, respectively, utilize to perform the inverse of the operations of pre-processing unit 134 and post-processing unit 138. In some examples, rather than outputting Scale1, Offset1, Scale2, and/or Offset2 factors, pre-processing unit 134 and post-processing unit 138 may output information used to determine Scale1, Offset1, Scale2, and/or Offset2 so that inverse pre-processing unit 142 and inverse post-processing unit 144 can use the same processes to determine Scale1, Offset1, Scale2, and/or Offset2 for the inverse process. In some cases, pre-processing unit 134 and post-processing unit 138 may output one or more Scale1, Offset1, Scale2, and/or Offset2 and output information that can be used to derive the other ones.

In some examples, video preprocessor 19 (e.g., via a controller circuit) may selectively enable the use of pre-processing unit 134 and/or post-processing unit 138. Video preprocessor 19 may therefore output information indicating whether pre-processing unit 134 and/or post-processing unit 138 are enabled. In response, video postprocessor 31 (e.g., via a controller circuit) may selectively enable the use of inverse post-processing unit 144 and/or inverse pre-preprocessing unit 142.

There may be various ways in which video encoder 20 may encode and output the various parameters. For example, video encoder 20 may signal and video decoder 30 may receive parameters through the bitstream by means of SEI (supplemental enhancement information)/VUI (video usability information) or being provided to the decoder side (e.g., video postprocessor 31) as a side information, or derived by the decoder side (e.g., by video postprocessor 31) from other identifications, such as input and output color space, utilized transfer function as so on.

The following describes example techniques which may be applied in accordance with the example techniques described in this disclosure. Each of these techniques may be applied separately or in any combination. Also, each of these techniques are described in more detail further below.

In the above examples, video preprocessor 19 may signal the parameter information in various ways. As merely one example, video encoder 20 includes an encoding unit (e.g., entropy encoding unit), and the entropy encoding unit may encode the signaled parameter information. Similarly, video decoder 30 includes a decoding unit (e.g., entropy decoding unit), and the entropy decoding unit may decode the signaled parameter information and video postprocessor 31 may receive the parameter information from video decoder 30. There may be various ways in which the parameter information may signaled and received, and the techniques described in this disclosure are not limited to any specific technique. Also, as noted above, video preprocessor 19 may not need to signal the parameter information in all cases. In some examples, video postprocessor 31 may derive the parameter information without necessarily receiving it from video preprocessor 19.

The following are example implementations used solely for purposes of illustration and should not be considered limiting. For example, the disclosure describes enabling adaptivity by a linear (scale an offset) pre-processing of input linear color values prior to TF (e.g., static, non-content adaptive) being applied and/or by a linear (scale and offset) post-processing of nonlinear codewords resulting from TF being applied on linear color values. Below are several non-limiting examples of implementation of techniques.

Figure 11:
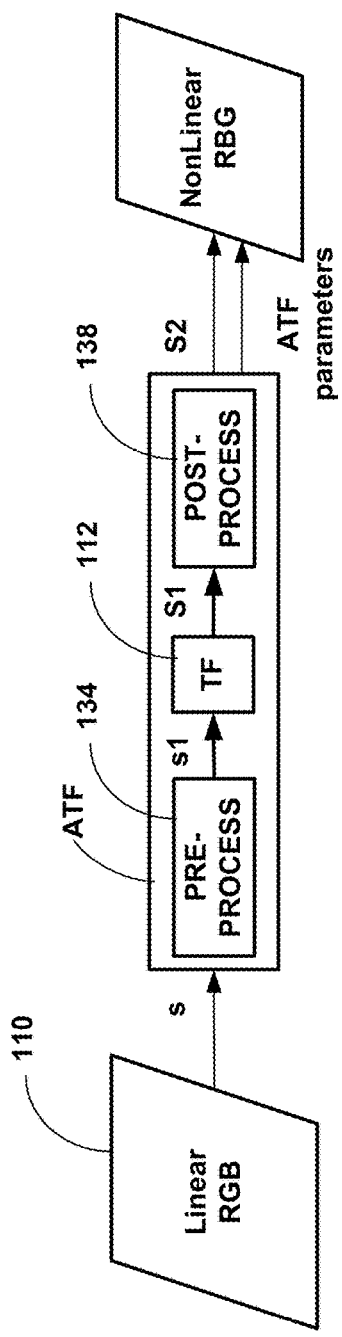
FIG. 11 is a conceptual diagram showing a content-adaptive HDR pipeline with static TF, encoder side.

Proposed forward ATF processing flow is shown in FIG. 11. In this example, linear signal component s in input color space, e.g. RGB, is being pre-processed by pre-processing unit 134 to produced output signal s1. TF unit 112 applies a transfer function to values of s1 which results in output codewords S1. In the following step, codewords of S1 are being post-processed by post-processing unit 138 to produce output values S2.

Figure 12:
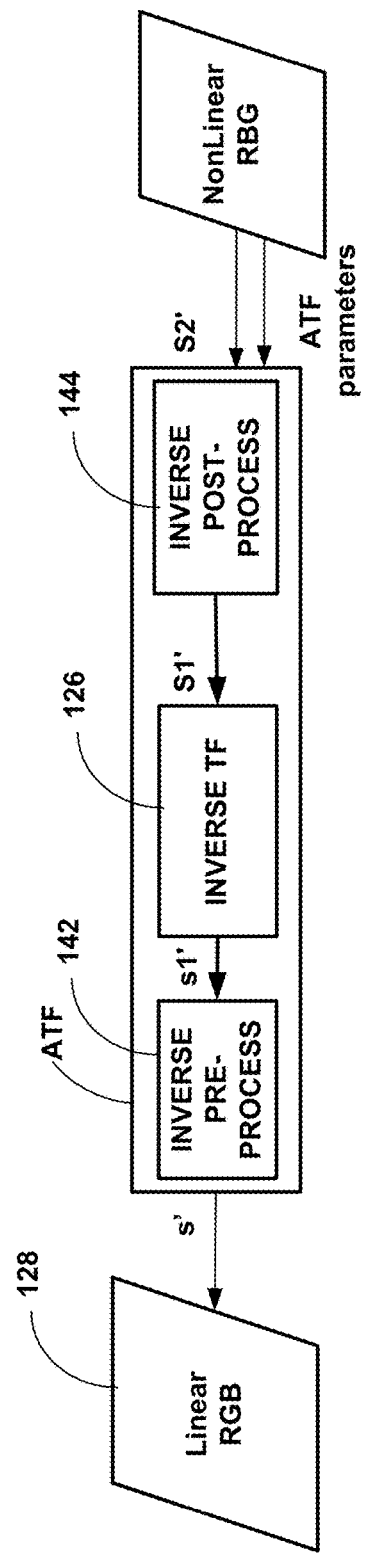
FIG. 12 is a conceptual diagram showing a content-adaptive HDR pipeline with static TF, decoder side.

FIG. 12 is the inverse of the ATF processing flow illustrated in FIG. 11. For example, inverse post-processing unit 144 performs inverse post-processing on codewords S2'. Codewords S2' may be substantially similar to codewords S2. The output of inverse post-processing by inverse post-processing unit 144 is codewords S1'. Codewords S1' may be similar to codewords S1. Inverse TF unit 126 receives codewords S1', and the output of inverse TF unit 126 is s1', which represent color values and are similar to color values s1. Inverse pre-processing unit 142 receives s1' as inputs and outputs color values s'. The color values s' are substantially similar to color values s.

For ease of illustration, various processes are not illustrated in FIGS. 11 and 12. For example, color conversion and quantization and their respective inverse processes are not illustrated in FIGS. 11 and 12.

Figure 13A:
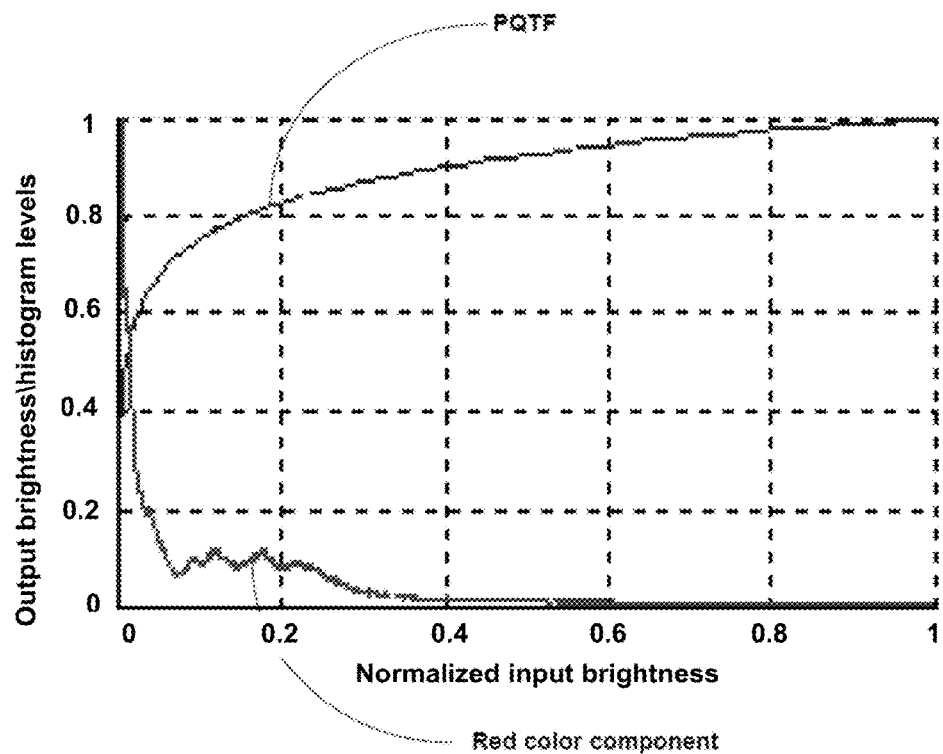
FIG. 13A shows an example of the histogram of liner light signal (Red color component) of an HDR signal overlaid with PQ TF (ST 2084) for visualization purpose.
Figure 13B:
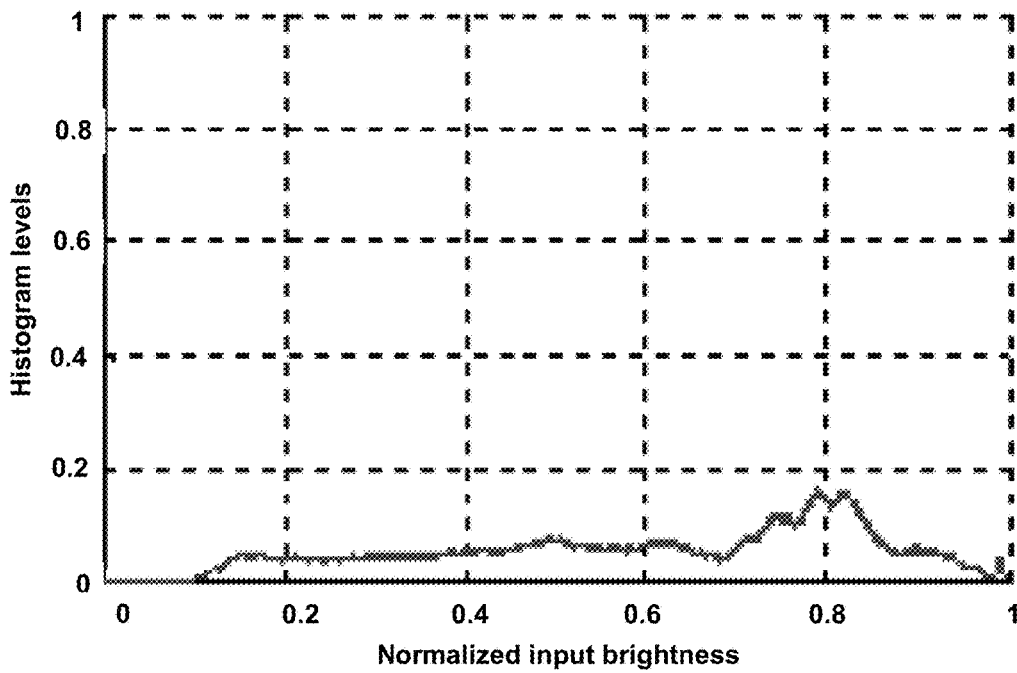
FIG. 13B shows example of the histogram of nonlinear signal resulting from applying PQ TF (ST 2084) to the linear light signal (red color component).

The following describes example operations and algorithms that pre-processing unit 134 and inverse pre-processing unit 142 may perform. Pre-processing unit 134 is defined by parameters Scale 1 and Offset 1. Pre-processing unit 134 targets to adjust input signal characteristics to certain properties of the transfer function applied by TF unit 112. Example of such processing is illustrated in FIGS. 13A and 13B. FIG. 13A shows a histogram of a Red color component of an HDR signal overlaid with the PQT transfer function; note that signals are shown in different scale for purposes of visualization. A histogram of the nonlinear signal resulting from PQTF is shown in FIG. 13B (e.g., if TF unit 112 applied the PQTF without using pre-preprocessing unit 134).

As illustrated, by the curved line (which is the same as FIG. 7) of PQTF, PQTF provides more codewords to low brightness samples, e.g., allowing 0 . . . 1% of input dynamical range being represented with 50% of out output dynamical range. Such distribution may be not optimal for certain classes of signal and/or applications.

For linear pre-processing, pre-processing unit 134 may apply a linear pre-processing to input signal s to by applying an offset Offset1 and scale Scale1 to achieve preferable codeword distribution of the TF output from TF unit 112.

$$s1 = \text{Scale1} * (s - \text{Offset1}) \qquad (8)$$

Signal value s1 produced by Equation 8 are utilized in Equation 1 and the HDR processing pipeline specified in Equations (3-7) is applied (e.g., by color conversion unit 114 and quantization unit 116).

At the decoder side (e.g., video postprocessor 31), inverse pre-processing unit 142 applies an operation inverse to pre-processing as follows:

$$s' = \frac{s1'}{scale1} + offset1 \qquad (9)$$

Where term s1' denotes linear color value which produced by the inverse TF as specified in Equation 2. In other words, s1' is the output of inverse transfer function applied by inverse TF unit 126.

Figure 14:
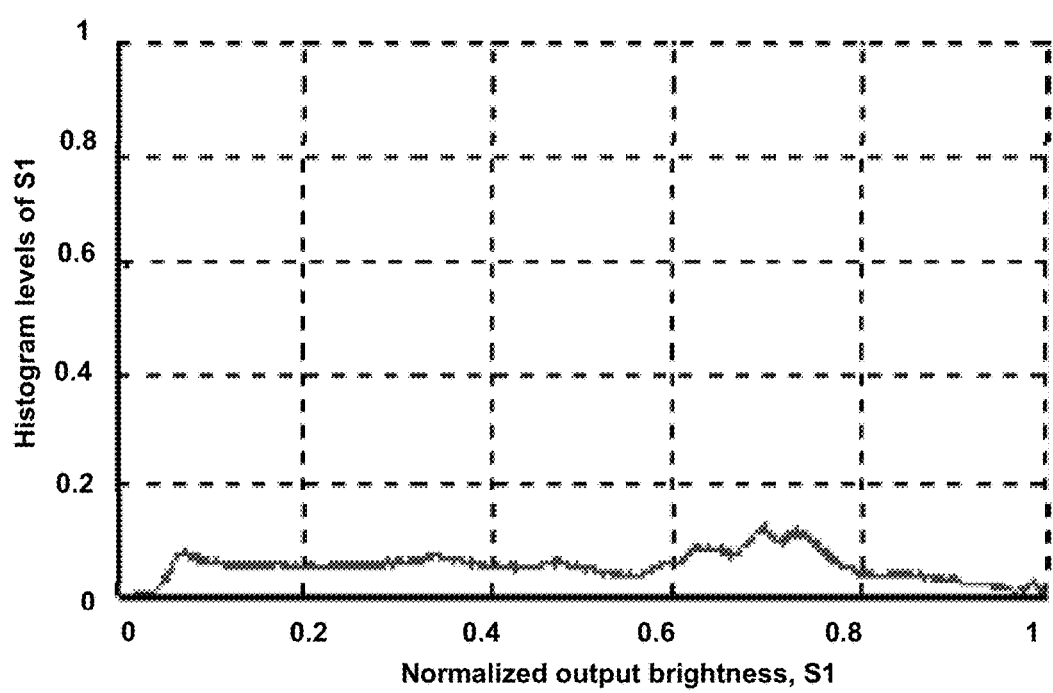
FIG. 14 is a histogram output of nonlinear signal produced by PQ TF and processing in accordance with the techniques described in this disclosure.

Effect of such pre-processing with parameters (Scale1=0.1 and Offset1=0.0001) is shown in FIG. 14. FIG. 14 is generated from the same input illustrated as FIG. 13A. It can be seen that codewords of the S1 signal occupy available dynamic range more efficiently as compared to example illustrated in FIG. 13B, and representation of high brightness values is more accurate, since they occupy a much larger dynamic range (see stretched peak of the histogram S1 in FIG. 14 compared to the histogram peak in FIG. 13B).

In some examples, the input to TF unit 112 may be a bipolar signal. A bipolar signal is meant to indicate that some of the values that pre-processing unit 138 outputs are negative values and others are positive values. To enable application of a static TF by TF unit 112 (and its inverse with inverse TF unit 126) even to a bipolar signal, TF unit 112 may adjust the output of pre-processing unit 134 and/or adjust the output after applying the transfer function. For example, if the output of pre-processing unit 134 is a negative value, TF unit 126 may apply the transfer function on the absolute value of the output of pre-processing unit 134, and multiply the result with the output of the sign(s) function, where s is the output of pre-processing unit 134 and sign(s)=-1 for s<0; 0 for s=0; and 1 for s>0. Accordingly, to enable application of static TF, TF unit 112 may utilize positive values defined function, to a bipolar signal, which implies some special treatment of the sign of bipolar signal.

The following describes transfer function with bipolar signal handling. In some examples, the techniques may modify Equation (1) to be able to handle bipolar input signal.

$$S = \begin{cases} TF(s), & \text{if } s > 0 \\ sign(s) * TF(\text{abs}(s)), & \text{otherwise} \end{cases} \qquad (10)$$

Figure 15A:
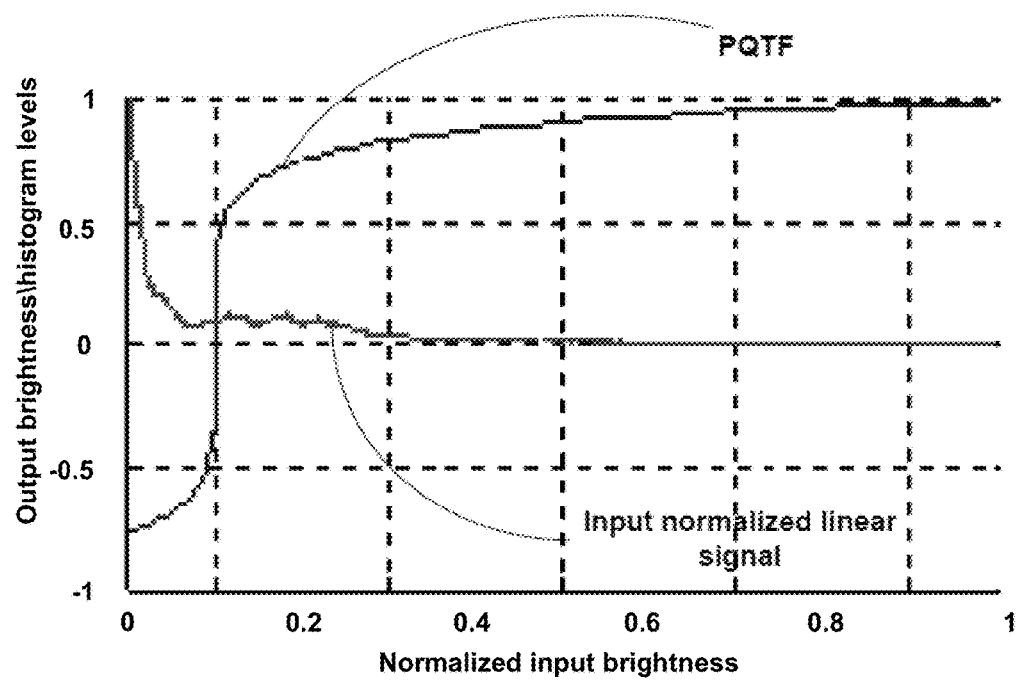
FIG. 15A is a diagram illustrating impact of PQ TF on signal statistics after pre-processing.
Figure 15B:
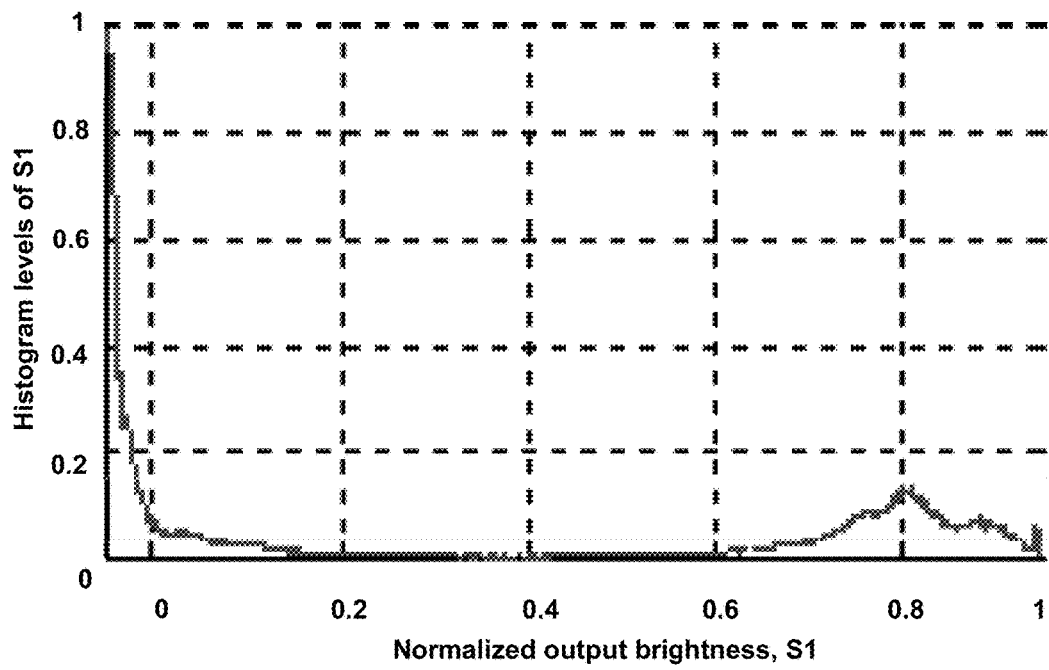
FIG. 15B is a diagram illustrating a histogram of output nonlinear signal produced by PQTF.

This technique may allow TF unit 112 of FIG. 9 to allocate desired steepness of the TF at the needed region of the dynamic range, e.g., if more accurate representation is required for mid-bright levels of signal. Visualization of this concept with parameters scale=0.1 and offset=0.1 is shown in FIGS. 15A and 15B.

Inverse TF for bipolar signal would be defined accordingly as modified Equation 2:

$$s = \begin{cases} inverseTF(S), & \text{if } S > 0 \\ sign(S) * inverseTF(\text{abs}(S)), & \text{otherwise} \end{cases} \qquad (11)$$

For example, inverse TF unit 126 of FIG. 10 may apply the inverse transfer function for cases where the input codewords are positive. For the input codewords that are negative, inverse TF unit 126 may determine the absolute value of the input codewords and apply the inverse transfer function to the absolute values of the input codewords. TF unit 126 may multiply the result with the output of the sign( ) function where the input to the sign( ) function is the codeword that inverse TF unit 126 received.

The following describes example operations and algorithms that post-processing unit 138 and inverse post-processing unit 144 may perform. Post-processing unit 138 is defined by parameters Scale 2 and Offset 2 and enables efficient utilization of the available codeword space (dynamic range), after TF is applied by TF unit 112. Example of such processing is described below.

Figure 16A:
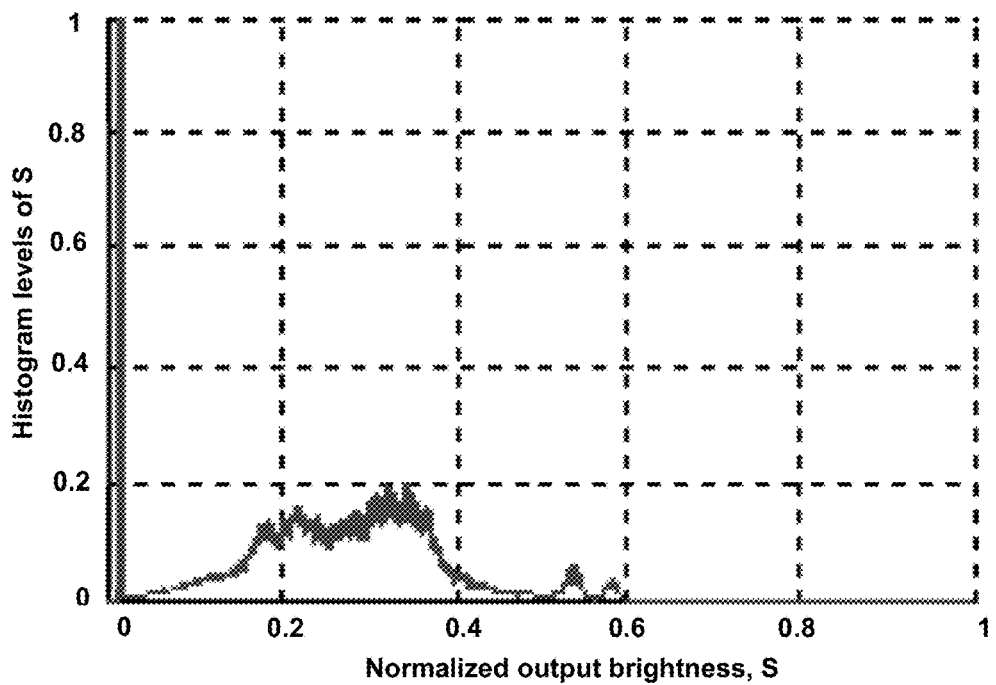
FIG. 16A is a diagram illustrating a histogram of a normalized nonlinear signal, S.

The following is an example of HDR signal after TF is applied by TF unit 112. FIG. 16A shows a histogram of a Red color component of an HDR signal after application of the TF by TF unit 112. As illustrated, the histogram of the signal does not occupy full codewords space, but rather only 60% of codewords are actually utilized in this example. Such representation is not a problem until the signal is represented in floating point accuracy. However, unused codeword budget can be utilized more efficiently to reduce quantization error introduced by Equation 7.

The post-processing unit 138 may apply linear operations of offset and scale to codewords S produced after applying TF by TF unit 112:

$$S2 = \text{scale2} * (S - \text{offset2}) \qquad (12)$$

In certain frameworks, post-processing unit 138 (FIG. 9) may clip resulting S values to a specified dynamic range as follows:

$$S2 = \min(\text{maxValue}, \max(S2, \text{minValue})) \qquad (13)$$

Following this post-processing, signal value S2 are utilized in Equation (3), and followed by the HDR processing flow specified in Equations (3-7).

At the decoder side (e.g., video postprocessor 31), inverse post-processing unit 144 may apply an operation inverse to post-processing is implemented as follows:

$$S' = \frac{S2'}{scale2} + offset2 \qquad (14)$$

In certain frameworks, inverse post-processing unit 144 may clip resulting S values to a specified dynamic range as follows:

$$S' = \min(\text{maxValue}, \max(S', \text{minValue})) \qquad (15)$$

where term S2' denotes decoded nonlinear color value.

Figure 16B:
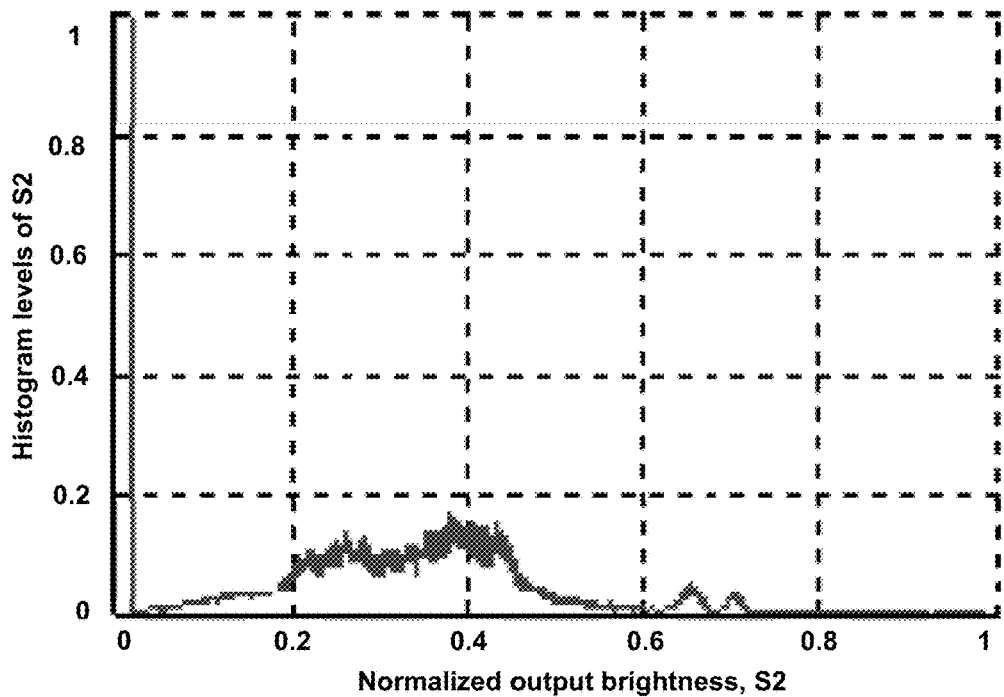
FIG. 16B is a diagram illustrating a histogram of a normalized nonlinear signal after post-processing, S2.

Effect of such post-processing with parameters (scale=0.8 and offset=0) is shown in FIG. 16B. It can be seen that codewords of the S2 signal occupy available codewords space (dynamic range) more efficiently, and representation of high brightness values is more accurate, since they occupy much larger dynamic range (see stretched peak of the histogram S2 in FIG. 16B compared to the histogram peak in FIG. 16A).

In the above examples, rather than applying the operations of equation (12), post-processing unit 138 may be considered as applying a second transfer function that is a linear transfer function instead of the non-linear transfer function that TF unit 112 applies. Applying this second transfer function may be equivalent to multiplying the input codeword with Scale2 and adding Offset2, and inverse post-processing unit 144 applies the inverse of this process. Accordingly, in some examples, the techniques of post-processing unit 138 and inverse post-processing unit 144 (FIG. 10) can be deployed through an additional linear transfer function TF2. Parameters of this additional linear transfer function TF2 can be specified through Scale 2 and Offset 2, e.g., as shown in FIGS. 17A-17C.

Figure 17A:
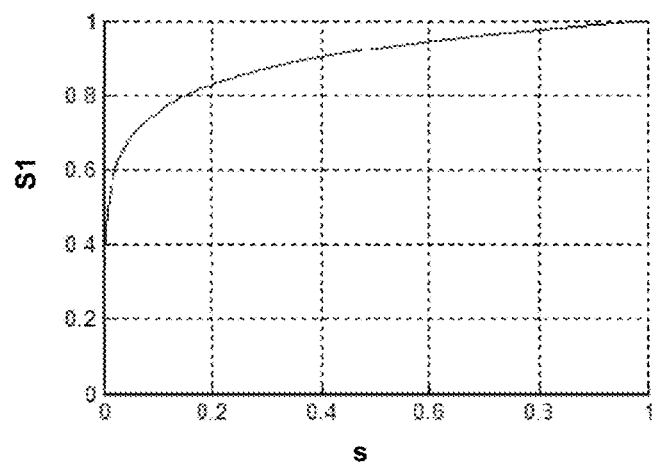
FIG. 17A is a diagram illustrating nonlinear PQ TF for purposes of HDR as defined in ST2084.
Figure 17B:
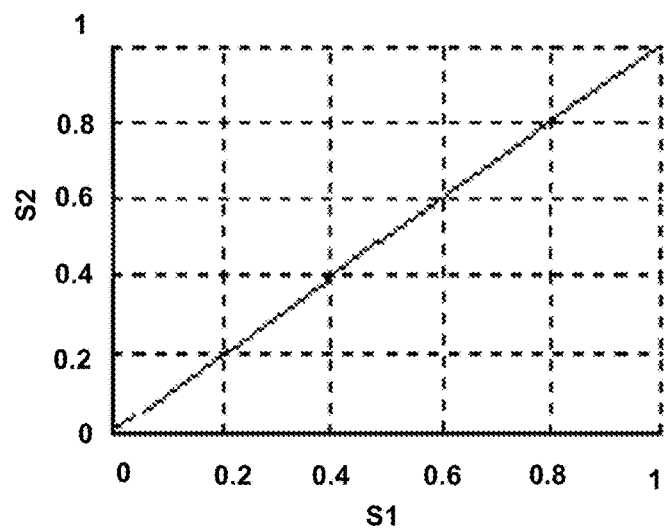
FIG. 17B is a diagram illustrating a linear transfer function y=x with the techniques described in this disclosure modelled with Scale2=1 and Offset2=0.
Figure 17C:
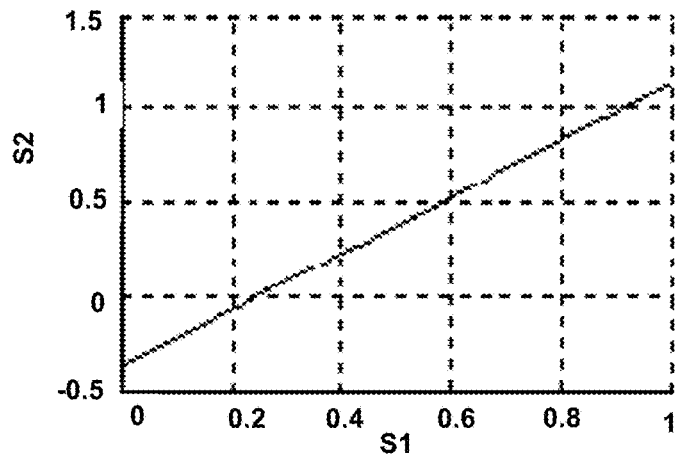
FIG. 17C is a diagram illustrating linear transfer function with the techniques described in this disclosure modeled with Scalse2=1.5 and Offset=−0.25.

For example, FIG. 17A illustrates the same transfer function behavior as FIG. 7 (e.g., the static transfer function that TF unit 112 applies). FIG. 17B illustrates the transfer function that post-processing unit 138 applies to the output of TF unit 112 with Scale2=1 and Offset2=0. FIG. 17C illustrates the transfer function that post-processing unit 138 applies to the output of TF unit 112 with Scale2=1.5 and Offset2=−0.25.

Figure 18:
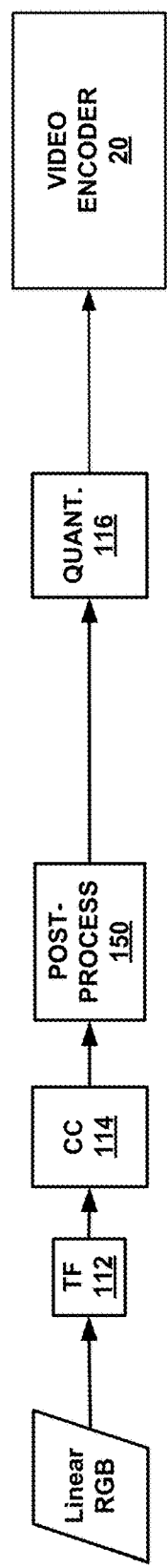
FIG. 18 is a conceptual diagram illustrating an example where color conversion is performed after transfer function is applied and before post-processing techniques described in this disclosure.
Figure 19:
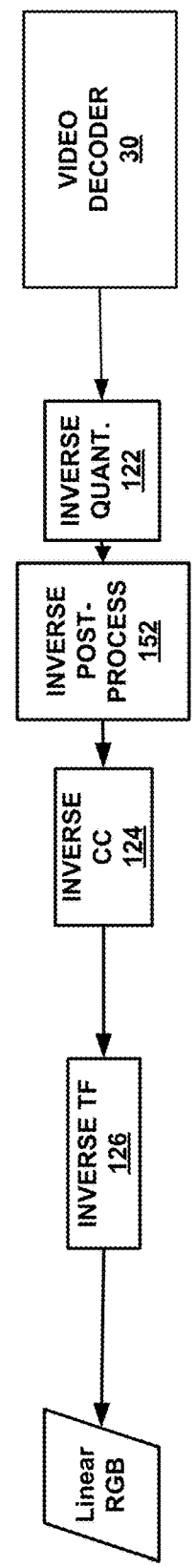
FIG. 19 is a conceptual diagram illustrating an example where inverse color conversion is performed after inverse post-processing techniques described in this disclosure and before the inverse transfer function is applied.

The above examples describe the case where there is pre-processing unit 134 (DRA1) and/or post-processing unit 138 (DRA2) and corresponding inverse pre-processing unit 142 and inverse post-processing unit 144. In some examples, the post-processing can be performed after color conversion (e.g., in the target color space) instead of before color conversion. For example, as illustrated in FIG. 18, TF unit 112 outputs to color conversion unit 114, and post-processing unit 150 applies post-processing after color conversion. Similarly, as illustrated in FIG. 19, inverse post-processing unit 152 applies inverse post-processing on the output of inverse quantization unit 122 and before inverse color conversion unit 124 applies color conversion. In FIGS. 18 and 19, pre-processing unit 134 and inverse pre-processing unit 142 are not illustrated for ease, and may be included in other examples.

Post-processing unit 150 and inverse post-processing unit 152 may function in a manner similar to post-processing unit 138 and inverse post-processing unit 144 but in a different color space (e.g., YCbCr color space instead of RGB color space). For example, post-processing unit 150 and inverse post-procession unit 152 may utilize Scale2 and Offset2 parameters for scaling and offsetting. The following describes post-processing at the target color space.

For some HDR systems utilizing certain target color spaces (e.g. YCbCr of BT709 or BT2020), and with post-processing utilizing identical parameters for 3 components of R, G and B, post-processing can be applied in the output color space, instead of applying in input RGB color space.

For instance, for the YCbCr color transform as defined in Equations 3 and 5:

$$Y' = a*R' + b*G' + c*B' \tag{16}$$

$$Cb = \frac{B' - Y'}{d1} \tag{16}$$

$$Cr = \frac{R' - Y'}{d2}$$

where variables a, b, c, d1 and d2 are parameters of color space and R', G', B' are non-linear color values in input color space after applying EOTF.

Post-processing defined in equation 12 and 13 is applied at the input color space, namely to R', G', B' resulting in output values R2', G2', B2':

$$R2'=\text{scale2}*(R'-\text{offset2})$$

$$G2'=\text{scale2}*(G'-\text{offset2})$$

$$B2'=\text{scale2}*(B'-\text{offset2}) \tag{17}$$

In Equation 17, it is assumed that parameters of post-processing in the R, G and B domains are identical.

However, due to linearity of the processes defined in equations 16 and 17, post-processing can be implemented in the target color space:

$$Y2'=\text{scale}Y*Y'-\text{offset}Y$$

$$Cb2=\text{scale}B*Cb-\text{offset}B$$

$$Cr2=\text{scale}R*Cr-\text{offset}R \tag{18}$$

where post-processing unit 150 computes parameters of post processing as follows:

$$\text{scale}Y=\text{Scale2}; \text{Offset}Y=\text{Scale2}*\text{Offset2}*(a+b+c)$$

$$\text{scale}Cb = \text{Scale2}; \text{Offset}Cb = \frac{\text{Scale2}*\text{Offset2}}{d1} *(a+b+c+1) \tag{19}$$

$$\text{scale}Cr = \text{Scale2}; \text{Offset}Cr = \frac{\text{Scale2}*\text{Offset2}}{d2} *(a+b+c+1)$$

At the decoder side (e.g., video postprocessor 31), inverse operation of post-processing by inverse post-processing unit 152 may be implemented as follows:

$$Y' = \frac{Y2' + \text{offset}Y}{\text{scale}Y} \quad Cb = \frac{Cb2 + \text{offset}Cb}{\text{scale}Cb} \quad Cr = \frac{Cr2 + \text{offset}Cr}{\text{scale}Cr} \tag{20}$$

where variables Y2', Cb and Cr are decoded and dequantized components and parameters of inverse post-processing are computed as shown in Equation 19.

For the YCbCr color transform defined in BT2020, parameters of post-processing implemented in target color space are derived from parameters of post-processing in an input color space and parameters of a color transform as follows:

$$\text{scale}Y = \text{Scale2}; \tag{21}$$

$$\text{offset}Y = \text{Scale2}*\text{Offset2}$$

$$\text{scale}Cb = \frac{\text{Scale2}}{1.8814}$$

$$\text{offset}Cb = \frac{\text{Scale2}*\text{Offset2}}{0.9407}$$

-continued $$scaleCr = \frac{Scale2}{1.4746}$$

$$offsetCr = \frac{Scale2 * Offset2}{0.7373}$$

In some examples, Equation 20 implemented in a target color space with parameters derived from parameters of post-processing in an input color space can be implemented as the following equation 20A:

$$Y' = \frac{Y2'}{scaleY} + offsetY \quad Cb = \frac{Cb2}{scaleCb} + offsetCb \quad Cr = \frac{Cr2}{scaleCr} + offsetCr \quad (20A)$$

$$scaleY = \frac{1}{Scale2};$$

$$offsetY = Offset2$$

$$scaleCb = \frac{1}{Scale2}$$

$$offsetCb = 0$$

$$scaleCr = \frac{1}{Scale2}$$

$$offsetCr = 0$$

In some examples, Equation 20A above can be implemented through multiplication instead of division.

For non-linear processing, in addition to the pre- and post-processing techniques described above, post-processing unit 138 or 150 and inverse post-processing unit 144 or 152 may utilize certain non-linear techniques to further improve codewords utilization. As one example of histogram tails handling, post-processing unit 138 or 150 and inverse post-processing unit 144 or 152 may supplement linear codewords post-processing defined above with a parametric, piece-wise specified transfer function which is applied to samples that lay outside of a specified range.

Processing flow of HDR signal specified above usually operates in the predefined range Range={minValue,MaxValue}

In the case of a normalized signal and the equation above, the values are:

Range={0.0 . . . 1.0} minValue=0.0 maxValue=1.0 (22)

Post-processing proposed in Equation 12 (e.g., as performed by post-processing unit 138), through applying Offset2 and Scale2 to codewords S1, may lead to a situation in which resulting S2 values overflow specified Range boundaries. To ensure that data remains in a specified range, an operation of clipping may be applied to the range {minValue . . . maxValue} in Equation 13, e.g., as shown in FIGS. 20A-20C.

Figure 20A:
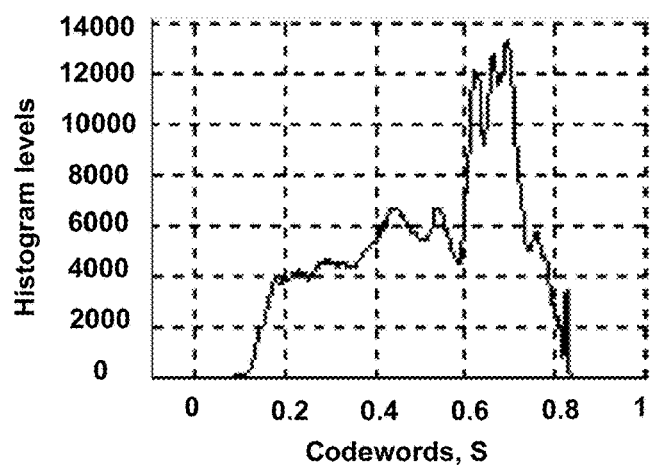
FIG. 20A is a diagram illustrating post-processing with clipping to a range for a histogram of S2.
Figure 20B:
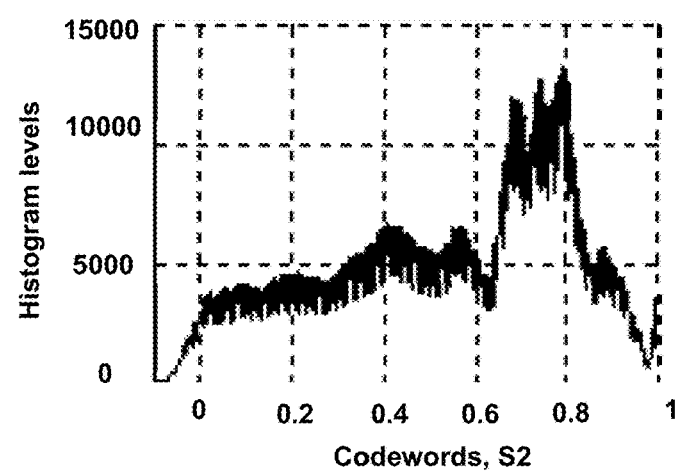
FIG. 20B is another diagram illustrating post-processing with clipping to a range for a histogram of S2.

FIG. 20A is a diagram illustrating post-processing with clipping applied to the range for a histogram of S2. FIG. 20B is another diagram illustrating post-processing with clipping applied to the range for a histogram of S2 after post-processing in equation 10. FIG. 20C is another diagram illustrating post-processing with clipping applied to the range for a histogram of S2 after clipping in equation 11.

Figure 20C:
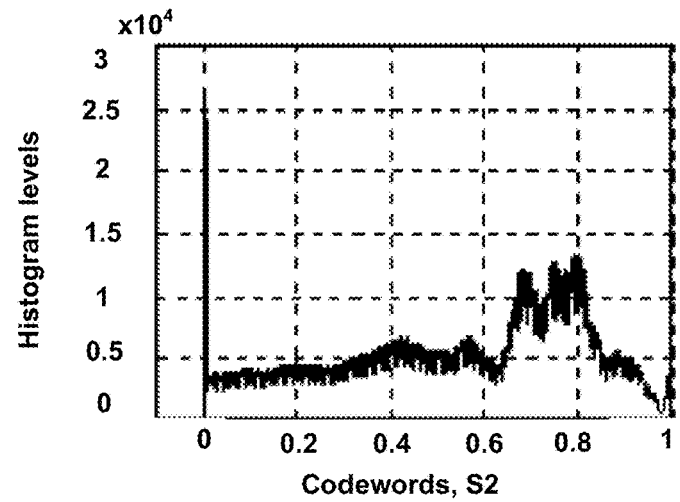
FIG. 20C is another diagram illustrating post-processing with clipping to a range for a histogram of S2.

As illustrated in FIG. 20C, applying clipping after post-processing would lead to un-recoverable loss of information outside of the specified range. To efficiently represent HDR signal in limited codewords space by applying Scale2/Offset 2 and preserve TF assumption on HVS perception, post-processing unit 138 or 150 may supplement codewords post-processing defined above with special handling of color samples which results in the codewords outside of the specified Range, to allow content adaptive histogram tail handling.

Post-processing unit 138 or 150 may apply a parametric, piece-wise specified transfer function for all S2 resulting from Equation 12 that belong outside of the range. Parameters of representation of those samples are encoded and signaled by video encoder 20 separately from the S2 codewords that belong to a specified range.

As an illustration, an operation may be provided to classify codewords S2 resulting from Equation 12 by their relationship to a supported data range, as specified in Equation 22.

$$S2_{in} = \forall S2 \in \text{Range} \quad (23)$$

$$S2_{low} = \forall S2 \leq \text{minValue} \quad (24)$$

$$S2_{high} = \forall S2 \geq \text{maxValue} \quad (25)$$

where $S2_{in}$ samples belong to the Range=[minValue . . . maxValue], $S2_{low}$ are set of samples that are outside of the range, and they are smaller or equal to minValue, and $S2_{high}$ are samples outside of the range and they are larger or equal to maxValue.

The techniques may replace operation of clipping in Equation 13 for color values of $S2_{low}$ and $S2_{high}$ that lay outside of the range by individually specifying/determining/signaling a codeword value for each of the $S2_{low}$ and $S2_{high}$ or specify/determine/signal with a group of codewords that optimally represent information outside of the Range.

Below are non-limiting examples of an example determination process that may replace clipping for samples $S2_{low}$ and $S2_{high}$:

a. Determine an average value for each of $S2_{low}$ and $S2_{low}$:

Smin=mean($S2_{low}$)

Smax=mean($S2_{high}$) (26)

b. Determine a median value for each of $S2_{low}$ and $S2_{high}$:

Smin=median($S2_{low}$)

Smax=median($S2_{high}$) (27)

c. Determine a value for each of $S2_{low}$ and $S2_{high}$ that optimally represent each of those samples sets under certain criteria, e.g., minimal sum of absolute difference (SAD), mean square error (MSE) or rate distortion optimization (RDO) cost.

Smin=fun($S2_{low}$)

Smax=fun($S2_{high}$) (28)

In such examples, each sample value $S2_{low}$ or $S2_{high}$ will be replaced not with a clipped value as shown in equation (13), but with a Smin and Smax values respectively, derived in equation (26, 27).

$$S2 = \begin{cases} Smin, & \text{if } S2 \leq minValue \\ Smax, & \text{if } S2 \geq maxValue \end{cases}$$

Parameters of proposed non-linear processing are codewords representing each of $S2_{low}$ and $S2_{high}$. These codewords are signaled to the decoder side (e.g., video postprocessor 31) and utilized by inverse post-processing unit 144 or 152 in the reconstructed process:

$$S2' = \begin{cases} Smin, & \text{if } S2' = minValue \\ S2', & \text{if } minValue < S2' < maxValue \\ Smax, & \text{if } S2' = maxValue \end{cases} \quad (29)$$

For example, in the above example of parametric, piecewise processing, post-processing unit 138 or 150 may scale and offset (e.g., apply Scale2 and Offset2) to the codewords resulting from the compacting of the color values by TF unit 112 (e.g., the compaction of the dynamic range resulting from the application of the transfer function). Post-processing unit 138 or 150 may determine that a set of the scaled and offset codewords have values less than a minimum threshold or greater than a maximum threshold. Post-processing unit 138 or 150 may assign a first codeword (e.g., Smin) to the set of scaled and offset codewords having values less than the minimum threshold and assign a second codeword (e.g., Smax) to the set of scaled and offset codewords having values greater than the minimum threshold. For scaled and offset codewords between the minimum and maximum, post-processing unit 138 or 150 may apply the scaling and offsetting as described in the above examples.

Inverse post-processing unit 144 or 152 (FIG. 10 or FIG. 19) may perform the inverse of the parametric, piecewise processing. For example, inverse post-processing unit 144 or 152 may determine that a first set of codewords from the plurality of codewords received from video decoder 30 represent compacted color values (e.g., where the dynamic range is compacted from the application of the transfer function by TF unit 112) having values less than a minimum threshold or greater than a maximum threshold. Inverse post-processing unit 144 or 152 may determine that a second set of codewords from the plurality of codewords represent compacted color values having values greater than or equal to the minimum threshold and less than or equal to the maximum threshold. For such examples, inverse post-processing unit 144 or 152 may assign a first codeword (e.g., Smin) to codewords of the first set of codewords that are less than the minimum threshold and assign a second codeword (e.g., Smax) to codewords of the first set of codewords that are greater than the maximum threshold. The values of Smin and Smax may be signaled from video preprocessor 19 via video encoder 20. Inverse post-processing unit 144 or 152 may inverse scale and offset the second set of codewords (e.g., those greater than the minimum and less than the maximum) using example techniques like those described above.

In the above example, applying scaling and offset parameters piecewise is described. In some examples, such piecewise application of scaling and offset parameters may be extended for both pre-processing unit 134 and post-processing unit 138 or 152 and inverse post-processing unit 144 or 152 and inverse pre-processing unit 142.

For example, the codewords that inverse post-processing unit 144 or 152 receive may include a first set of codewords and a second set of codewords. The first set of codewords represent compacted color values having values belonging to a first partition of the dynamic range and the second set of codewords represent compacted color values having values belonging to a second partition of the dynamic range. In such examples, inverse post-processing unit 144 or 152 may scale and offset the first set of codewords with a first set of scaling and offsetting parameters (e.g., a first Scale2 and a first Offset2). Inverse post-processing unit 144 or 152 may scale and offset the second set of codewords with a second set of scaling and offsetting parameters (e.g., a second Scale2 and a second Offset2).

As another example, the color values that inverse pre-processing unit 142 receives may include a first set of un-compacted color values and a second set of un-compacted color values. The first set of un-compacted color values represent un-compacted color values having values belonging to a first partition of the dynamic range and the second set of un-compacted color values represent un-compacted color values having values belonging to a second partition of the dynamic range. In such examples, inverse pre-processing unit 142 may scale and offset the first set of color values with a first set of scaling and offsetting parameters (e.g., a first Scale1 and a first Offset1). Inverse pre-processing unit 142 may scale and offset the second set of color values with a second set of scaling and offsetting parameters (e.g., a second Scale1 and a second Offset1).

Similarly, pre-processing unit 134 may determine that a first set of the color values have values belonging to a first partition of the dynamic range and determine that a second set of color values have values belonging to a second partition of the dynamic range. Pre-processing unit 134 may scale and offset the first set of color values with a first set of scaling and offsetting parameters (e.g., a first Scale1 and first Offset1). Pre-processing unit 134 may scale and offset the second set of color values with a second set of scaling and offsetting parameters (e.g., a second Scale1 and second Offset1).

Post-processing unit 138 or 152 may determine that a first set of codewords from the plurality of codewords have values belonging to a first partition of the dynamic range and determine that a second set of codewords from the plurality of codewords have values belonging to a second partition of the dynamic range. Post-processing unit 138 or 152 may scale and offset the first set of codewords with a first set of scaling and offsetting parameters (e.g., first Scale2 and first Offset2) and may scale and offset the second set of codewords with a second set of scaling and offsetting parameters (e.g., second Scale2 and second Offset2).

Figure 21A:
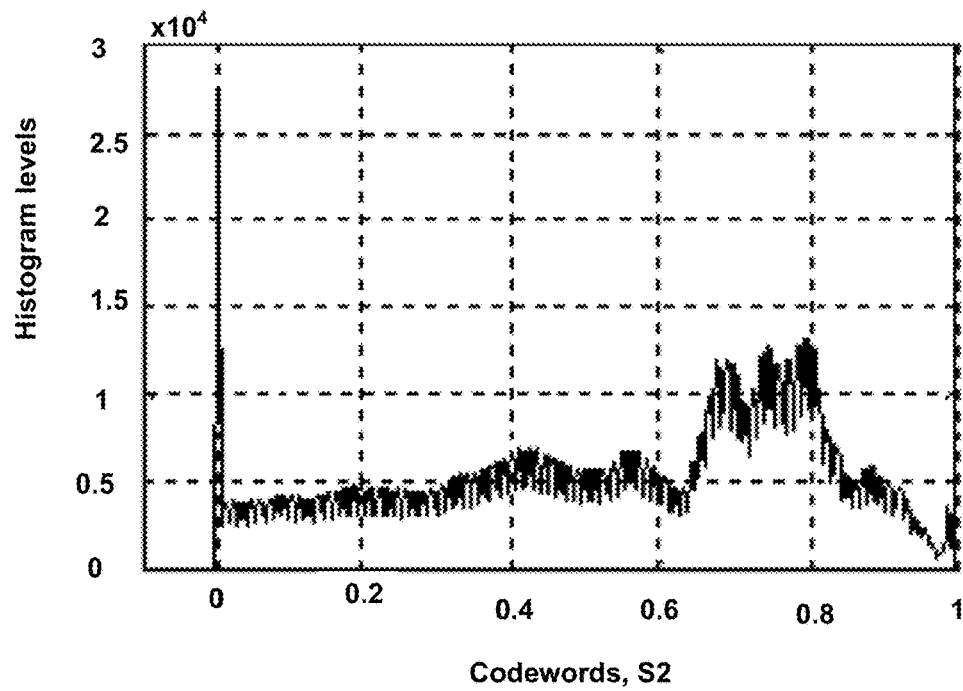
FIGS. 21A and 21B are diagrams illustrating histograms of the codewords after post-processing techniques described in this disclosure with tail-handling.
Figure 21B:
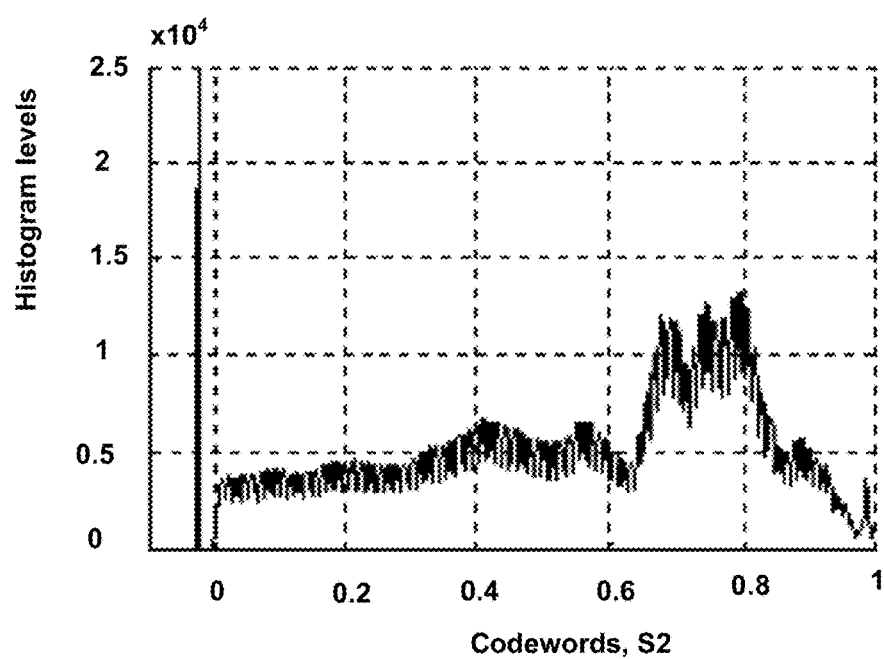
Figure 22:
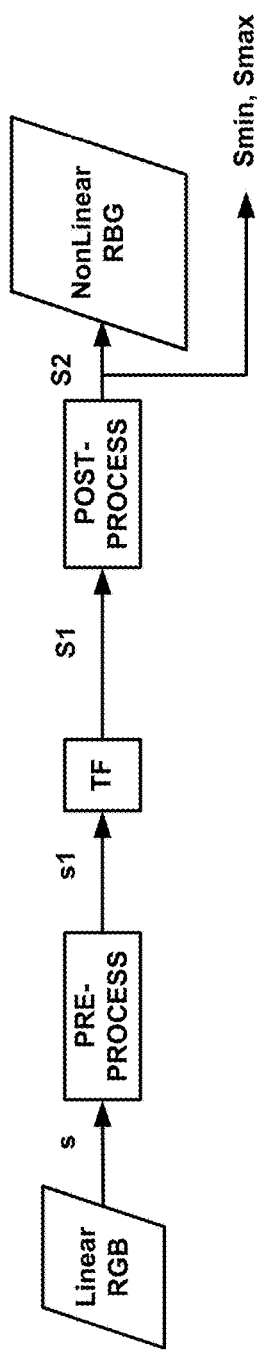
FIG. 22 is a conceptual diagram illustrating another example of a content adaptive HDR pipeline with static TF, encoder side.
Figure 23:
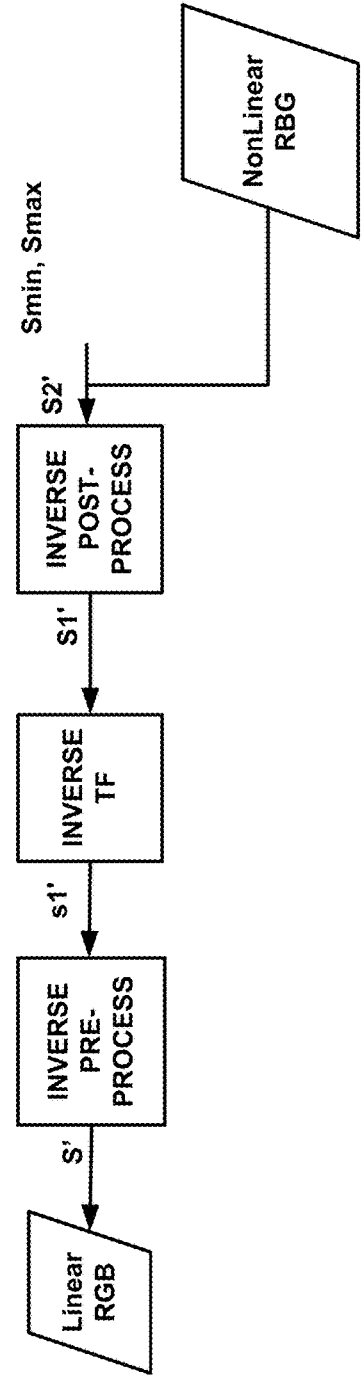
FIG. 23 is a conceptual diagram illustrating another example of a content adaptive HDR pipeline with static TF, decoder side.

FIGS. 21A and 21B are diagrams illustrating histograms of the codewords after post-processing with tail-handling. FIG. 22 is a conceptual diagram illustrating another example of a content adaptive HDR pipeline with static TF, encoder side. FIG. 23 is a conceptual diagram illustrating another example of content adaptive HDR pipeline with static TF, decoder side. FIGS. 22 and 23 are virtually identical to FIGS. 11 and 12, expect that FIGS. 22 and 23 illustrate that in some examples the Smin and Smax codewords are outputted if the scaled and offset value is outside a range and illustrate that in some examples the Smin' and Smax' (both of which are similar to Smin and Smax) are received codewords if the values are outside a range.

In the above examples, a single codeword is reversed for codewords below a minimum and a single codeword is reversed for codewords greater than the maximum. In some examples, codewords which belong to a histogram tail outside of the specified Range can be represented with more than a single reserved codeword.

Post-processing unit 138 may determine and signal a number of reserved codewords for a specified region of the dynamic range of codewords S. At the decoder side (e.g., video postprocessor 31), inverse post-processing unit 144 may determine the reserved codewords for the specified region. The technique may determine, signal and apply at the decoder signal value S' associated with each of the reserved codewords.

Figure 24:
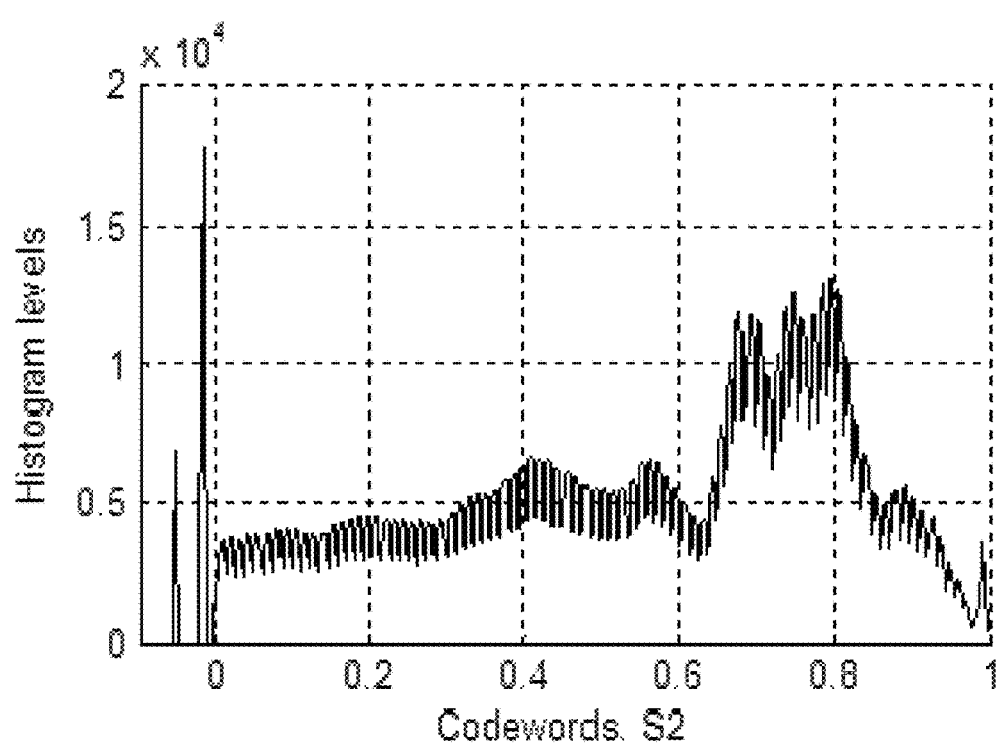
FIG. 24 is a diagram illustrating a histogram with two reserved coded handling color values.

FIG. 24 is a diagram illustrating a histogram with two reserved codeword handling color values. For example, visualization of this example, with 2 reserved codeword handling color values in $S2_{low}$ is show in FIG. 24. In this example, $S2_{low}$ codewords are split in two subranges, where each subrange is coded with codewords Smin1 and Smin2, respectively. The value associated with each of these codewords is determined at the encoder side (e.g., by video preprocessor 19) in a process similar to Equation 26-28, signaled to the decoder 30 and applied at the decoder side (e.g., by video postprocessor 31) through Equation 29.

In some examples, the techniques may be implemented in a form of transfer function. A non-linear part of the transfer function, namely histogram tail handing in a given example, could be modeled with an adaptive transfer function with two reserved codewords being associated with values determined at the decoder side, e.g., signaled and applied at the decoder side.

Figure 25A:
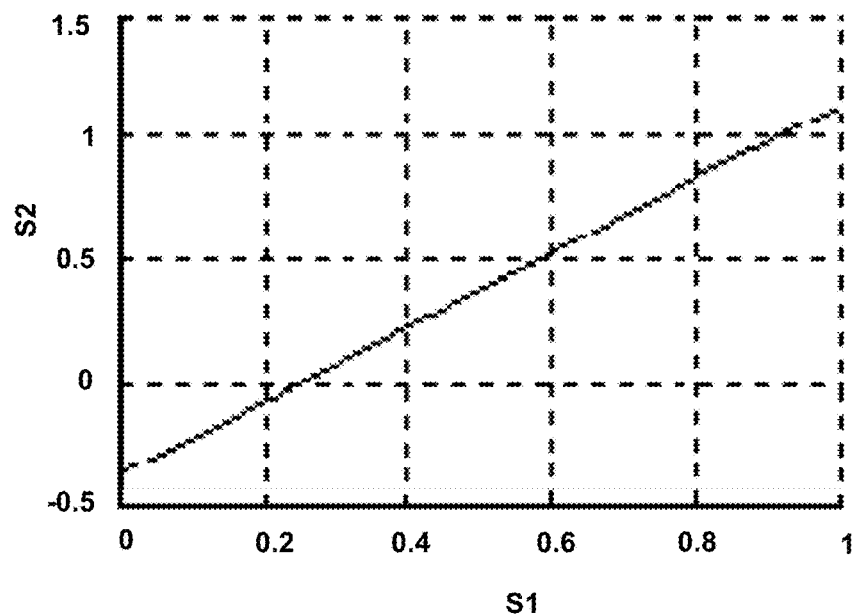
FIGS. 25A and 25B are diagrams illustrating parametric adaptive functions implemented by techniques described in this disclosure.
Figure 25B:
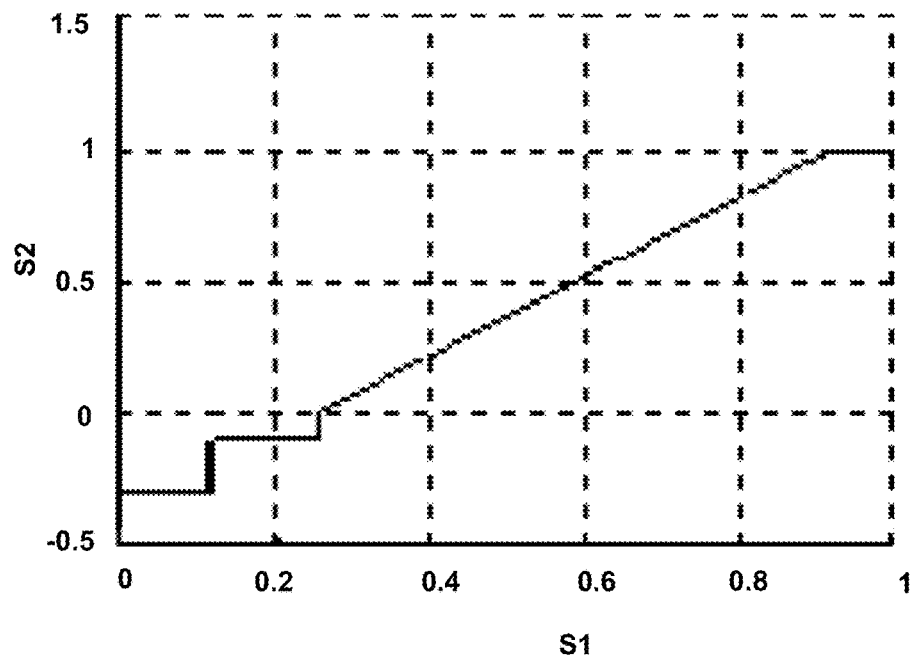

FIGS. 25A and 25B are diagrams illustrating parametric adaptive functions. FIG. 25A illustrates a linear transfer function (TF2) modeled with Scale2=1.5 and Offset=-0.25, and FIG. 25B illustrates a linear transfer function (TF2) modeled with Scale2=1.5 and Offset=-0.25 and parameterized non-linear segments. A non-linear segment is parameterized with 2 codewords which are associated with 2 determined color values and signaled to decoder values Smin1 and Smin2, and codewords of $S2_{high}$ are clipped to maxValue of Range.

The following describes post processing (e.g., with post-processing unit 138 or 150) with a piece-wise linear transfer function. Post-processing unit 138 or 150 may split codeword space of S into a finite number of segment r, such that:

$$\text{Range} = \{r_i\}, \text{ where } i=0 \ldots N \quad (30)$$

For each of these segments post-processing unit 138 or 150 determine independent post-processing parameters $Scale2_i$ and $Offset2_i$, and signal and apply Scale2i and Offset2i parameters to codewords S at encoder and decoder sides to produce output S2.

$$\text{Scales} = \{Scale2i\}; \text{ Offsets} = \{Offset2i\}; i=0 \ldots N$$

Figure 26A:
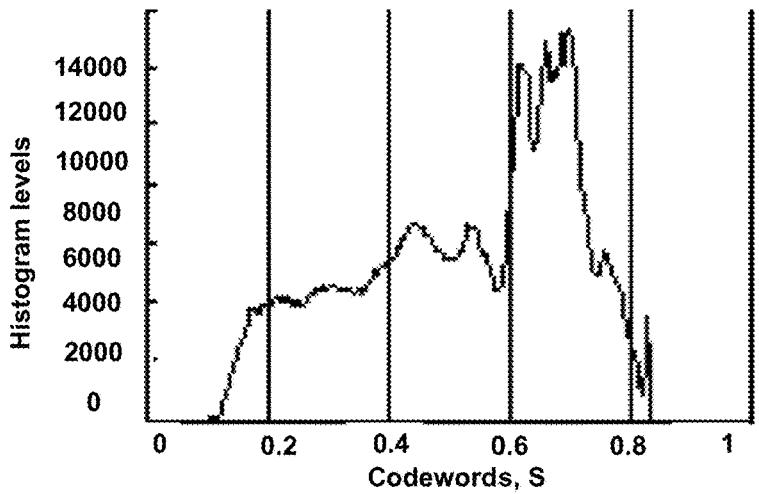
FIGS. 26A, 26B and 26C are diagrams illustrating post-processing with a piece-wise linear transfer function implemented with techniques described in this disclosure being applied to an input signal and impact of this post-processing on the histogram of the output signal.
Figure 26B:
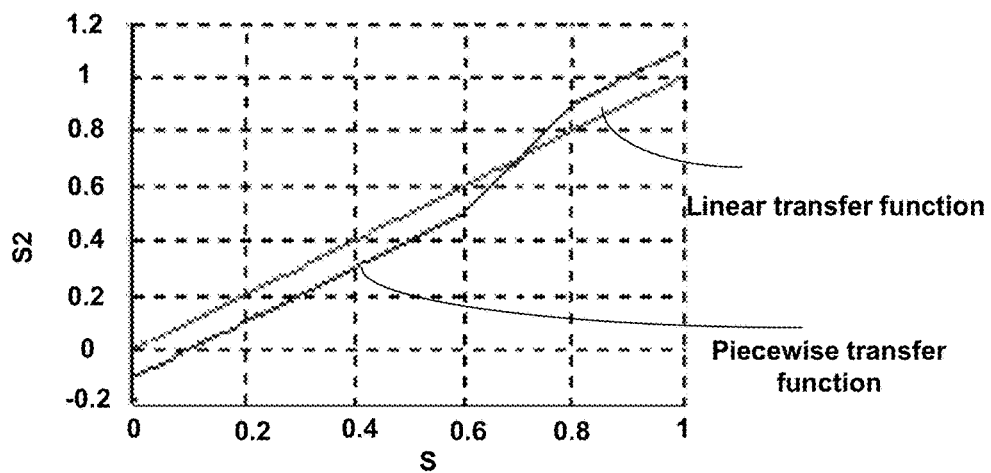
Figure 26C:
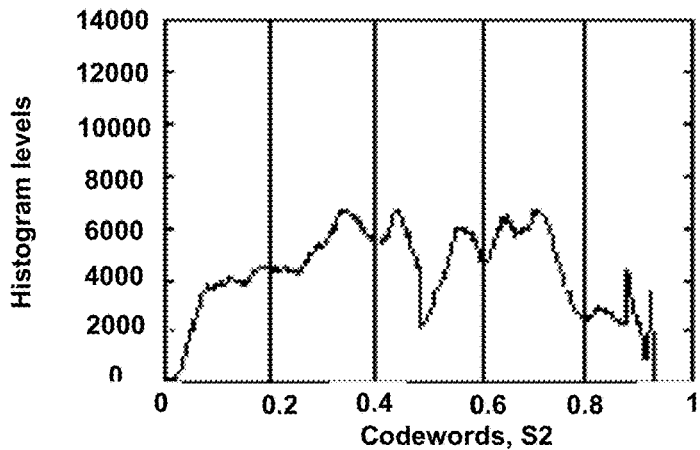

In terms of transfer function, an example algorithm can be modelled as follows. FIGS. 26A-26C are diagrams illustrating post-processing with piece-wise linear transfer function. FIG. 26A illustrates a histogram of an S signal produced by PQTF, FIG. 26B illustrates a parametric piece-wise linear TF of post-processing, and FIG. 26C illustrates a histogram of an S2 signal produced by a TF of post-processing.

In the histogram of S signal in FIG. 26A, introduced segments of dynamic range are shown with a vertical grid. As can be seen, the signal is occupying about 80% of available codewords, and 20% of available codewords can be utilized to reduce quantization error, as proposed in Equation 12 and 13. At the same time, the histogram shows that significant portion of codewords is located in the $4^{th}$ segment stretching from 0.6 to 0.8 of the codeword range. The available codeword budget can be utilized to improve quantization error for this specific $4^{th}$ segment, leaving accuracy of representation for other segments without change.

Post-processing parameters for these r segments (N=5) can be written as follows:

$$\text{Scales2} = \{1,1,1,2,1\}; \text{ Offsets2} = \{-0.1,-0.1,-0.1,-0.1, 0.1\}$$

which would result in piecewise linear Transfer Function which is shown in FIG. 26B. A histogram of the S2 signal resulting from application of such a TF is shown in FIG. 26C. As seen, the histogram is shifted to the left to occupy more codewords and the peaks which were located in the $4^{th}$ segment are stretched for a large dynamical range, thus providing higher accuracy of the representation and reducing the quantization error.

In general, parameters of this scheme may include:
a. Number of partitions for dynamic range
b. Ranges of each of segment
c. Scale and Offset for each of these segment Application:
a. In some examples, the techniques may include pre-, post-processing as well as non-linear processing technique. In some examples, the techniques may supplement linear codewords post-processing defined above with a parametric, piece-wise specified transfer function which is applied to samples that are within a specified range. In one example, the techniques may reserve finite number of codewords within a specified range to identification of samples that invoke this parametric transfer function.
b. In some examples, pre- and post-processing techniques are defined as scale and an offset, namely Scale 1 and Offset 1 and/or Scale2 and Offset2 which are applied to an input signal. In some examples, techniques are implemented in a form of a transfer function.
c. In some examples, non-linear processing may include a single parameter for defining color values belong outside of specified Range, one for samples below minValue and another for samples above maxValue. In some examples, a separately defined transfer functions can be applied.
d. In some examples, dynamic range adjustment (DRA) is conducted for each color component independently (independent parameter set), e.g., independently for R, G, B, or Y. In some examples, a single cross-component parameter set is applied for all color components.
e. In some examples, the parameters may be determined for entire video sequence. In some examples, the parameters may be temporally adapted or spatio-temporal adaptive.
f. In some examples, proposed processing can be utilized in HDR system with SDR compatibility. In such systems, with a certain transfer function in use, the proposed technique would be applied to codewords representing an HDR signal, e.g., above 100 nits and/or below 0.01 nits, leaving the rest of the codewords unprocessed, thus providing SDR compatibility.

Parameter Derivation:
a. In some examples, parameters of pre-processing and post-processing are derived independently. In some examples, parameters of pre- and post-processing derived jointly.
b. In some examples, parameters are derived from the process of minimizing quantization error, or derived by minimizing a cost function, which is formed by a weighted sum of bitrate resulting from conversion and coding and distortion introduced by these two lossy process.

c. In some examples, the parameters can be determined separately for each component using the information regarding that component and and/or they can be derived by using cross-component information.
d. In some examples, the parameters such as a range of applications can be determined from the type and properties of transfer function TF, e.g., processing can be applied to codewords which represent the HDR signal only, e.g., above 100 nits, and codewords representing SDR signal <=100 remain unchanged.
e. In some examples, parameters of range can be provided to a decoder as side information and applied as a function of the TF utilized in processing.
f. In some examples, the parameters such as range of applications can be determined from the type and properties of transfer function TF, e.g., for a TF which features a transition, a position of the transition (knee) can be utilized to determine dynamic range, to which processing is applied.
g. Parameters may include identification of a number of reserved codewords and their actual values
h. Parameters may include identification of the process associated with a reserved codeword
i. Parameters may include a number of subranges within codeword space for applying determined processing
j. Parameters may include codewords values subrange identifications for applying determined processing Parameter Signaling:
a. In some examples, parameters are estimated at the encoder side (e.g., video preprocessor 19) and signaled to the decoder (e.g., video postprocessor 31) through a bitstream (metadata, SEI message, VUI, etc.). The decoder receives parameters from a bitstream.
b. In some examples, parameters are derived at the encoder and decoder sides through a specified process from an input signal or from other available parameters associated with an input signal and processing flow.
c. In some examples, parameters are signaled explicitly and are sufficient for performing the DRA at the decoder side. In some examples, parameters are derived from other input signal parameters, e.g. parameters of the input color gamut and target color container (color primaries).
d. In some examples, parameters of a proposed system can be signaled as parameters of a Transfer Function (TF) utilized in the system, or be provided to a decoder as side information for a specific transfer function.
e. Parameters of the proposed scheme may be signaled through the bitstream by means of SEI/VUI or be provided to the decoder as a side information, or derived by the decoder from other identifications, such as input and output color space, utilized transfer function as so on.

Figure 29:
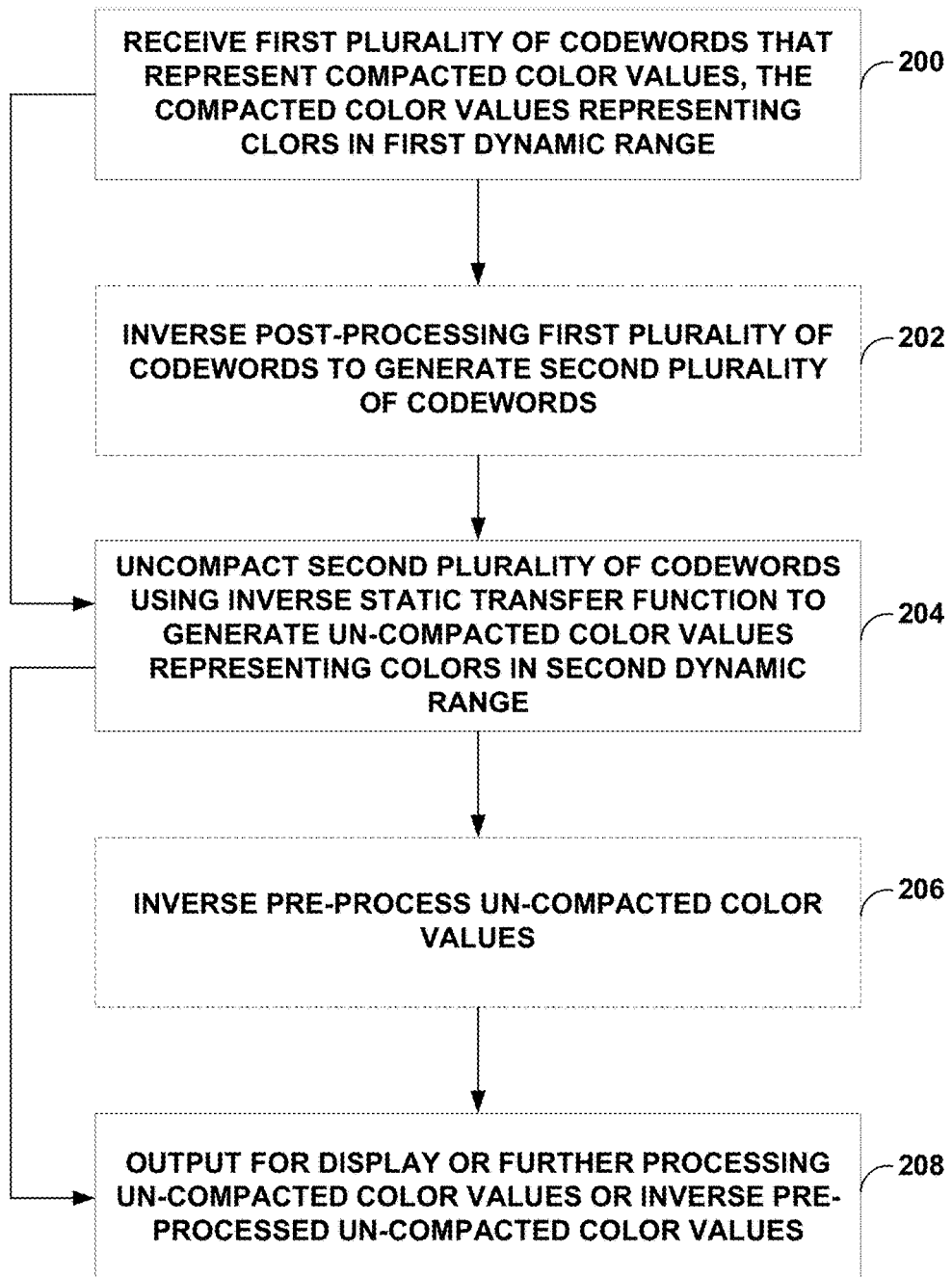
FIG. 29 is a flowchart illustrating an example method of video processing in a content adaptive high dynamic range (HDR) system.

FIG. 29 is a flowchart illustrating an example method of video processing in a content adaptive high dynamic range (HDR) system. The example of FIG. 29 is described with respect to video postprocessor 31 to convert received video data into video data for display. In some examples, video postprocessor 31 may perform the example techniques for each color (once for red component, once for green component, and once for blue component) so that the processing is independent.

Video postprocessor 31 receives a first plurality of codewords that represent compacted color values of video data, where the compacted color values represent colors in a first dynamic range (200). For example, for bitrate reduction, video preprocessor 19 may have compacted the dynamic range of a color values. The result of the compaction is the first plurality of codewords. Video postprocessor 31 may receive the first plurality of codewords directly from video decoder 30 or via video data memory 140. The compacted color values may be in a particular color space such as RGB or YCrCb. The compacted color values may be inverse quantized by inverse quantization unit 122.

Inverse post-processing unit 144 or 152 may apply an inverse post-processing function that reduces the range of the codewords to generate a second plurality of codewords (202). In some examples, inverse post-processing unit 144 may apply the inverse post-processing operations on color converted codewords (e.g., color converted via inverse color conversion unit 124). In some examples, inverse post-processing unit 152 may apply the inverse post-processing prior to color conversion and inverse color conversion unit 124 may convert the output of inverse post-processing unit 152.

Inverse post-processing unit 144 or 152 may perform inverse scaling and offsetting on the first plurality of codewords. Inverse post-processing unit 144 or 152 may receive the scaling and offsetting parameters (e.g., Scale2 and Offset2). In some examples, inverse post-processing unit 144 or 152 may receive information from which inverse post-processing unit 144 or 152 determine the scaling and offsetting parameters. In general, inverse post-processing unit 144 or 152 may derive scaling and offsetting parameters, from a received bitstream or separately signaled side information, for the inverse scaling and offsetting of the codewords. When receiving the scaling and offsetting parameters in the bitstream, inverse post-processing unit 144 or 152 receives the scaling and offsetting parameters along with the picture data that is to be processed. When receiving the scaling and offsetting parameters as separately signaled side information, inverse post-processing unit 144 or 152 receives the scaling and offsetting parameters not with any picture data that is to be processed (e.g., receives the scaling and offsetting parameters before any picture data).

In some examples, instead of applying scaling and offsetting to the first plurality of codewords for all values of the codewords, inverse post-processing unit 144 or 152 may apply piecewise scaling and offsetting. For example, inverse post-processing unit 144 or 152 may determine that a first set of codewords from the first plurality of codewords represent compacted color values having values less than a minimum threshold or greater than a maximum threshold and that a second set of codewords from the first plurality of codewords represent compacted color values having values less than the maximum threshold and greater than the minimum threshold.

Inverse post-processing unit 144 or 152 may assign a first codeword (e.g., Smin') to codewords of the first set of codewords that are less than the minimum threshold and assign a second codeword (e.g., Smax') to codewords of the first set of codewords that are greater than the maximum threshold. Inverse post-processing unit 144 or 152 may inverse scale and offset (e.g., based on Scale2 and Offset2) the second set of codewords. Although one minimum and one maximum threshold is described, in some examples, there may be a plurality of such thresholds with reserved codewords for each of the thresholds. Inverse post-processing unit 144 or 152 may receive Smin', Smax' or the reserved codewords, receive information on how to determine these codewords, or these codewords may be prestored in video data memory 140.

Inverse TF unit 126 receives the output from inverse post-processing unit 144 or from inverse color conversion unit 124 in examples that use inverse post-processing unit 152. However, in some examples, inverse post-processing unit 144 or 152 may not be enabled or may not be available. In such examples, inverse TF unit 126 receives the first plurality of codewords.

Inverse TF unit 126 may uncompact a second plurality of codewords based on the first plurality of codewords using an inverse static transfer function that is non-adaptive to the video data to generate un-compacted color values (204). The un-compacted color values represent colors in a second dynamic range. The second plurality of codewords are one of codes from the first plurality of codewords being inverse post-processed (e.g., the output from inverse post-processing unit 144 or from inverse post-processing unit 152 after inverse color conversion) or the first plurality of codewords (e.g., where inverse post-processing unit 144 or 152 are disabled or not available).

In some examples, inverse TF unit 126 may output the un-compacted color values for outputting for display or further processing (208). However, in some examples, such as where video preprocessor 19 applied pre-processing prior to compacting, inverse TF unit 126 may output the un-compacted color values to inverse pre-processing unit 142. In this case, inverse pre-processing unit 142 may output for display or further processing inverse pre-processed un-compacted color values, as discussed below in reference to optional operation 206. The dynamic range of the un-compacted color values may be greater than the dynamic range of the codewords that inverse TF unit 126 receives. In other words, inverse TF unit 126 increase the dynamic range of the codewords to generate un-compacted color values having a higher dynamic range.

In some examples, inverse pre-processing unit 142 may apply inverse pre-processing on the un-compacted color values (206). Inverse pre-processing unit 142 may receive the scaling and offsetting parameters (e.g., Scale1 and Offset1). In some examples, inverse pre-processing unit 142 may receive information from which inverse pre-processing unit 142 determines the scaling and offsetting parameters (e.g., the histogram of the colors in the picture). Inverse pre-processing unit 142 outputs the resulting inverse pre-processed un-compacted color values for display or further processing (208).

In general, inverse pre-processing unit 142 may derive scaling and offsetting parameters, from a received bitstream or separately signaled side information, for the inverse scaling and offsetting of the codewords. When receiving the scaling and offsetting parameters in the bitstream, inverse pre-processing unit 142 receives the scaling and offsetting parameters along with the picture data that is to be processed. When receiving the scaling and offsetting parameters in as separately signaled side information, inverse pre-processing unit 142 receives the scaling and offsetting parameters not with any picture data that is to be processed (e.g., receives the scaling and offsetting parameters before any picture data).

As described above, video postprocessor 31 may perform at least one of inverse post-processing the first plurality of codewords to generate the second plurality of codewords or perform inverse pre-processing on the un-compacted color values. However, in some examples, video postprocessor 31 may perform both inverse post-processing of the first plurality of codewords to generate the second plurality of codewords (e.g., via inverse post-processing unit 144 or 152) and inverse pre-processing the un-compacted color values (e.g., via inverse pre-processing unit 142) to generate the inverse pre-processed un-compacted color values.

Figure 30:
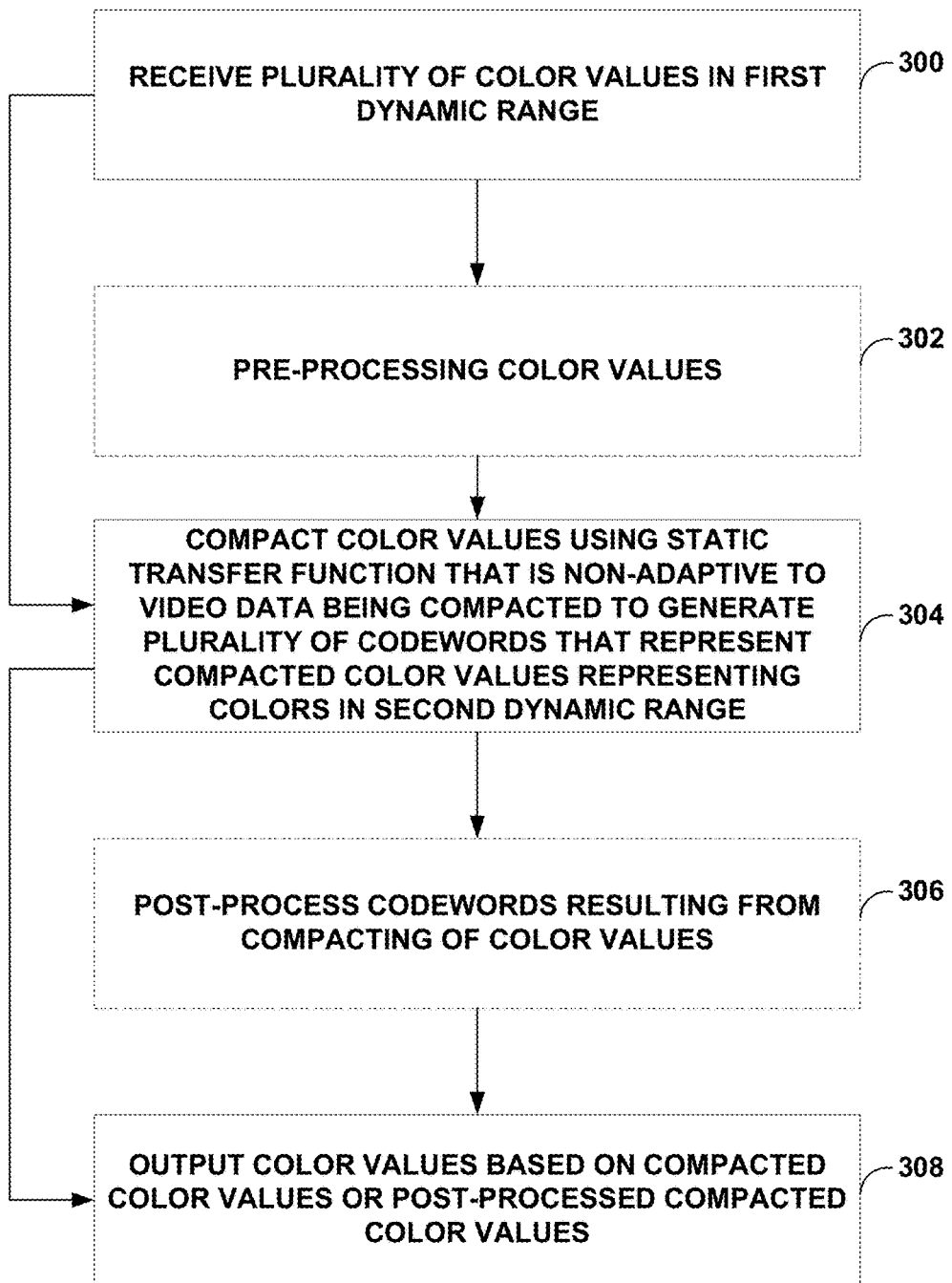
FIG. 30 is a flowchart illustrating another example method of video processing in a content adaptive high dynamic range (HDR) system.

FIG. 30 is a flowchart illustrating another example method of video processing in a content adaptive high dynamic range (HDR) system. The example of FIG. 30 is described with respect to video preprocessor 19 to convert received video data into video data for transmission. In some examples, video preprocessor 19 may perform the example techniques for each color (once for red component, once for green component, and once for blue component) so that the processing is independent.

Video preprocessor 19 receives a plurality of color values of video data representing colors in a first dynamic range (300). For example, video preprocessor 19 may receive video data stored in video data memory 132, where such data is received from video source 18. The color values may be in RGB color space, but it is possible for color conversion unit 114 to convert the color prior to processing to YCrCb color space.

Pre-processing unit 134 may perform pre-processing on the color values such that when the pre-process color values are processed by TF unit 112, the resulting codewords each represent approximately the range of color values or at least are not heavily weighted such that low illumination colors are represented by a much larger range of codewords and high illumination colors are represented by a relatively small range of codewords (302). For instance, pre-processing unit 134 may scale and offset (e.g., via Scale1 and Offset1). Pre-processing unit 134 may determine the scale and offset parameters based on a histogram of the color values in a picture (e.g., adaptively determine a scale factor and an offset factor based on the input linear color values). Pre-processing unit 134 may output the values for Scale1 and Offset1 or may output information that can be used to determine the values for Scale1 and Offset1. For example, video preprocessor 19 may cause video encoder 20 to signal, in a bitstream or as side information, scaling and offsetting parameters for the scaling and offsetting input linear color values.

TF unit 112 may receive the output of pre-processing unit 134 for compacting the color values. However, as illustrated, in some examples, pre-processing unit 134 may not be enabled or not available. In such examples, TF unit 112 may receive the plurality of color values without pre-processing.

TF unit 112 may compact the color values using a static transfer function that is non-adaptive to the video data being compacted to generate a plurality of codewords that represent compacted color values, where the compacted color values represent colors in a second dynamic range (304). TF unit 112 may reduce the dynamic range of the color values, facilitating the transmission of such color values.

In some examples, TF unit 112 may output color values based on the compacted color values represented by codewords (308). However, in some examples, post-processing unit 138 or 150 may post-process the codewords resulting from the compacting of the color values to generate codewords that better use the codeword space (e.g., increase the use of the available codeword space) (306). Post-processing unit 150 may receive the output of color conversion unit 114 for post-processing and color conversion unit 114 receives the output of TF unit 112. Post-processing unit 138 or 150 may scale with Scale2 and offset with Offset2. For example, video preprocessor 19 may cause video encoder 20 to signal, in a bitstream or as side information, scaling and offsetting parameters for the scaling and offsetting of the codewords.

In some examples, instead of applying scaling and offsetting to the plurality of codewords that TF unit 112 output for all values of the codewords, post-processing unit 138 or 150 may apply piecewise scaling and offsetting. For example, post-processing unit 138 or 150 may determine that a set of the scaled and offset codewords have values less than a minimum threshold or greater than a maximum threshold. Post-processing unit 138 or 150 may assign a first codeword (Smin) to the set of scaled and offset codewords having values less than the minimum threshold, and assign a second codeword (Smax) to the set of scaled and offset codewords having values greater than the maximum threshold. For the other codewords, post-processing unit 138 or 150 may scale and offset the other codewords (e.g., based on Scale2 and Offset2). Although one minimum and one maximum threshold is described, in some examples, there may be a plurality of such thresholds with reserved codewords for each of the thresholds. Post-processing unit 138 or 150 may output information for Smin, Smax, or the reserved codewords, or output information on how to determine these codewords.

Video preprocessor 19 may output color values based on one of the compacted color values or the post-processed compacted color values (308). For example, if post-processing unit 138 or 150 is enabled, then video preprocessor 19 may output color values based on the post-processed compacted color values. If post-processing unit 138 or 150 is not enabled or not available, then video preprocessor 19 may output color values based on the compacted color values as compacted by TF unit 112 and without post-processing. However, color conversion unit 114 and quantization unit 116 may perform respective processing prior to outputting.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of video processing, the method comprising:
   receiving a first plurality of codewords that represent compacted color values of video data, the compacted color values representing colors in a first dynamic range, wherein the first dynamic range is a ratio between a first minimum brightness and a first maximum brightness of the compacted color values, and wherein the compacted color values represent color values that have been converted to the first dynamic range for encoding;
   un-compacting a second plurality of codewords using an inverse static transfer function that is non-adaptive to the video data to generate un-compacted color values, the un-compacted color values representing colors in a second, different dynamic range, wherein the second dynamic range is a ratio between a second minimum brightness and a second maximum brightness of the un-compacted color values, wherein the second dynamic range is greater than the first dynamic range, and wherein the second plurality of codewords are one of codewords from the first plurality of codewords after being inverse post-processed or the first plurality of codewords;

at least one of inverse post-processing the first plurality of codewords to generate the second plurality of codewords or inverse pre-processing the un-compacted color values, wherein inverse post-processing the first plurality of codewords comprises performing an inverse of post-processing that was applied to compacted codewords to increase spreading of the compacted codewords across a codeword space, and wherein the post-processing that was applied to compacted codewords comprises scaling and offsetting the compacted codewords to increase the amount of codeword space utilized by the compacted codewords, and wherein inverse pre-processing the un-compacted color values comprises performing an inverse of pre-processing that was applied to linear color values to increase linearity of compacted codewords so that changes in the linear color values manifest as linearly proportional changes in the compacted codewords, and wherein the pre-processing that was applied to the linear color values comprises scaling and offsetting the linear color values such that when a static transfer function is applied there is more linearity in the compacted codewords; and outputting the un-compacted color values or the inverse pre-processed un-compacted color values.

2. The method of claim 1, wherein at least one of inverse post-processing the first plurality of codewords to generate the second plurality of codewords or inverse pre-processing the un-compacted color values comprises:
inverse post-processing the first plurality of codewords to generate the second plurality of codewords; and
inverse pre-processing the un-compacted color values to generate the inverse pre-processed un-compacted color values.

3. The method of claim 1, wherein the inverse post-processing comprises inverse scaling and offsetting the first plurality of codewords, and wherein the inverse pre-processing comprising inverse scaling and offsetting the un-compacted second plurality of codewords resulting from the uncompacting.

4. The method of claim 3, further comprising:
deriving scaling and offsetting parameters, from a received bitstream or separately signaled side information, for one or both of the inverse scaling and offsetting the first plurality of codewords and the inverse scaling and offsetting the un-compacted second plurality of codewords resulting from the uncompacting.

5. The method of claim 1, further comprising:
determining that a first set of codewords from the first plurality of codewords represent compacted color values having values less than a minimum threshold or greater than a maximum threshold; and
determining that a second set of codewords from the first plurality of codewords represent compacted color values having values greater than or equal to the minimum threshold and less than or equal to the maximum threshold,
wherein inverse post-processing the first plurality of codewords comprises:
assigning a first codeword to codewords of the first set of codewords that are less than the minimum threshold,
assigning a second codeword to codewords of the first set of codewords that are greater than the maximum threshold, and
inverse scaling and offsetting the second set of codewords.

6. The method of claim 5, further comprising:
determining one or more of the first codeword, the second codeword, the maximum threshold, and the minimum threshold based on information received from a bitstream or from separately signaled side information indicating the first codeword, the second codeword, the maximum threshold, or the minimum threshold or applying processing to determine the first codeword, the second codeword, the maximum threshold, or the minimum threshold.

7. The method of claim 1, further comprising:
determining that a first set of codewords from the first plurality of codewords represent compacted color values having values belonging to a first partition of the first dynamic range; and
determining that a second set of codewords from the first plurality of codewords represent compacted color values having values belonging to a second partition of the first dynamic range,
wherein inverse post-processing the first plurality of codewords comprises:
scaling and offsetting the first set of codewords with a first set of scaling and offsetting parameters, and
scaling and offsetting the second set of codewords with a second set of scaling and offsetting parameters.

8. The method of claim 1, further comprising:
determining that a first set of the un-compacted color values represent un-compacted color values having values belonging to a first partition of the second dynamic range; and
determining that a second set of the un-compacted color values represent un-compacted color values having values belonging to a second partition of the second dynamic range,
wherein inverse pre-processing the un-compacted color values comprises:
scaling and offsetting the first set of the un-compacted color values with a first set of scaling and offsetting parameters, and
scaling and offsetting the second set of the un-compacted color values with a second set of scaling and offsetting parameters.

9. A method of video processing, the method comprising:
receiving a plurality of color values of video data representing colors in a first dynamic range, wherein the first dynamic range is a ratio between a first minimum brightness and a first maximum brightness of the color values;
compacting, for encoding, the color values using a static transfer function that is non-adaptive to the video data being compacted to generate a plurality of codewords that represent compacted color values, the compacted color values representing colors in a second, different dynamic range, wherein the second dynamic range is a ratio between a second minimum brightness and a second maximum brightness of the un-compacted color values, wherein the second dynamic range is less than the first dynamic range;
at least one of pre-processing the color values prior to compacting to generate the color values that are compacted or post-processing of codewords resulting from the compacting of the color values,
wherein pre-processing the color values prior to compacting comprises scaling and offsetting the color values prior to compacting to increase linearity in codewords resulting from the compacting as compared to not pre-processing the color values so that changes in the linear color values manifest as linearly proportional changes in the compacted codewords, and wherein post-processing of codewords comprises modifying the codewords resulting from the compacting to increase spreading across a codeword space including scaling and offsetting the codewords resulting from the compacting of the color values to increase the amount of codeword space utilized by the compacted codewords; and outputting color values based on one of the compacted color values or the post-processed compacted color values.

10. The method of claim 9, wherein at least one of pre-processing the color values prior to compacting to generate the color values that are compacted or post-processing of codewords resulting from the compacting of the color values comprises:

pre-processing the color values prior to compacting to generate the color values that are compacted; and post-processing of codewords resulting from the compacting of the color values.

11. The method of claim 9, further comprising:
signaling, in a bitstream or as side information, scaling and offsetting parameters for one or both of the scaling and offsetting input linear color values and scaling and offsetting the codewords resulting from the compacting.

12. The method of claim 9, wherein scaling and offsetting input linear color values comprises adaptively determining a scale factor and an offset factor based on the input linear color values, and wherein scaling and offsetting the codewords comprises adaptively determining a scale factor and an offset factor based on the codewords to increase the use of the available codeword space.

13. The method of claim 9, wherein post-processing of the codewords comprises:

determining that a set of the scaled and offset codewords have values less than a minimum threshold or greater than a maximum threshold;

assigning a first codeword to the set of scaled and offset codewords having values less than the minimum threshold; and assigning a second codeword to the set of scaled and offset codewords having values greater than the maximum threshold.

14. The method of claim 13, further comprising:
signaling, in a bitstream or as side information, information indicating one or more of the first codeword, the second codeword, the maximum threshold, or the minimum threshold.

15. The method of claim 9, further comprising:
determining that a first set of the color values have values belonging to a first partition of the first dynamic range; and determining that a second set of the color values have values belonging to a second partition of the first dynamic range, wherein pre-processing the color values comprises:
scaling and offsetting the first set of the color values with a first set of scaling and offsetting parameters, and scaling and offsetting the second set of the color values with a second set of scaling and offsetting parameters.

16. The method of claim 9, further comprising:
determining that a first set of codewords from the plurality of codewords have values belonging to a first partition of the second dynamic range; and determining that a second set of codewords from the plurality of codewords have values belonging to a second partition of the second dynamic range, wherein post-processing the plurality of codewords comprises:
scaling and offsetting the first set of codewords with a first set of scaling and offsetting parameters, and scaling and offsetting the second set of codewords with a second set of scaling and offsetting parameters.

17. A device for video processing, the device comprising:
a video data memory configured to store video data; and
a video postprocessor comprising at least one of fixed-function or programmable circuitry, the video postprocessor configured to:

receive a first plurality of codewords from the video data memory that represent compacted color values of video data, the compacted color values representing colors in a first dynamic range, wherein the first dynamic range is a ratio between a first minimum brightness and a first maximum brightness of the compacted color values, and wherein the compacted color values represent color values that have been converted to the first dynamic range for encoding;

uncompact a second plurality of codewords using an inverse static transfer function that is non-adaptive to the video data to generate un-compacted color values, the un-compacted color values representing colors in a second, different dynamic range, wherein the second dynamic range is a ratio between a second minimum brightness and a second maximum brightness of the un-compacted color values, wherein the second dynamic range is greater than the first dynamic range, and wherein the second plurality of codewords are one of codewords from the first plurality of codewords after being inverse post-processed or the first plurality of codewords;

at least one of inverse post-process the first plurality of codewords to generate the second plurality of codewords or inverse pre-process the un-compacted color values, wherein to inverse post-process the first plurality of codewords, the video postprocessor is configured to perform an inverse of post-processing that was applied to compacted codewords to increase spreading of the compacted codewords across a codeword space, and wherein the post-processing that was applied to compacted codewords comprises scaling and offsetting the compacted codewords to increase the amount of codeword space utilized by the compacted codewords, and wherein to inverse pre-process the un-compacted color values, the video postprocessor is configured to perform an inverse of pre-processing that was applied to linear color values to increase linearity of compacted codewords so that changes in the linear color values manifest as linearly proportional changes in the compacted codewords, and wherein the pre-processing that was applied to the linear color values comprises scaling and offsetting the linear color values such that when a static transfer function is applied there is more linearity in the compacted codewords; and output the un-compacted color values or the inverse pre-processed un-compacted color values.

18. The device of claim 17, wherein the video postprocessor is configured to:
inverse post-process the first plurality of codewords to generate the second plurality of codewords; and
inverse pre-process the un-compacted color values to generate the inverse pre-processed un-compacted color values.

19. The device of claim 17, wherein to inverse post-process, the video postprocessor is configured to inverse scale and offset the first plurality of codewords, and wherein to inverse pre-process, the video postprocessor is configured to inverse scale and offset the un-compacted second plurality of codewords resulting from the uncompacting.

20. The device of claim 19, wherein the video postprocessor is configured to:
derive scaling and offsetting parameters, from a received bitstream or separately signaled side information, for one or both of the inverse scaling and offsetting the first plurality of codewords and the inverse scaling and offsetting the un-compacted second plurality of codewords resulting from the uncompacting.

21. The device of claim 17, wherein the video postprocessor is configured to:
determine that a first set of codewords from the first plurality of codewords represent compacted color values having values less than a minimum threshold or greater than a maximum threshold; and
determine that a second set of codewords from the first plurality of codewords represent compacted color values having values greater than or equal to the minimum threshold and less than or equal to the maximum threshold,
wherein to inverse post-process the first plurality of codewords, the video postprocessor is configured to:
assign a first codeword to codewords of the first set of codewords that are less than the minimum threshold,
assign a second codeword to codewords of the first set of codewords that are greater than the maximum threshold, and
inverse scale and offset the second set of codewords.

22. The device of claim 21, wherein the video postprocessor is configured to:
determine one or more of the first codeword, the second codeword, the maximum threshold, and the minimum threshold based on information received from a bitstream or from separately signaled side information indicating the first codeword, the second codeword, the maximum threshold, or the minimum threshold or apply processing to determine the first codeword, the second codeword, the maximum threshold, or the minimum threshold.

23. The device of claim 17, wherein the video postprocessor is configured to:
determine that a first set of codewords from the first plurality of codewords represent compacted color values having values belonging to a first partition of the first dynamic range; and
determine that a second set of codewords from the first plurality of codewords represent compacted color values having values belonging to a second partition of the first dynamic range,
wherein to inverse post-process the first plurality of codewords, the video postprocessor is configured to:
scale and offset the first set of codewords with a first set of scaling and offsetting parameters, and
scale and offset the second set of codewords with a second set of scaling and offsetting parameters.

24. The device of claim 17, wherein the video postprocessor is configured to:
determine that a first set of the un-compacted color values represent un-compacted color values having values belonging to a first partition of the second dynamic range; and
determine that a second set of the un-compacted color values represent un-compacted color values having values belonging to a second partition of the second dynamic range,
wherein to inverse pre-process the un-compacted color values, the video postprocessor is configured to:
scale and offset the first set of the un-compacted color values with a first set of scaling and offsetting parameters, and
scale and offset the second set of the un-compacted color values with a second set of scaling and offsetting parameters.

25. A device for video processing, the device comprising:
a video data memory configured to store video data; and
a video preprocessor comprising at least one of fixed-function or programmable circuitry, the video preprocessor configured to:
receive from the video data memory a plurality of color values of video data representing colors in a first dynamic range, wherein the first dynamic range is a ratio between a first minimum brightness and a first maximum brightness of the color values;
compact, for encoding, the color values using a static transfer function that is non-adaptive to the video data being compacted to generate a plurality of codewords that represent compacted color values, the compacted color values representing colors in a second, different dynamic range, wherein the second dynamic range is a ratio between a second minimum brightness and a second maximum brightness of the un-compacted color values, and wherein the second dynamic range is less than the first dynamic range;
at least one of pre-process the color values prior to compacting to generate the color values that are compacted or post-process codewords resulting from the compacting of the color values,
wherein to pre-process the color values prior to compacting, the video preprocessor is configured to scale and offset the color values prior to compacting to increase linearity in codewords resulting from the compacting as compared to not pre-processing the color values so that changes in the linear color values manifest as linearly proportional changes in the compacted codewords, and
wherein to post-process codewords, the video preprocessor is configured to modify the codewords resulting from the compacting to increase spreading across a codeword space including scaling and offsetting the codewords resulting from the compacting of the color values to increase the amount of codeword space utilized by the compacted codewords; and
output color values based on one of the compacted color values or the post-processed compacted color values.

26. The device of claim 25, wherein the video preprocessor is configured to:
pre-process the color values prior to compacting to generate the color values that are compacted; and
post-process of codewords resulting from the compacting of the color values.

27. The device of claim 25, further comprising a video encoder, wherein the video preprocessor is configured to cause the video encoder to signal, in a bitstream or as side information, scaling and offsetting parameters for one or both of the scaling and offsetting input linear color values and scaling and offsetting the codewords resulting from the compacting.

28. The device of claim 25, wherein to scale and offset input linear color values, the video preprocessor is configured to adaptively determine a scale factor and an offset factor based on the input linear color values, and wherein to scale and offset the codewords, the video preprocessor is configured to adaptively determine a scale factor and an offset factor based on the codewords to increase the use of the available codeword space.

29. The device of claim 25, wherein to post-process the codewords, the video preprocessor is configured to:
   determine that a set of the scaled and offset codewords have values less than a minimum threshold or greater than a maximum threshold;
   assign a first codeword to the set of scaled and offset codewords having values less than the minimum threshold; and
   assign a second codeword to the set of scaled and offset codewords having values greater than the maximum threshold.

30. The device of claim 29, further comprising a video encoder, wherein the video preprocessor is configured to cause the video encoder to signal, in a bitstream or as side information, information indicating one or more of the first codeword, the second codeword, the maximum threshold, or the minimum threshold.

31. The device of claim 25, wherein the video preprocessor is configured to:
   determine that a first set of the color values have values belonging to a first partition of the first dynamic range; and
   determine that a second set of the color values have values belonging to a second partition of the first dynamic range,
   wherein to pre-process the color values, the video preprocessor is configured to:
      scale and offset the first set of the color values with a first set of scaling and offsetting parameters, and
      scale and offset the second set of the color values with a second set of scaling and offsetting parameters.

32. The device of claim 25, wherein the video preprocessor is configured to:
   determine that a first set of codewords from the plurality of codewords have values belonging to a first partition of the second dynamic range; and
   determine that a second set of codewords from the plurality of codewords have values belonging to a second partition of the second dynamic range,
   wherein to post-process the plurality of codewords, the video preprocessor is configured to:
      scale and offset the first set of codewords with a first set of scaling and offsetting parameters, and
      scale and offset the second set of codewords with a second set of scaling and offsetting parameters.

33. A non-transitory computer-readable storage medium storing instructions that when executed cause one or more processors of a device for video processing to:
   receive a first plurality of codewords that represent compacted color values of video data, the compacted color values representing colors in a first dynamic range, wherein the first dynamic range is a ratio between a first minimum brightness and a first maximum brightness of the compacted color values, and wherein the compacted color values represent color values that have been converted to the first dynamic range for encoding;
   uncompact a second plurality of codewords using an inverse static transfer function that is non-adaptive to the video data to generate un-compacted color values, the un-compacted color values representing colors in a second, different dynamic range, wherein the second dynamic range is a ratio between a second minimum brightness and a second maximum brightness of the un-compacted color values, wherein the second dynamic range is greater than the first dynamic range, and wherein the second plurality of codewords are one of codewords from the first plurality of codewords after being inverse post-processed or the first plurality of codewords;
   at least one of inverse post-process the first plurality of codewords to generate the second plurality of codewords or inverse pre-process the un-compacted color values,
   wherein the instructions that cause the one or more processors to inverse post-process the first plurality of codewords comprise instructions that cause the one or more processors to perform an inverse of post-processing that was applied to compacted codewords to increase spreading of the compacted codewords across a codeword space, and wherein the post-processing that was applied to compacted codewords comprises scaling and offsetting the compacted codewords to increase the amount of codeword space utilized by the compacted codewords, and
   wherein the instructions that cause the one or more processors to inverse pre-process the un-compacted color values comprise instructions that cause the one or more processors to perform an inverse of pre-processing that was applied to linear color values to increase linearity of compacted codewords so that changes in the linear color values manifest as linearly proportional changes in the compacted codewords, and wherein the pre-processing that was applied to the linear color values comprises scaling and offsetting the linear color values such that when a static transfer function is applied there is more linearity in the compacted codewords; and
   output the un-compacted color values or the inverse pre-processed un-compacted color values.

34. The non-transitory computer-readable storage medium of claim 33, wherein the instructions that cause the one or more processors to at least one of inverse post-process the first plurality of codewords to generate the second plurality of codewords or inverse pre-process the un-compacted color values comprise instructions that cause the one or more processors to:
   inverse post-process the first plurality of codewords to generate the second plurality of codewords; and
   inverse pre-process the un-compacted color values to generate the inverse pre-processed un-compacted color values.

35. A device for video processing, the device comprising:
   means for receiving a first plurality of codewords that represent compacted color values of video data, the compacted color values representing colors in a first dynamic range, wherein the first dynamic range is a ratio between a first minimum brightness and a first maximum brightness of the compacted color values, and wherein the compacted color values represent color values that have been converted to the first dynamic range for encoding;

means for uncompacting a second plurality of codewords using an inverse static transfer function that is non-adaptive to the video data to generate un-compacted color values, the un-compacted color values representing colors in a second, different dynamic range, wherein the second dynamic range is a ratio between a second minimum brightness and a second maximum brightness of the un-compacted color values, wherein the second dynamic range is greater than the first dynamic range, and wherein the second plurality of codewords are one of codewords from the first plurality of codewords after being inverse post-processed or the first plurality of codewords;

at least one of means for inverse post-processing the first plurality of codewords to generate the second plurality of codewords or means for inverse pre-processing the un-compacted color values, wherein the means for inverse post-processing the first plurality of codewords comprises means for performing an inverse of post-processing that was applied to compacted codewords to increase spreading of the compacted codewords across a codeword space, and wherein the post-processing that was applied to compacted codewords comprises scaling and offsetting the compacted codewords to increase the amount of codeword space utilized by the compacted codewords, and wherein the means for inverse pre-processing the un-compacted color values comprises means for performing an inverse of pre-processing that was applied to linear color values to increase linearity of compacted codewords so that changes in the linear color values manifest as linearly proportional changes in the compacted codewords, and wherein the pre-processing that was applied to the linear color values comprises scaling and offsetting the linear color values such that when a static transfer function is applied there is more linearity in the compacted codewords; and means for outputting the un-compacted color values or the inverse pre-processed un-compacted color values.

36. The device of claim 35, further comprising:

the means for inverse post-processing the first plurality of codewords to generate the second plurality of codewords; and the means for inverse pre-processing the un-compacted color values to generate the inverse pre-processed un-compacted color values.

\* \* \* \* \*